(12) United States Patent
van der Westhuizen

(10) Patent No.: US 9,169,009 B1
(45) Date of Patent: Oct. 27, 2015

(54) HUB-MOUNTED AUXILLIARY SYSTEMS FOR TIPJETS IN A REACTION DRIVE ROTOR SYSTEM

(75) Inventor: Jacob Johannes van der Westhuizen, South Jordan, UT (US)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 637 days.

(21) Appl. No.: 13/373,421

(22) Filed: Nov. 14, 2011

Related U.S. Application Data

(63) Continuation-in-part of application No. 13/199,684, filed on Sep. 7, 2011, now Pat. No. 9,022,314, and a continuation-in-part of application No. 13/199,678, filed on Sep. 7, 2011, and a continuation-in-part of application No. 13/199,682, filed on Sep. 7, 2011, now Pat. No. 8,931,728, and a continuation-in-part of application No. 13/199,681, filed on Sep. 7, 2011, now Pat. No. 8,950,699, and a continuation-in-part of application No. 13/199,721, filed on Sep. 7, 2011, now Pat. No. 8,915,465, and a continuation-in-part of application No. 13/199,705, filed on Sep. 7, 2011, now Pat. No. 8,973,863, and a continuation-in-part of application No. 13/199,712, filed on Sep. 7, 2011, and a continuation-in-part of application No. 13/282,780, filed on Oct. 27, 2011, and a continuation-in-part of application No. 13/282,938, filed on Oct. 27, 2011, now Pat. No. 8,950,700, and a continuation-in-part of (Continued)

(51) Int. Cl.
*B64C 27/18* (2006.01)
*F02K 7/00* (2006.01)

(52) U.S. Cl.
CPC ................ *B64C 27/18* (2013.01); *F02K 7/005* (2013.01)

(58) Field of Classification Search
USPC ............. 244/6, 7 R, 7 A, 8, 17.11, 17.19, 55; 416/20 R, 21, 22; 60/39.34, 39.35
See application file for complete search history.

(56) References Cited

U.S. PATENT DOCUMENTS

| | | | | |
|---|---|---|---|---|
| 2,446,785 A * | 8/1948 | Quick | ........................... | 60/39.34 |
| 2,585,468 A * | 2/1952 | Isacco | ........................ | 244/17.11 |
| 2,601,463 A | 6/1952 | Stanley | | |
| 2,605,608 A * | 8/1952 | Barclay, Jr. | ...................... | 60/243 |
| 2,612,955 A * | 10/1952 | Tenney et al. | ................... | 416/21 |
| 2,631,676 A * | 3/1953 | Hiller, Jr. | ........................ | 416/21 |
| 2,654,995 A * | 10/1953 | Ostroff | ........................ | 60/39.281 |
| 2,673,696 A * | 3/1954 | Pullin et al. | ................. | 244/17.11 |
| 2,688,371 A * | 9/1954 | Pesaro | ............................ | 416/21 |
| 2,702,601 A * | 2/1955 | Nagler | ........................ | 416/20 R |
| 2,710,067 A * | 6/1955 | Pesaro | ............................ | 416/22 |
| 2,738,021 A * | 3/1956 | Nagler | ........................ | 416/20 R |
| 2,745,498 A * | 5/1956 | Nagler | ............................ | 416/21 |
| 2,750,131 A * | 6/1956 | Thomson | ................... | 244/17.19 |
| 2,941,600 A * | 6/1960 | Koning et al. | ................... | 416/22 |
| 2,943,685 A * | 7/1960 | Sigler et al. | ..................... | 416/22 |
| 2,949,737 A * | 8/1960 | Fletcher | ....................... | 60/39.35 |
| 3,111,992 A * | 11/1963 | Peterson | ......................... | 416/22 |
| 3,482,803 A * | 12/1969 | Lindenbaum | ................. | 244/17.11 |
| 3,699,771 A * | 10/1972 | Chelminski | .................. | 60/39.35 |
| 3,957,226 A | 5/1976 | Daggett, Jr. et al. | | |
| 4,099,671 A | 7/1978 | Leibach | | |
| 4,200,252 A | 4/1980 | Logan et al. | | |
| 5,209,430 A | 5/1993 | Wilson et al. | | |
| 5,934,873 A * | 8/1999 | Greene | ........................... | 416/22 |

(Continued)

OTHER PUBLICATIONS

John Ballard et al., An Investigation of a Stoppable Helicopter Rotor with Circulation Control NASA, Aug. 1980.

(Continued)

*Primary Examiner* — Joseph W Sanderson
(74) *Attorney, Agent, or Firm* — Pate Baird, PLLC

(57) ABSTRACT

A rotor system is disclosed for a reactive drive rotary wing aircraft. Apparatus and methods are disclosed for mounting to the rotor hub certain controls, both electrical and mechanical, as well as fuel delivery for tipjets mounted to rotor blades. Air passively or actively drawn through rotor may feed the tipjets directly through the blades, while fuel and control is delivered along the blade to the tip thereof.

5 Claims, 38 Drawing Sheets

Related U.S. Application Data application No. 13/317,751, filed on Oct. 27, 2011, now abandoned.

(60) Provisional application No. 61/466,177, filed on Mar. 22, 2011, provisional application No. 61/517,413, filed on Apr. 19, 2011, provisional application No. 61/468,964, filed on Mar. 29, 2011, provisional application No. 61/506,572, filed on Jul. 11, 2011, provisional application No. 61/519,075, filed on May 16, 2011, provisional application No. 61/519,055, filed on May 16, 2011, provisional application No. 61/532,233, filed on Sep. 8, 2011, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/403,081, filed on Sep. 9, 2010, provisional application No. 61/403,135, filed on Sep. 9, 2010, provisional application No. 61/403,113, filed on Sep. 9, 2010, provisional application No. 61/409,478, filed on Nov. 2, 2010, provisional application No. 61/409,470, filed on Nov. 2, 2010, provisional application No. 61/456,220, filed on Nov. 2, 2010.

(56) References Cited

U.S. PATENT DOCUMENTS

| | | | |
|---|---|---|---|
| 6,280,141 | B1 | 8/2001 | Rampal et al. |
| 6,352,220 | B1 | 3/2002 | Banks et al. |
| 6,885,917 | B2 | 4/2005 | Osder et al. |
| 7,147,182 | B1 | 12/2006 | Flanigan |
| 7,871,032 | B2 * | 1/2011 | Zhao et al. ............ 244/6 |
| 8,387,910 | B2 * | 3/2013 | De Champeaux et al. 244/17.11 |
| 2009/0032638 | A1 * | 2/2009 | Zhao et al. ............ 244/6 |

OTHER PUBLICATIONS

Fairey Aviation Company, The Fairey Rotodyne 40-44 Passenger Helicopter, England, May 1954.
Arthur W. Linden and James C. Biggers, X-Wing Potential for Navy Applications, estimated 1959.
Robert Sopher and James Duh, Prediction of Aeroelastic Response of a model X-Wing Rotor Sikorsky Aircraft Division, United Technologies, Feb. 19-21, 1986.
J.R. Ewans et al., Further Model Wind Tunnel Tests of a Reverse Velocity Rotor System, Fairchild Republic Company, Jul. 1975.
Fairey Aviation Limited, Fairey Rotodyne Design Z, Mar. 23, 1960.
Fairey Rotodyne Description and Drawings, estimated 1959.
Fairey Rotodyne Description Specifications, estimated 1959.
E. Wilde et al., The Flapping Behavior of a Helicopter Rotor at High Tip-Speed Rations, Ministry of Aviation, London, 1966.
Michael G. Gilbert et al., The Effects of Aeroelastic Deformation on the Unaugmented Stopped-Rotor Dynamics of an X-Wing Aircraft, NASA, Jun. 1987.
D. N. Goldstein et al., Rotorcraft convertible Engine Study, Final Report, NASA Lewis Research Center, Aug. 1983.
G. Warren Hall et al., Flight Testing the Fixed-Wing Configuration of the Rotor Systems Research Aircraft, NASA, Jun. 1985.
Gerald J. Healy, X-Wing Noise Data Acquisition Program, NASA, Feb. 1983.
G. S. Hislop, The Fairey Rotodyne, A paper to be presented to a Joint Meeting of the Helicopter Association of Great Britain, Nov. 7, 1958.
S.L. Smith, Jet Research Report, Evaluation of Rotor Power and a Comparison With Predicted Performance, May 1, 1958.
K. T. McKenzie, The Journal of The Helicopter Association of Great Britain, Aerodynamic Aspects of the Fairey Rotodyne, Dec. 1959.
M. Mosher, Acoustic Measurements of the X-Wing Rotor, NASA Technical Memorandum 94292, Ames Research Center, Moffett Field, CA, 1983.
David H. Hickey, NACA Research Memorandum, Full-Scale Wind-Tunnel Tests, National Advisory Committee for Aeronautics, May 17, 1956.
Watson H. Tanner, Charts for Estimating Rotary Wing Performance in Hover and at High Forward Speeds, NASA Contractor Report, Nov. 1964.
D.M. Martin et al, Experimental Investigation of Advance Hub and Pylon Fairing Configurations to Reduce Helicopter Drag, NASA Technical Memorandum 4540, Sep. 1993.
Franklin D. Harris et al., The XV-1's Rotor System, AHS International, Jan. 21-24, 2004.
A. Stepan, Journal of the Helicopter Association of Great Britain—vol. 13, No. 6, Dec. 1949.
A. Stepan, Journal of the Royal Aeronautical Society, London, Feb. 1958.
Fairey Rotodyne-Type 20Z 10W and Performance, Technical Publications, Project 79, Issue 2, Feb. 1959.
Fairey Aviation Company, Fairey Rotodyne, Weights and performance Index, estimated 1959.
Fairey Aviation Company, The Fairey Rotodyne 40-48 Passenger Helicopter, England, estimated 1959.
Fairey Aviation Company, The Fairey Rotodyne Design Certificate, estimated 1959.
Fairey Aviation Company, Tactical Mobility, Fairey Rotodyne for the Services, estimated 1959.
William Willshire, Rye Canyon X-Wing Noise Test: One-Third Octave Band Data, NASA Technical Memorandum, Jan. 1983.
Bruce D. Charles et al., Wind Tunnel Investigation of Semi rigid Full-Scale Rotors Operating a High Advance Ratios, U.S. Army Aviation Material Laboratories, Fort Eustis, Virginia, Jan. 1969.
Jessica Woods et al., Results of a Parametric Aeroelastic Stability Analysis of a Generic X-Wing Aircraft, NASA Technical Memorandum 101572, Apr. 1989.
Franlkin D. Harris et al., The XV-1's Rotor System, AHS International, Jan. 21-24, 2004.
S. Coham et al., XV-9A Hot Cycle Research Aircraft Program Summary Report, U.S. Army Aviation Material Laboratories, Fort Eustis, Virginia, Jun. 1966.
D. M. Martin et al, Experimental Investigation of Advance Hub and Pylon Fairing Configurations to Reduce Helicopter Drag, NASA Technical Memorandum 4540, Sep. 1993.
Franlkin D. Harris et al., An Overview of Autogyros and the McDonnell XV-1 Convertiplane, NASA/CR, Oct. 2003.

\* cited by examiner

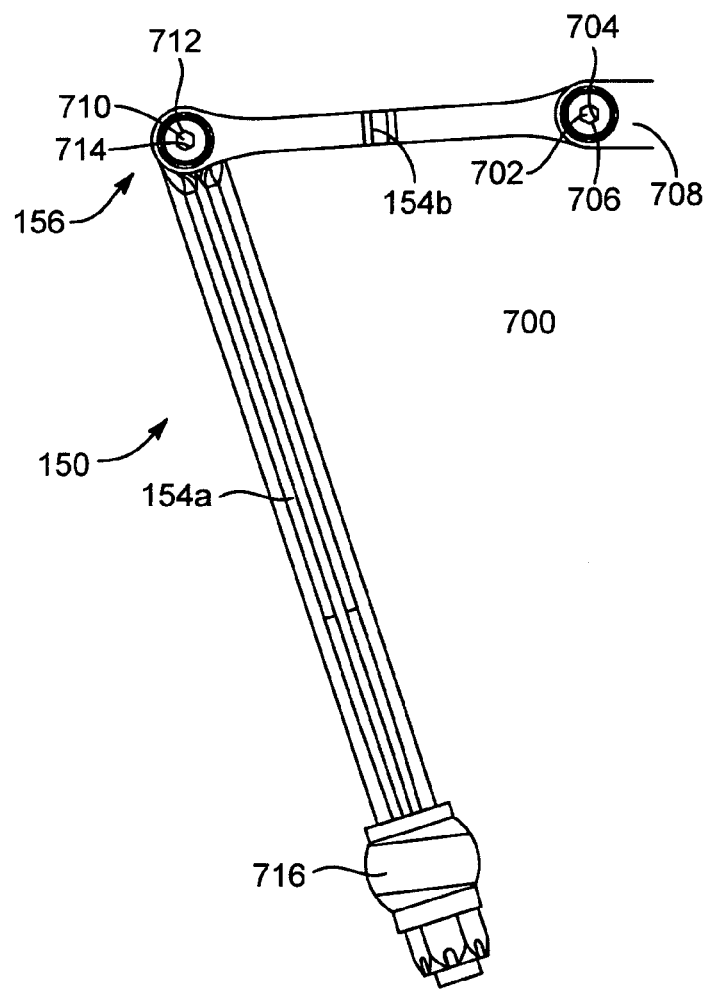
FIG. 31
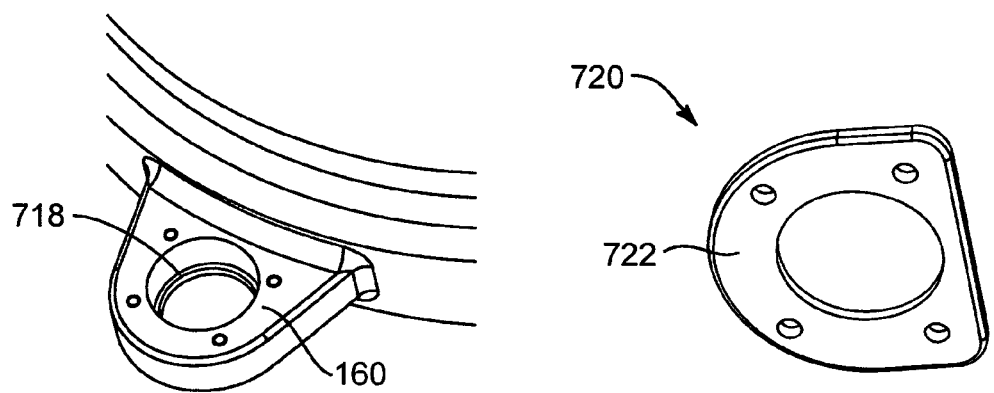
FIG. 32
FIG. 33

HUB-MOUNTED AUXILLIARY SYSTEMS FOR TIPJETS IN A REACTION DRIVE ROTOR SYSTEM

RIGHTS OF U.S. GOVERNMENT

This invention was made with Government support under Agreement No. HR0011-06-9-0002 awarded by DARPA. The Government has certain rights in the invention.

RELATED APPLICATIONS

This application claims the benefit of U.S. Provisional Patent Application Ser. No. 61/466,177, filed on Mar. 22, 2011, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on Aug. 22, 2011, U.S. Provisional Patent Application Ser. No. 61/532,233, filed on Sep. 8, 2011, U.S. patent application Ser. No. 13/199,684, filed on Sep. 7, 2011, U.S. Provisional Patent Application Ser. No. 61/403,099, filed on Sep. 9, 2010, U.S. patent application Ser. No. 13/199,678, filed on Sep. 7, 2011, U.S. Provisional Patent Application Ser. No. 61/403,097, filed on Sep. 9, 2010, U.S. patent application Ser. No. 13/199,682, filed on Sep. 7, 2011, U.S. Provisional Patent Application Ser. No. 61/381,313, filed on Sep. 9, 2010, U.S. patent application Ser. No. 13/199,681, filed on Sep. 7, 2011, U.S. Provisional Patent Application Ser. No. 61/403,111, filed on Sep. 9, 2010, U.S. patent application Ser. No. 13/199,721, filed on Sep. 7, 2011, U.S. Provisional Patent Application Ser. No. 61/403,081, filed on Sep. 9, 2010, U.S. patent application Ser. No. 13/199,705, filed on Sep. 7, 2011, U.S. Provisional Patent Application Ser. No. 61/403,135, filed on Sep. 9, 2010, U.S. patent application Ser. No. 13/199,712, filed on Sep. 7, 2011, U.S. Provisional Patent Application Ser. No. 61/403,113, filed on Sep. 9, 2010, U.S. patent application Ser. No. 13/282,780, filed on Oct. 27, 2011, U.S. Provisional Patent Application Ser. No. 61/409,478, filed on Nov. 2, 2010, U.S. patent application Ser. No. 13/282,938, filed on Oct. 27, 2011, U.S. Provisional Patent Application Ser. No. 61/409,470, filed on Nov. 2, 2010, U.S. patent application Ser. No. 13/317,751, filed on Oct. 27, 2011, and U.S. Provisional Patent Application Ser. No. 61/456,220, filed on Nov. 2, 2010, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, also known as rotorcraft, and, more particularly to rotating wing aircraft relying on autorotation of a rotor to provide lift.

2. The Background Art

Rotorcraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotorcraft in use today are helicopters. A helicopter typically includes an airframe or fuselage, housing an engine and passenger compartment, and a rotor, driven by the engine, to provide lift. Forced rotation of the rotor causes a reactive torque on the fuselage. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e. autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

Although rotorcraft provide the significant advantage of vertical takeoff and landing (VTOL), they are much more limited in their maximum flight speed than are fixed wing aircraft. The primary reason that prior rotorcraft are unable to achieve high flight speed is a phenomenon known as "retreating blade stall." As the fuselage of the rotorcraft moves in a flight direction, rotation of the rotor causes each blade thereof to be either "advancing" or "retreating."

That is, in a fixed-wing aircraft, all wings move forward in fixed relation, with the fuselage. In a rotary-wing aircraft, the fuselage moves forward with respect to the air. However, rotor blades on both sides move with respect to the fuselage. Thus, the velocity of any point on any blade is the velocity of that point, with respect to the fuselage, plus the velocity of the fuselage. A blade is advancing if it is moving in the same direction as the flight direction. A blade is retreating if it is moving opposite the flight direction.

The rotor blades are airfoils that provide lift that depends on the speed of air flow thereover. The advancing blade therefore experiences much greater lift than the retreating blade.

One technical solution to this problem is that the blades of the rotors are allowed to "flap." That is, the advancing blade is allowed to fly or flap upward in response to the increased air speed thereover such that its blade angle of attack is reduced. This reduces the lift exerted on the blade. The retreating blade experiences less air speed and tends to fly or flap downward such that its blade angle of attack is increased, which increases the lift exerted on the blade.

Flap enables rotating wing aircraft to travel in a direction perpendicular to the axis of rotation of the rotor. However, lift equalization due to flapping is limited by a phenomenon known as "retreating blade stall." As noted above, flapping of the rotor blades increases the angle of attack of the retreating blade. However, at certain higher speeds, the increase in the blade angle of attack required to equalize lift on the advancing and retreating blades results in loss of lift (stalling) of the retreating blade.

A second limit on the speed of rotorcraft is the drag at the tips of the rotor. The tip of the advancing blade is moving at a speed equal to the speed of the aircraft and relative to the air, plus the speed of the tip of the blade with respect to the aircraft. That is equal to the sum of the flight speed of the rotorcraft plus the product of the length of the blade and the angular velocity of the rotor. In helicopters, the rotor is forced to rotate in order to provide both upward lift and thrust in the direction of flight. Increasing the speed of a helicopter therefore increases the air speed at the rotor or blade tip, both because of the increased flight speed and the increased angular velocity of the rotors required to provide supporting thrust.

The air speed over the tip of the advancing blade can therefore exceed the speed of sound even though the flight speed is actually much less. As the air speed over the tip approaches the speed of sound, the drag on the blade becomes greater than the engine can overcome. In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of the rotorcraft is reverse air flow over the retreating blade. As noted above, the retreating blade is traveling opposite the flight direction with respect to the fuselage. At certain high speeds, portions of the retreating blade are moving rearward, with respect to the fuselage, slower than the flight speed of the fuselage. Accordingly, the direction of air flow over these portions of the retreating blade is reversed from that typically designed to generate positive lift. Air flow may instead generate a negative lift, or downward force, on the retreating blade. For example, if the blade angle of attack is upward with respect to wind velocity, but wind is moving over the wing in a reverse direction, the blade may experience negative lift.

The ratio of the maximum air speed of a rotorcraft to the maximum air speed of the tips of the rotor blades is known as the "advance ratio. The maximum advance ratio of rotorcraft available today is less than 0.5, which generally limits the top flight speed of rotorcraft to less than 200 miles per hour (mph). For most helicopters, that maximum achievable advance ratio is between about 0.3 and 0.4.

In view of the foregoing, it would be an advancement in the art to provide a rotating wing aircraft capable of vertical takeoff and landing and flight speeds in excess of 200 mph.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In one aspect of the invention, a rotor system includes a hub adapted to mount to a mast and to rotate about a rotor axis. A plurality of blades mount to the hub. Each has a proximal end and a distal end and is mounted to the hub proximate the proximal end thereof. A plurality of rotating lines extend from the hub to proximate the distal end of one of the plurality of blades. A plurality of tipjets are each mounted to one of the plurality of blades proximate the distal end thereof. The tipjets each include an igniter and fuel injector. One or both of a fuel pumps and exciters are mounted to the hub at the base of each blade. The rotating lines couple one or both of the fuel pumps and exciters to the fuel injectors and igniters, respectively, of the tip jets.

In another aspect of the invention, fuel filters are also mounted to the hub in fluid communication with the fuel pumps.

In another aspect of the invention, a rotary coupler couples non-rotating lines to the non-rotating lines. The non-rotating lines transmit control signals through the rotary coupler to the non-rotating lines. The rotary coupler may include one or both of an hydraulic rotary union and a slip ring assembly.

In another aspect of the invention, the tipjets include one or more exhaust flaps. Cable actuators secure to the hub or blades and control movement of the exhaust flaps. The cable actuators may be controlled by an electrical line extending from a slip ring assembly. Cables extending from the cable actuators to the exhaust flaps may be intersected by the neutral bending plane of the blade in response to coning and flapping loads.

A rotorcraft including the above-described rotor system and a method for operating the rotor system are also disclosed and claimed herein.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 31 is a side elevation view of a rotating stabilizer linkage having interfaces suitable for application of a solid lubricant in accordance with an embodiment of the present invention;

FIG. 32 is an isometric view of a spherical bearing seat in a linkage mount suitable for application of a solid lubricant in accordance with an embodiment of the present invention;

FIG. 33 is a retaining ring for a spherical bearing suitable for application of a solid lubricant in accordance with an embodiment of the present invention;

DETAILED DESCRIPTION OF THE PREFERRED EMBODIMENTS

Figure 1:
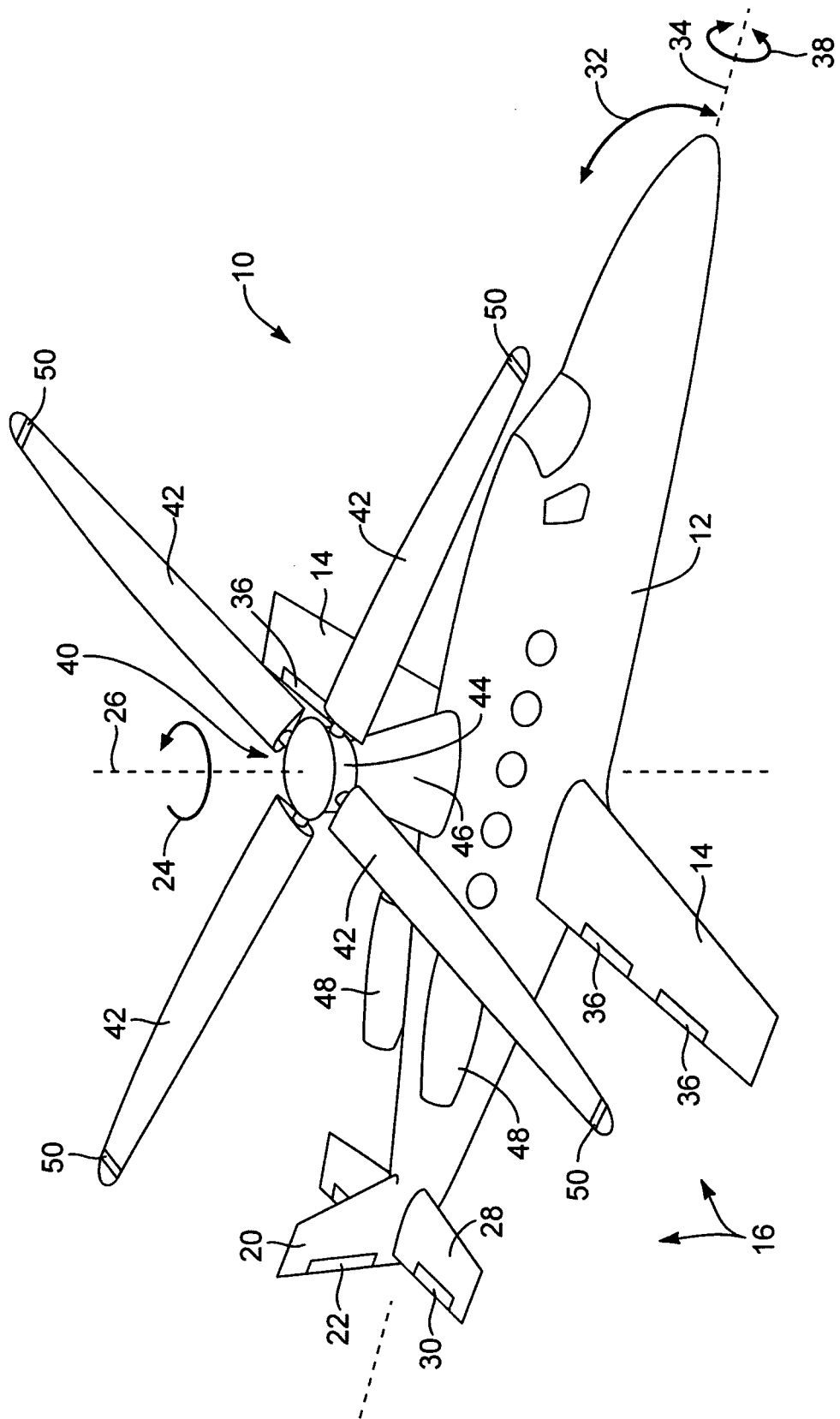
FIG. 1 is an isometric view of an aircraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an aircraft 10 includes a fuselage 12 or airframe 12 defining a cabin for carrying an operator, passengers, cargo, or the like. The airframe 12 may include one or more fixed wings 14 shaped as airfoils for providing lift to the aircraft. The wings 14 may be configured such that they provide sufficient lift to overcome the weight of the aircraft 10 only at comparatively high speeds inasmuch as the aircraft 10 is capable of vertical takeoff and landing (VTOL) and does not need lift from the fixed wings 14 at low speeds, e.g. below 50 mph or even 100 mph upon taking off.

In this manner, the wings 14 may be made smaller than those of fixed wing aircraft requiring a high velocity takeoff, which results in lower drag at higher velocities.

In some embodiments the wings 14 provide sufficient lift to support at least 50 percent, preferably 90 percent, of the weight of the aircraft 10 at air speeds above 200 mph.

Control surfaces 16 may secure to one or both of the airframe 12 and wings 14. For example a tail structure 18 may include one or more vertical stabilizers 20 and one or more rudders 22. The rudders 22 may be adjustable as known in the art to control the yaw 24 of the aircraft 10 during flight. As known in the art, yaw 24 is defined as rotation about a vertical axis 26 of the aircraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable as known in the art to alter the pitch 32 of the aircraft 10. As known in the art, pitch 32 is defined as rotation in a plane containing the vertical axis 26 and a longitudinal axis 34 of the airframe of an aircraft 10. In the illustrated embodiment, the elevator 30 is a hinged portion of the horizontal stabilizer 28. In some embodiments, twin rudders 22 may be positioned at an angle relative to the vertical axis 26 and serve both to adjust the yaw 24 and pitch 32 of the aircraft 10.

The control surfaces 16 may also include ailerons 36 on the wings 14. As known in the art, ailerons 36 are used to control roll 38 of the airplane. As known in the art, roll 38 is defined as rotation about the longitudinal axis 34 of the aircraft 10.

Lift during vertical takeoff and landing and for augmenting lift of the wings 14 during flight is provided by a rotor 40 comprising a number of individual blades 42. The blades are mounted to a rotor hub 44. The hub 44 is coupled to a mast 46 which couples the rotor hub 44 to the airframe 12. The rotor 40 may be selectively powered by one or more engines 48 housed in the airframe 12, or adjacent nacelles, and coupled to the rotor 40. In some embodiments, jets 50 located at or near the tips of the blades 42 power the rotor 40 during takeoff, landing, hovering, or when the flight speed of the aircraft is insufficient to provide sufficient autorotation to develop needed lift.

Figure 2:
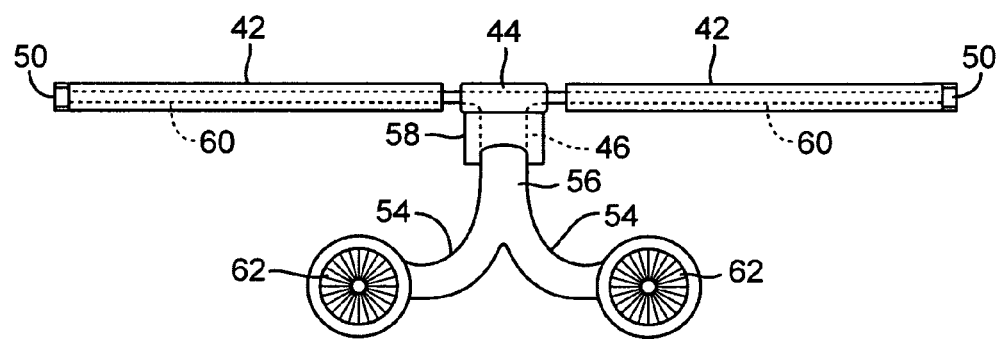
FIG. 2 is a front elevation view of a compressed or otherwise pressurized air supply for a tip jet in accordance with an embodiment of the present invention.

Referring to FIG. 2, while still referring to FIG. 1, in the illustrated embodiment, the engines 48 may be embodied as jet engines 48 that provide thrust during flight of the aircraft. The jet engines 48 may additionally supply compressed air to the jets 46 by driving a bypass turbine 62 or auxiliary compressor. Air compressed by the bypass turbine 62 may be transmitted through ducts 54 to a plenum 56 in fluid communication with the ducts 54.

The plenum 56 is in fluid communication with the mast 46 that is hollow or has another passage to provide for air conduction. A mast shroud 58 positioned around the mast 46 may provide one or both of an air channel and a low drag profile for the mast 46. The mast 46 or mast shroud 58 is in fluid communication with the rotor hub 44. The rotor hub 44 is in fluid communication with blade ducts 60 extending longitudinally through the blades 42 to feed the tip jets 50.

Figure 3A:
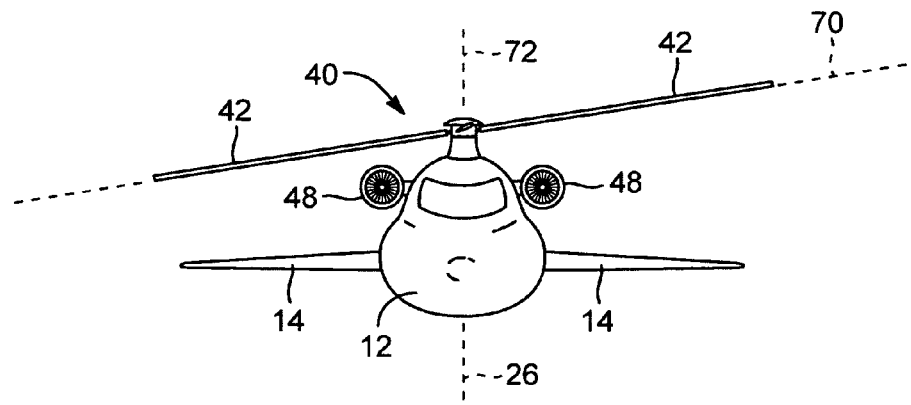
FIG. 3A is a front elevation view of a rotorcraft illustrating operational parameters describing a rotor configuration suitable for use in embodiments of an apparatus and method in accordance with the present invention, and the system of FIGS. 1 and 2 in particular.
Figure 3B:
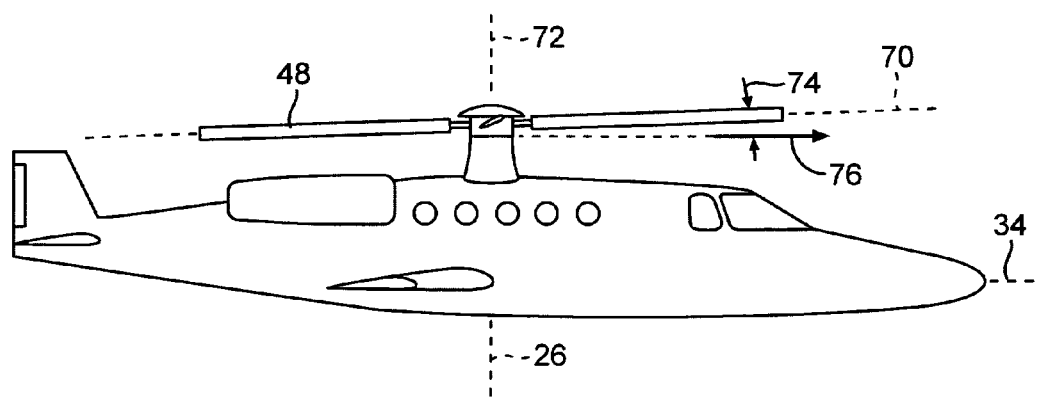
FIG. 3B is a right side elevation view of the rotorcraft of FIG. 3A.
Figure 3C:
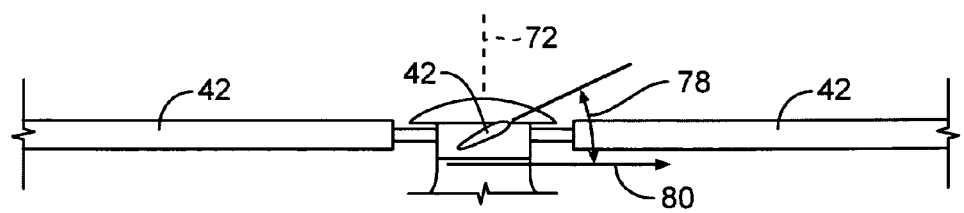
FIG. 3C is a partial cut of a right side elevation view of the rotor of FIG. 3A.

Referring to FIGS. 3A-3C, rotation of the rotor 40 about its axis of rotation 72 occurs in a rotor disc 70 that is generally planar but may be contoured due to flexing of the blades 42 during flight. In general, the rotor disc 70 may be defined as a plane in which the tips of the blades 42 travel. Inasmuch as the blades 42 flap cyclically upward and downward due to changes in lift while advancing and retreating, the rotor disc 70 is angled with respect to the axis of rotation 72 when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the angle of attack 74 or rotor disk angle of attack 74. For purposes of this application, flight direction 76 and air speed refer to the direction and speed, respectively, of the airframe 12 of the aircraft 10 relative to surrounding air. In autogyro systems, the angle of attack 74 of the rotor disc 70 is generally positive in order to achieve autorotation of the rotor 40, which in turn generates lift.

Referring to FIG. 3C, the surfaces of the blades 42, and particularly the chord of each blade 42, define a pitch angle 78, or blade angle of attack 78, relative to the direction of movement 80 of the blades 42. In general, a higher pitch angle 78 will result in more lift and higher drag on the blade up to the point where stalling occurs, at which point lift has declined below a value necessary to sustain flight. The pitch angle 78 of the blade 42 may be controlled by both cyclic and collective pitch control as known in the art of rotary wing aircraft design.

Figure 4A:
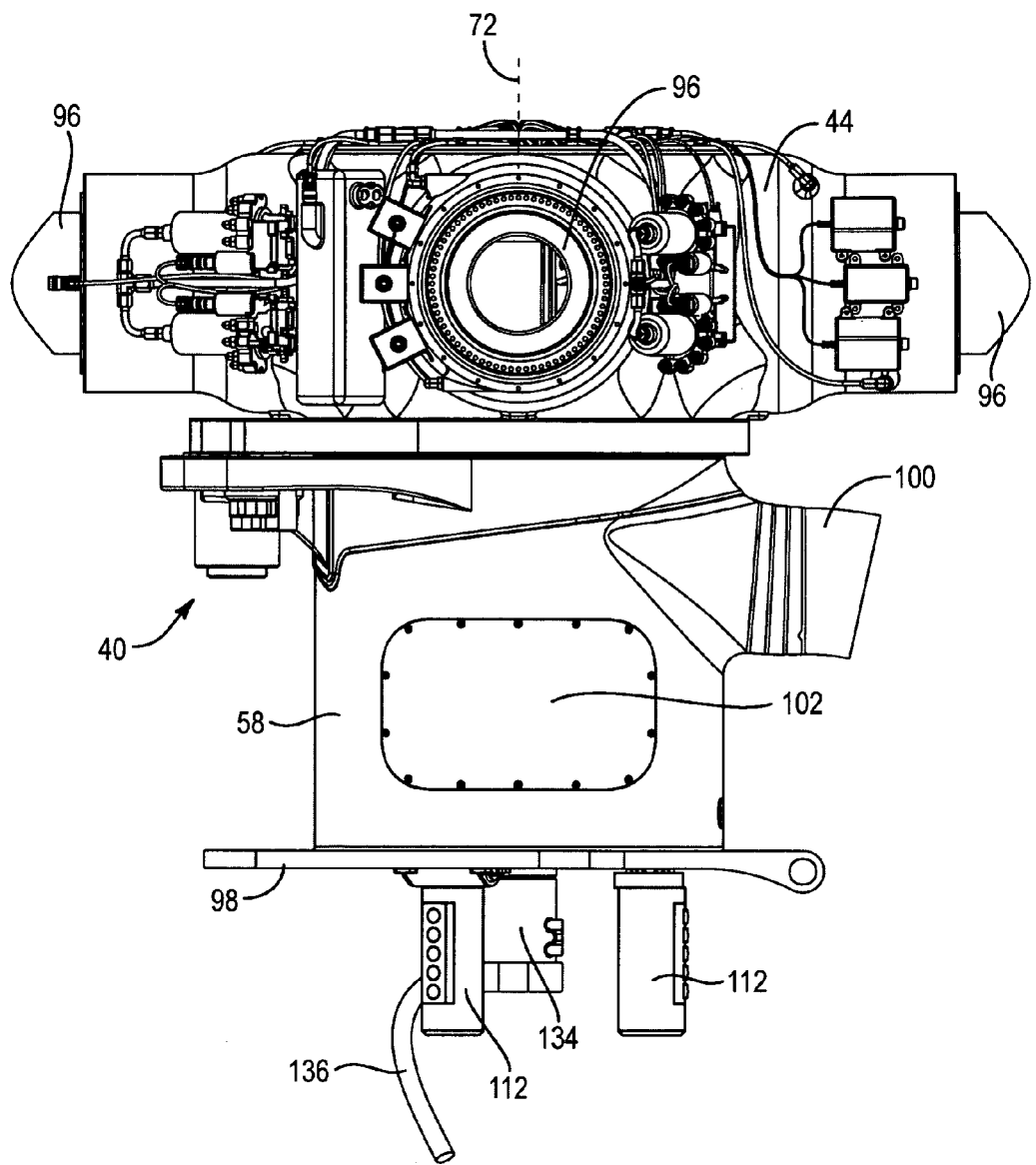
FIG. 4A is a side elevation view of an embodiment of a rotor in accordance with the present invention.
Figure 4B:
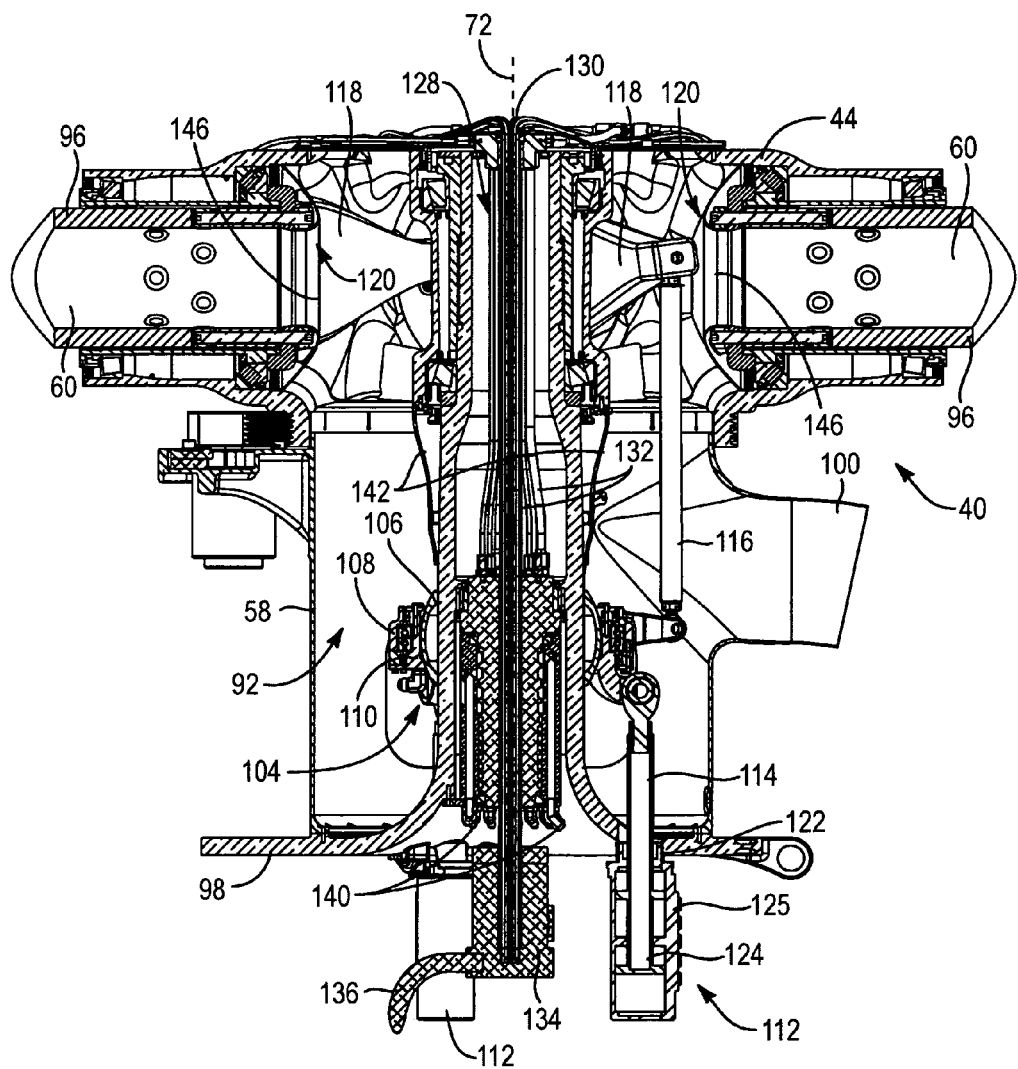
FIG. 4B is a side elevation cross-sectional view of an embodiment of a rotor in accordance with the invention.
Figure 4C:
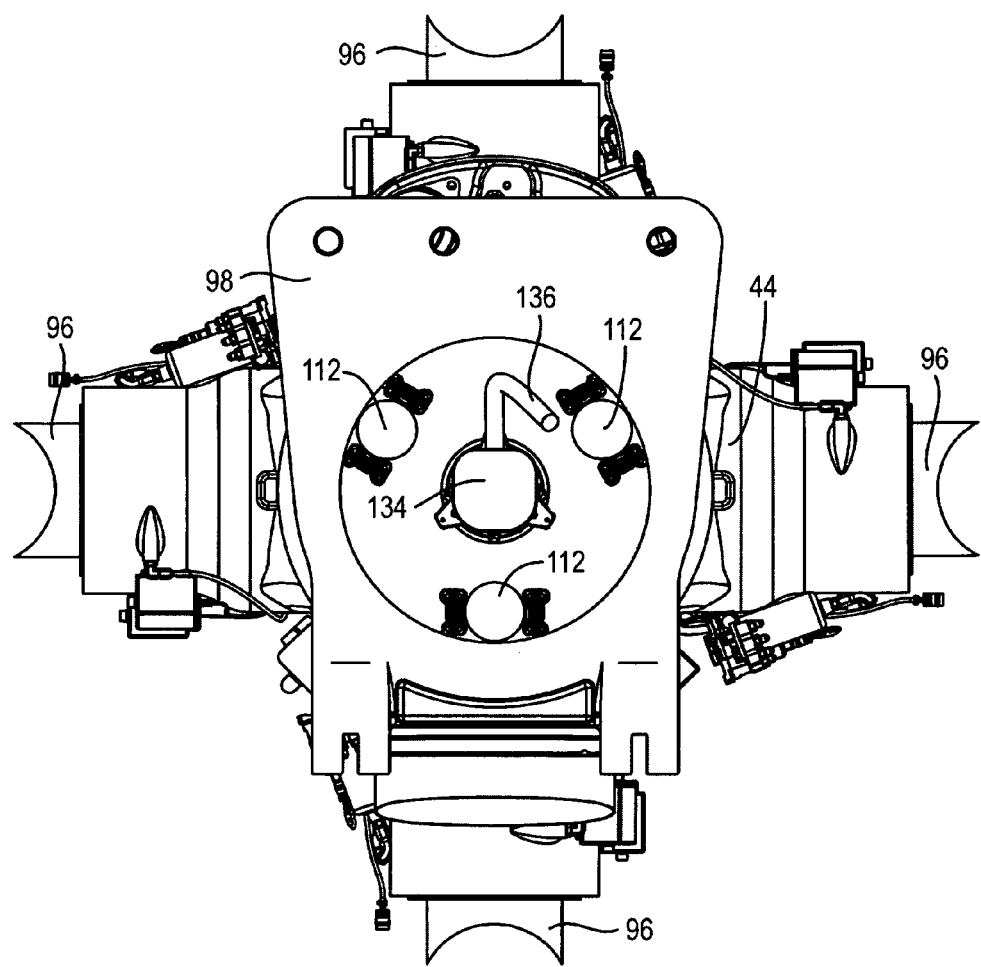
FIG. 4C is a bottom plan view of an embodiment of a rotor in accordance with the present invention.

Referring to FIGS. 4A through 4C, the mast shroud 58 encircles the mast 46 such that the shroud and mast define an annular air channel 92. In an alternative embodiment, the air channel 92 passes through the center of the mast 46. The hub 44 defines a cavity 94 in fluid communication with the air channel 92. The blade ducts 60 are in fluid communication with the cavity 94 enabling air flow from the air channel 92 through the cavity 94 and blade ducts 60 to the tip jets 50. In the illustrated embodiment, the blades 42 define a hollow blade spar 96 extending through the hub 44 into the cavity 94 and the blade duct 60 is embodied as a hollow channel extending longitudinally through the blade spar 96.

A mast flange 98 may be rigidly secured to, or formed monolithically with the mast 46. The shroud may create a substantially continuous barrier to air flow between the hub 44 and the mast flange 46, but for an inlet 100 coupled to the plenum 56. By substantially continuous barrier to air flow, what is meant is that the shroud ensures that at least 90%, preferably at least 95%, of all air entering the air channel 92 from the plenum 56 passes into the cavity 94 of the hub 44. The shroud may additionally include one or more sealed hatches 102 that are selectively openable to service internal components of the rotor 40 without requiring removal of the entire mast shroud 58.

Referring specifically to FIG. 4B, the one or more hatches 102 may be located adjacent a swashplate 104 that encircles the mast 46 to facilitate servicing of the swashplate 104. The swashplate 104 may engage a spherical bearing 106 or gimbal slidingly mounted to the mast 46. The swashplate 104 includes a rotating ring 108 and a non-rotating ring 110 rotatably secured to one another. The swashplate 104 may encircle the mast 46 between the hub 44 and the mast flange 98. The non-rotating ring 110 is coupled to swashplate actuators 112, such as by means of actuator rods 114. The rotating ring 108 is coupled to the blade spars 96, such as by means of pitch horns 118 coupled near proximal ends 120 of the blade spars 96 and pitch control rods 116 connecting the pitch horns 118 to the rotating ring 108. The swashplate actuators 112 are selectively actuated to raise and lower the swashplate 104 and spherical bearing 106 in order to change the pitch angles 78 of all of the blades 42 by a uniform amount, i.e., the collective pitch of the blades 42. The swashplate actuators 112 are also selectively actuated to change the angle of the swashplate 104 in order to change the amplitude and phase of cyclic variation of the pitch angles 78, i.e., cyclic pitch, of the blades 42 as they rotate around the mast 46. The swashplate actuators 112 may be selectively activated to change the collective and cyclic pitch simultaneously.

The swashplate actuators 112 are rigidly mounted to the mast 46, such as by rigidly mounting the swashplate actuators 112 to the mast flange 98. In the illustrated embodiment, the swashplate actuators 112 are secured on an opposite side of the flange 98 as the swashplate 104 and the mast flange 98 defines apertures 122 permitting the actuator rods 114 to pass from the swashplate actuator 112 to the swashplate 104. The swashplate actuators 112 may be embodied as hydraulic pistons 124 and cylinders 126.

Referring specifically to FIG. 4C, in the illustrated embodiment, three swashplate actuators 112 secure to the flange 98 inasmuch as three independent points are sufficient to define any plane, i.e., any orientation of the swashplate 104. The swashplates 112 may be distributed at equal or unequal angular intervals around the axis of rotation 72 of the hub 44 and may be located at equal or unequal distances from the axis of rotation of the hub 44.

Referring again to FIG. 4B, a central channel 128 may extend through both the mast 46 and the mast flange 98. A plurality of electrical lines 130 and fluid lines 132, such as oil and fuel lines, may pass through the central channel 128. The lines 130, 132 may couple to the hub 44 or structures fixedly mounted to the hub 44. Accordingly, the lines 130, 132 may rotate with the hub 44. The electrical lines 130 may couple to a slip ring assembly 134 coupling signals from stationary lines 136 to the rotating electrical lines 130. In a like manner, a hydraulic rotary union 138 may couple stationary fluid ports 140 to the rotating fluid lines 132. In some embodiments, the fluid lines 132 are one or both of covered with steel braiding and positioned within insulating conduits within the central channel 128 to protect fluids from exposure to the electrical lines 130.

The air channel 92 enables the flow of air from the inlet 100 to the cavity 94 and into the blade ducts 60. In some embodiments, structures of the rotor 40 include fairings to reduce drag on moving components and pressure losses incurred on air moving from the inlet 100 to the blade ducts. For example, a mast fairing 142 may secure to the hub 44 and encircle that mast 46. The mast fairing 142 extends along the mast 46 and has a contour effective to reduce pressure losses in air flowing from along the mast 46 to along the hub 44. For example, the mast fairing may have an outer surface 144 that decreases smoothly in diameter with distance from the hub 44 along the axis of rotation 72. By smoothly, what is meant is that the slope of the change in outer diameter with distance from the hub 44 along the axis of rotation 72 does not exceed 1.0, except for possibly discontinuities at the upper and lower edges of the mast fairing 142. In some embodiments, the mast fairing 142 is fixed to the mast and the hub 44 is free to rotate relative to the mast fairing 142.

Pressure losses in airflow from the cavity 94 to the blade ducts 60 may also be reduced by means of a blade duct fairing 146 covering the proximal end 120 of the blade spar 96. The blade duct fairing 146 defines a "bell mouth" as known in the art of aerodynamics. The blade duct fairing 146 may define an aperture 148 through which the pitch horns 118 protrude.

Figure 5:
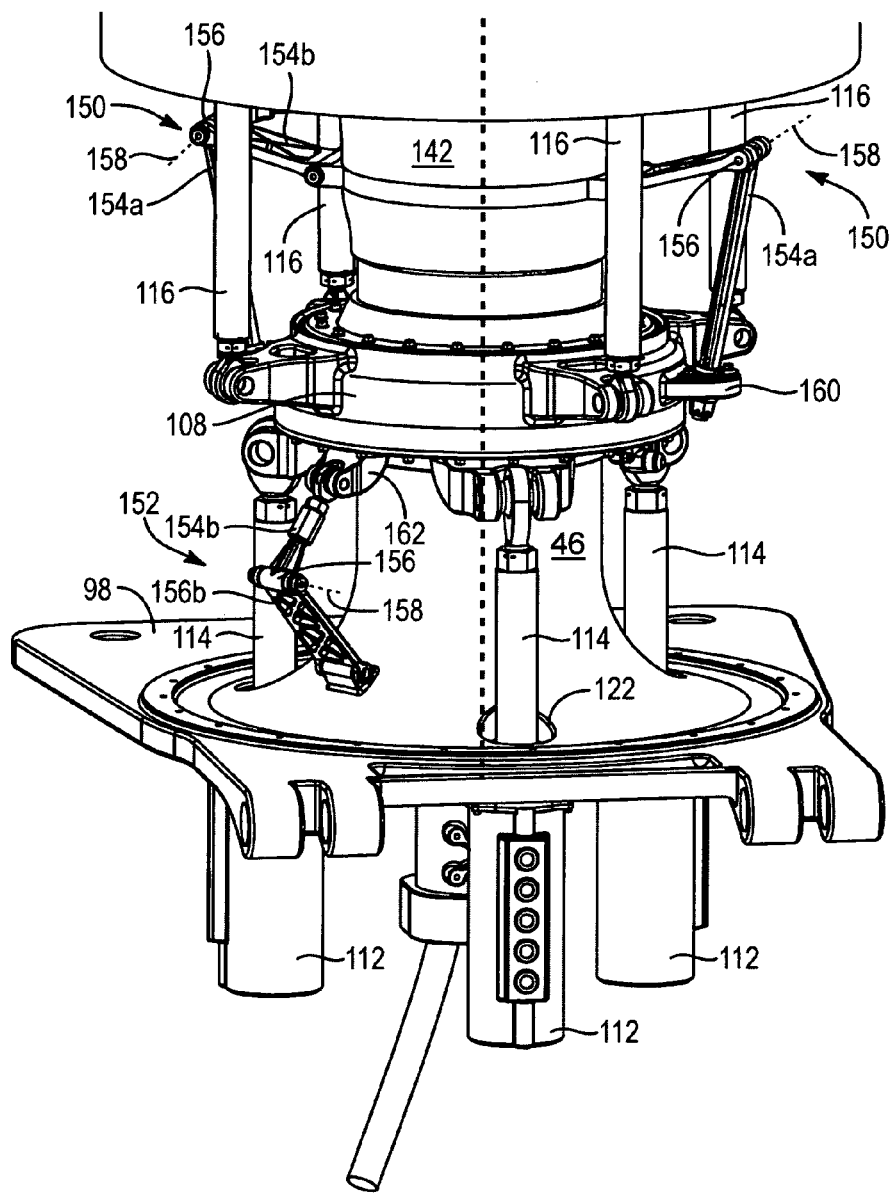
FIG. 5 is a partial isometric view of an embodiment of a rotor in accordance with the present invention.

FIG. 5 illustrates an isometric view of the swashplate 104. In addition to the pitch control rods 116 and actuator rods 114 coupled to the rotating and non-rotating rings 108, 110, respectively, rotating stabilizer linkages 150 and non-rotating stabilizer linkages 152 may secure to the rotating and non-rotating rings 108, 110, respectively. The linkage 150 hinders rotation of the rotating ring 108 relative to the hub 44 while still permitting vertical movement of the rotating ring 108 relative to the hub 44. Likewise, the linkage 152 hinders rotation of the non-rotating ring 110 relative to the swashplate actuators 112. The linkages 150, 152 may each comprise a leg 154a coupled to the rotating ring 108 and non-rotating ring 110, respectively, and a leg 154b coupled to the hub 44 and mast 46, respectively. In the illustrated embodiment, the leg 154b of the linkage 150 is mounted to the mast fairing 142 secured to the hub 44 and the leg 154b of the linkage 152 is mounted to the mast flange 98.

The legs 154a, 154b are coupled to one another by a hinge 156 defining a pivoting axis 158 that is perpendicular to the axis of rotation 72 of the hub 44 and tangent to a circle centered on the axis of rotation 72 of the hub 44. The linkages 150, 152 reduce torque on the pitch control rods 116 and actuator rods 114 which are oriented vertically and are not well suited to bear such loads without hindering their ability to move freely in response to actuator inputs.

The rotating ring 108 may have one or more linkage mounts 160 secured thereto, or formed monolithically therewith. The legs 154a of one or more linkages 150 may secure to the linkage mounts 160, such as by means of a spherical joint. The non-rotating ring may likewise have one or more linkage mounts 162 secured thereto, or formed monolithically therewith. The legs 154a of one or more linkages 152 may secure to the linkage mounts 162, such as by means of a spherical joint.

Figure 6:
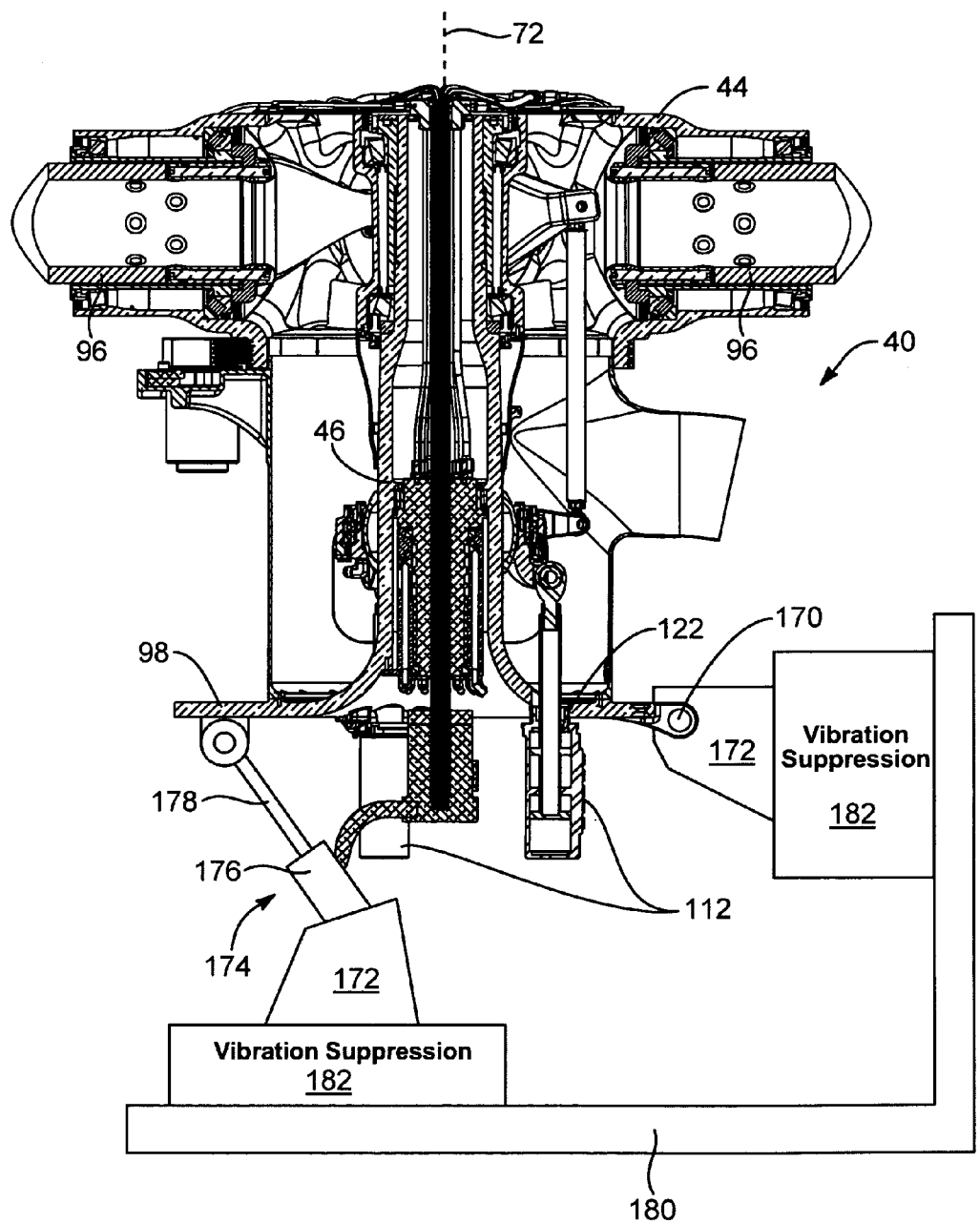
FIG. 6 is a side elevation cross-sectional view of an embodiment of a rotor and mounting system in accordance with the present invention.

Referring to FIG. 6, the mast flange 98 may include a pivot 170 pivotally secured to a mount 172 enabling changing of the angle of attach 74 of the rotor disc 70. An actuator 174 may secure to a mount 172 and flange 98 for changing the pitch of the hub 44 and 46. The actuator 174 may be embodied as a hydraulic cylinder 176 and piston 178 having one of the cylinder 176 and piston 178 coupled to the flange 98 and the other of the hydraulic cylinder 176 and piston 178 coupled to the mount 172. The actuator 174 and pivot 170 may secure to separate mounts 172 or may be attached to the same mount 172. The one or more mounts 172 are secured to a structural member 180 of the fuselage 12 by means of one or more vibration suppression devices 182 or dampers 182.

The above described arrangement of the pivot 170, actuator 174, mount 172, and vibration suppression 182 in conjunction with the mounting of the swashplate actuators 112 to the mast 46, such as the mast flange 98, provide a rotor 40 that is exceptionally rigid with very little play or slop between the blades 42 and the mast 46 and between the pitch horns 118 and the swashplate actuators 112. Due to the rigidity of the rotor 40, the frequency response of the rotor 40 in the same range of frequencies as the cyclic loads on the rotor 40 induced by cyclic variation in lift on the blades 42 may be damped, rather than resonant. For high speed flight, the frequency of rotation of the blades 42 is generally reduced to a minimum frequency of rotation in order to avoid the problems mentioned hereinabove that occur at high advance ratios such as retreating blade stall and high tip speed mach numbers. Reduction of rotation frequency may also facilitate equalization of roll moments exerted by the blades 42 as described in U.S. Prov. Pat. App. Ser. No. 61/403,136, filed Sep. 9, 2010, and entitled ROLL MOMENT EQUALIZATION AT HIGH ADVANCE RATIOS. Accordingly, low frequency cyclic loading may occur with large amplitudes during high speed flight. The rigidity of the rotor system described hereinabove, increases the harmonic frequencies of the rotor in order to reduce the risk of destructive resonance for low rotational frequencies during high speed flight. The rigidity of the coupling between the swashplate actuators 112 and the pitch horns 118 likewise enables very precise control of collective and cyclic pitch and raises harmonic frequencies of the linkage between the swashplate actuators 112 and the pitch horns 118 in order to avoid destructive resonances during high speed flight.

Figure 7:
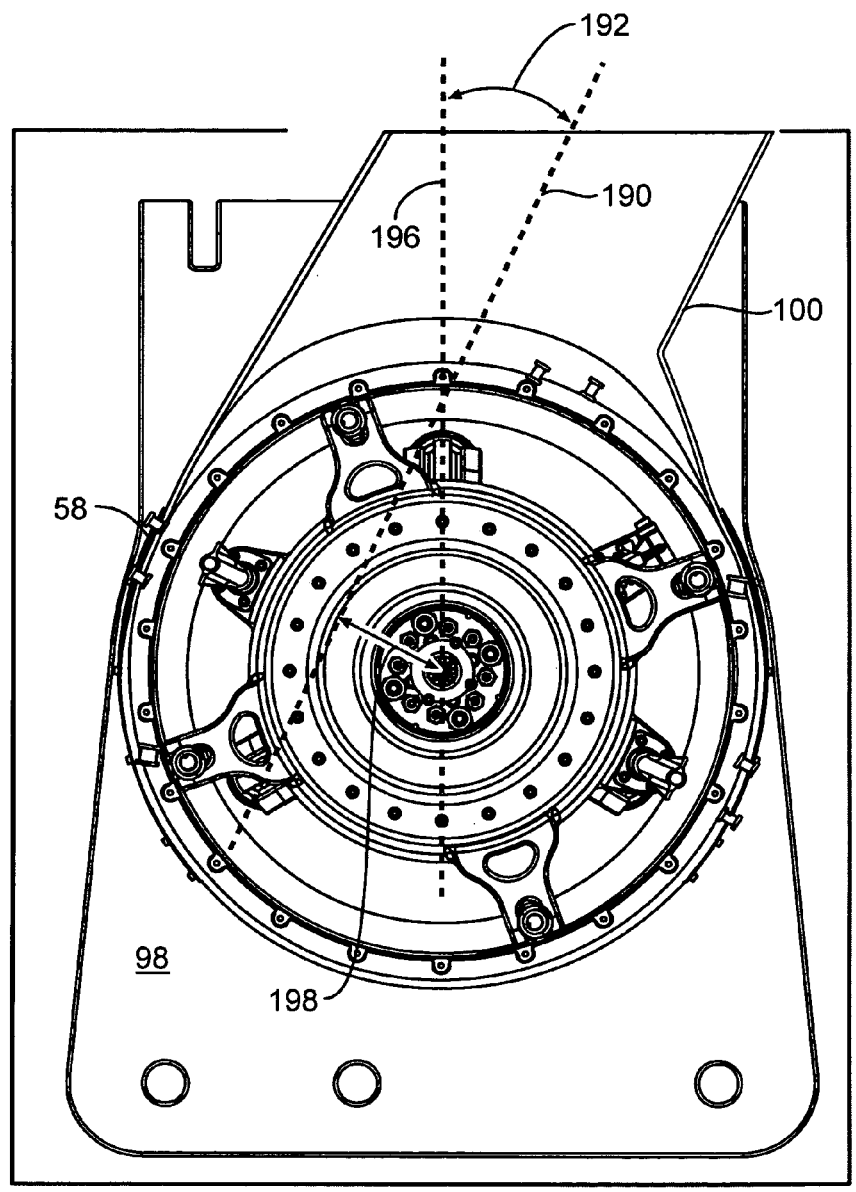
FIG. 7 is a top cross-sectional view of an embodiment of a rotor having an angled air inlet in accordance with the present invention.

Referring to FIG. 7, in some embodiments, the inlet 100 defines a center axis 190 having a non-zero angle 192 with respect to the vertical plane 196 containing the vertical axis 26 and longitudinal axis 34 of the aircraft 10. In some embodiments the angle is between 5 and 45 degrees, preferably between 10 and 30 degrees. In some embodiments, the extension of the center axis 190 of the inlet across the air channel 92 is offset a distance 198 from the axis of rotation 72 of the hub 44 at its point of greatest proximity to the axis of rotation 72. The distance 190 may be between may be between 5 and 40 percent, preferably between 15 and 35 percent of the diameter of the shroud 58. In some embodiments, one or both of the angle 192 and offset distance 190 may be chosen effective to reduce the pressure losses of air flowing through the air channel 92 and cavity 94 by between five percent and fifty percent, preferably between twenty and fifty percent.

As a result of the angle 192 and/or offset distance 198, air flow 196 within the inlet 100 will be forced to rotate within the annular air channel 92 defined between the mast 46 and the mast shroud 58. During operation, the rotor 40 includes a number of rotating components including the pitch control rods 116, rotating ring 108, stabilizer linkages hub 44, and pitch horns 118, that are rotating at high speeds. Due to the rotational velocity of the air within the inlet, the relative air speed between the air flow 196 and the rotating components of the rotor 40 is reduced, provided the rotational velocity of the air flow 196 is in the same direction as the tangential velocity of the rotating components of the rotor 40. Accordingly, drag on the rotating components and pressure losses of the air flow 196 over the rotating components, which are proportional to the relative velocity squared, will be reduced. Pressure losses of the air flow 196 will also be reduced inasmuch as the air entering the air channel 92 from the inlet 100 is not required to make a 90 degree turn, which is very aerodynamically inefficient. In some embodiments, one or both of the angle 192 and offset distance 190 may be chosen effective to reduce pressure losses of air flowing through the air channel 92 and cavity 94 by between five percent and twenty percent, preferably between ten percent and thirty percent.

In some embodiments, the inlet 100 may have curved walls such that a center axis is not readily identified. In such embodiments, and in embodiments having a generally straight inlet 100, the contour and orientation of the inlet 100 may be such that air from the inlet 100 flowing through the air channel 92 while the tip jets 50 are ignited has an average angular velocity that is in the same direction as the angular velocity of the hub and has a magnitude greater than 50 percent, preferably greater than 80 percent, of the magnitude of the angular velocity of the hub 44.

Figure 8:
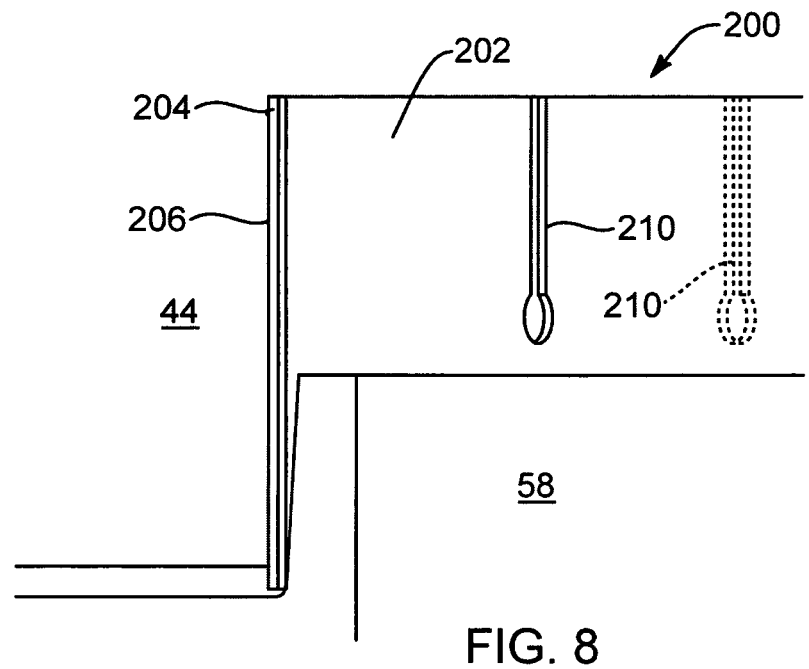
FIG. 8 is a side elevation cross-sectional view of an embodiment of a hub-shroud seal for a rotor in accordance with the present invention.

Referring to FIG. 8, in order to reduce pressure losses due to air leakage, a seal 200 may be secured to one of the hub 44 and shroud 58. The seal 202 may include a ring 202 of flexible material secured to one of the hub 44 and mast shroud 58 and overlapping a portion of the other of the hub 44 and the mast shroud 58. In the illustrated embodiment, the ring 202 secures to an outer surface 204 of the mast shroud 58 and overlaps an inner surface 206 of the hub 44. When pressurized air is within the air channel 92, the ring 202 is urged against the inner surface. 206 of the hub 44 and hinders air leakage.

In some embodiments, the ring 202 is an inner ring 202 and the seal 200 includes an outer ring 208. The inner and outer rings 202, 208 may include cuts 210 enabling the rings 202, 208 to flair outwardly in response to air pressure within the shroud 58. The cuts 210 of the inner ring 202 may be offset from the cuts 210 of the outer ring 208 such that air flow through aligned cuts 210 is prevented. The rings 202, 208 may be made of a flexible polymer with high wear resistance or coated with a wear resistant material. For example, the rings 202, 208 may be made of wear resistant polymer.

Figure 9:
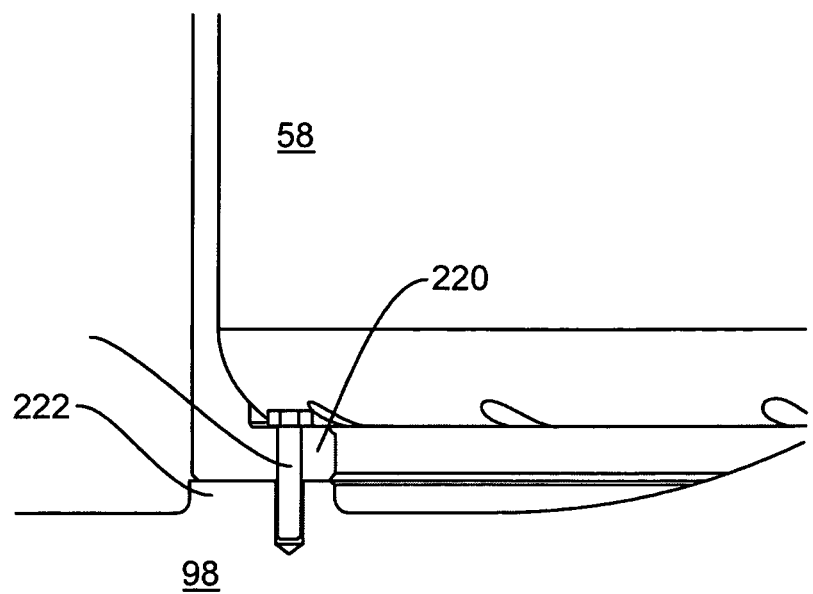
FIG. 9 is a side elevation cross-sectional view of an embodiment of a shroud-mast flange seal for a rotor in accordance with the present invention.

Referring to FIG. 9, air leakage between the mast shroud 58 and the mast 46 may be hindered by a flange 220 secured to, or formed monolithically with, the mast shroud 58 and encircling the mast shroud 58. The flange 220 is secured to a seat 222 formed on the mast flange 98. A seal or sealant material may be interposed between the flange 220 and seat 222. Alternatively, mating surfaces of the flange 220 and seat 222 may be polished sufficiently to create an adequate seal. Fasteners 224, such as screws or bolts, distributed circumferentially around the flange 200 may engage the flange 220 and seat 222 to secure the flange 220 to the seat 222 and promote creation of a seal therebetween. In an alternative embodiment, a flange secured to, or formed monolithically with, the mast flange and projecting upwardly from the mast flange 98 may secure to the shroud 58 and the seat 22 and flange 220 may be omitted.

Figure 10:
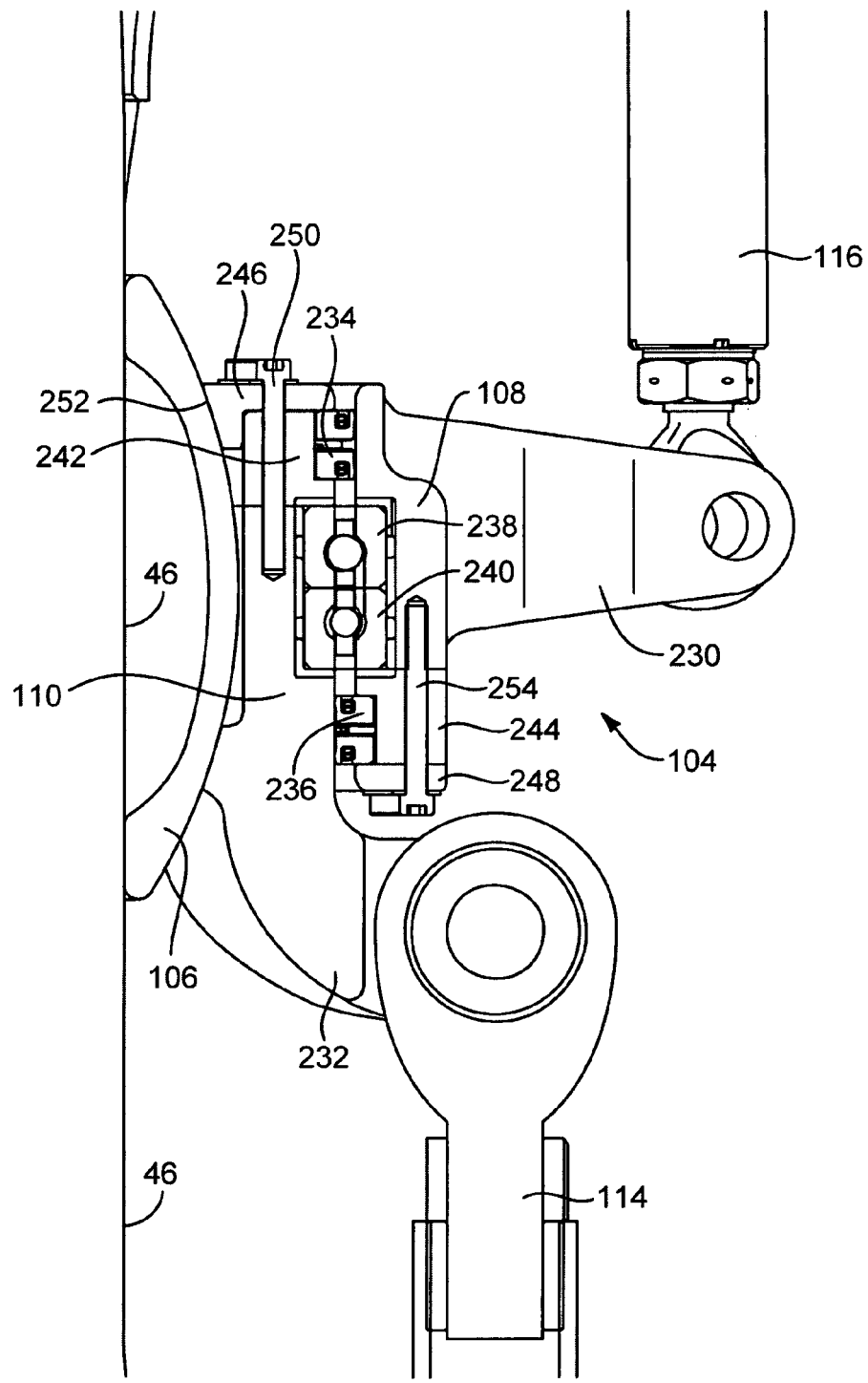
FIG. 10 is a side elevation cross-sectional view of an embodiment of a swashplate for a rotor in accordance with the present invention.

FIG. 10 is a side elevation cross-sectional view of a swashplate 104. As noted above, the swashplate 104 includes a rotating ring 108 and a non-rotating ring 110. The non-rotating ring 110 is mounted to a spherical bearing 106 that is slidably mounted to the mast 46. In the illustrated embodiment, the rotating ring 108 includes pitch control rod mounts 230 secured to or monolithically formed therewith and pivotally secured to the pitch control rods 116. Likewise, the non-rotating ring 110 includes actuator rod mounts 232 secured there to or monolithically formed therewith. The actuator rods 114 pivotally secure to the actuator rod mounts 232.

An upper seal 234 and a lower seal 236 are interposed between the rotating ring 108 and the non-rotating ring 110. One or two bearings 238, 240 may likewise be interposed between the rotating ring 108 and the non-rotating ring 110. The seals 234, 236 may be positioned within seal seats 242, 244, respectively. The seats 242, 244 may be embodied as separate members secured to the non-rotating ring 110 and rotating ring 108, respectively. In the illustrated embodiments, the seat 242 also capture a portion of the bearings 238, 240 between itself and the non-rotating ring 110. In a like manner, the seat 244 captures a portion of the bearings 238, 240 between itself and the rotating ring 108.

An upper clamping ring 246 captures the seal 234 between itself and the seat 242. Likewise, a lower clamping ring 248 captures the seal 236 between itself and the seat 244. The upper clamping ring 246 may be secured to the seat 242 by means of fasteners 250, such as screws, bolts, or the like. The fasteners 250 may extend through both the upper clamping ring 246 and the seat 242 and fasten to the non-rotating ring 110 thereby securing both the clamping ring 246 and the seat 242 to the non-rotating ring 110. The upper clamping ring 246 may additionally capture the spherical bearing 106 between itself and the non-rotating ring 110. The upper clamping ring 246 may define a spherical bearing seat 252 having a spherical contour for engaging the spherical bearing 106. In a like manner, fasteners 254 may secure the lower clamping ring 248 to the seat 244 and may pass through both the lower clamping ring 248 and the seat 244 and secure to the rotating ring 108, thereby securing both the lower clamping ring 248 and the seat 244 to the rotating ring 108. A sealing material, such as a polymer gasket, may be positioned between the upper clamping ring 246 and the seat 242 and between the lower clamping ring 248 and the seat 244 to create a seal therebetween hindering the leakage of oil.

Figure 11:
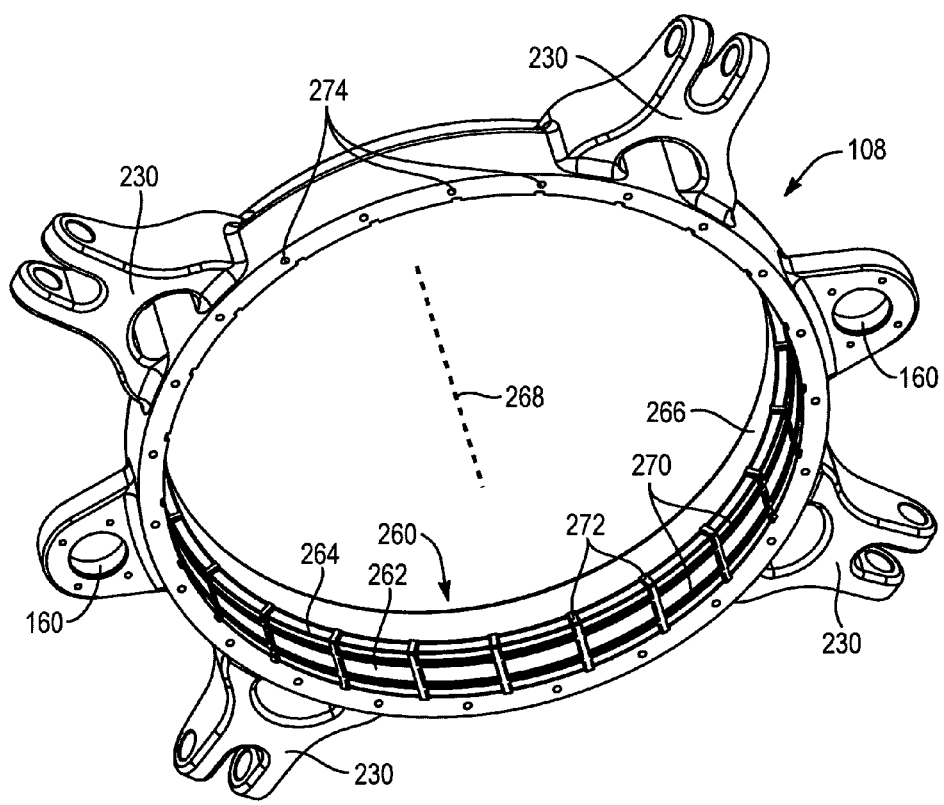
FIG. 11 is an isometric view of a rotating ring of an embodiment of a swashplate for a rotor in accordance with the present invention.

Referring to FIG. 11, the rotating ring 108 defines a bearing seat 260 sized to receive a portion of the bearings 238, 240. The bearing seat 260 may be embodied as an inward facing cylindrical wall 262 and a radial wall 264 extending radially inward from one edge of the cylindrical wall 262. The bearings 238, 240 may be captured within the bearing seat 260 by means of the seal seat 244 secured to the rotating ring 108. The rotating ring 108 may additionally include a sealing surface 266 positioned to engage the upper seal 234. In the illustrated embodiment, the sealing surface 266 is a cylindrical surface centered on the central axis 268 of the rotating ring 108. The cylindrical wall 262 may likewise be centered on the central axis 268.

The bearing seat 260 may have a plurality of grooves formed therein to facilitate the flow of oil around and through the bearings 238, 240. The grooves may include circumferential grooves 270 formed in one or both of the cylindrical wall 262 and the radial wall 264. The grooves may also include grooves 272 extending vertically along the cylindrical wall 262 and radially along the radial wall 264. The rotating ring 108 may additionally define apertures 274, which may be threaded, for receiving the fasteners 254.

Figure 12:
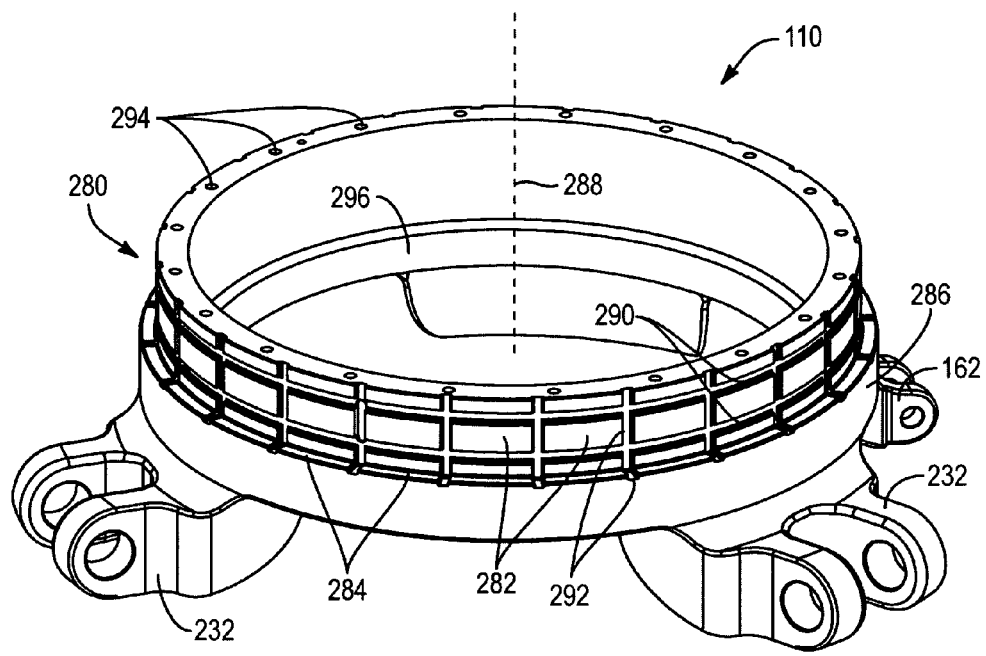
FIG. 12 is an isometric view of a non-rotating ring of an embodiment of a swashplate for a rotor in accordance with the present invention.

Referring to FIG. 12, the non-rotating ring 110 defines a bearing seat 280 sized to receive a portion of the bearings 238, 240. The bearing seat 280 may be embodied as an outward facing cylindrical wall 282 and a radial wall 284 extending radially outward from one edge of the cylindrical wall 282. The bearings 238, 240 may be captured within the bearing seat 280 by means of the seal seat 242 secured to the non-rotating ring 110. The non-rotating ring 110 may additionally include a sealing surface 286 positioned to engage the lower seal 236. In the illustrated embodiment, the sealing surface 286 is a cylindrical surface centered on the central axis 288 of the non-rotating ring 110. The cylindrical wall 282 may likewise be centered on the central axis 288.

The bearing seat 280 may have a plurality of grooves formed therein to facilitate the flow of oil around and through the bearings 238, 240. The grooves may include circumferential grooves 290 formed in one or both of the cylindrical wall 282 and the radial wall 284. The grooves may also include grooves 292 extending vertically along the cylindrical wall 282 and radially along the radial wall 284.

The non-rotating ring 110 may additionally define apertures 294, which may be threaded, for receiving the fasteners 250. The non-rotating ring 110 may also define a spherical bearing surface 296 engaging the spherical bearing 106 in the assembled swashplate 104. The spherical bearing surface 296 may have a spherical contour sized to mate with the spherical bearing 106.

Figure 13A:
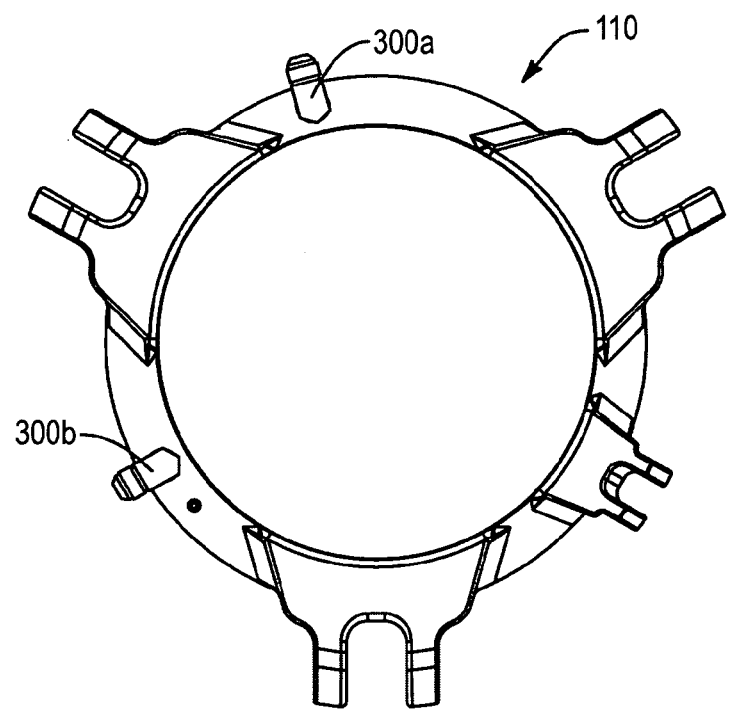
FIG. 13A is a bottom plan view of an embodiment of a non-rotating ring having oil ports for a swashplate for use in a rotor in accordance with the present invention.
Figure 13B:
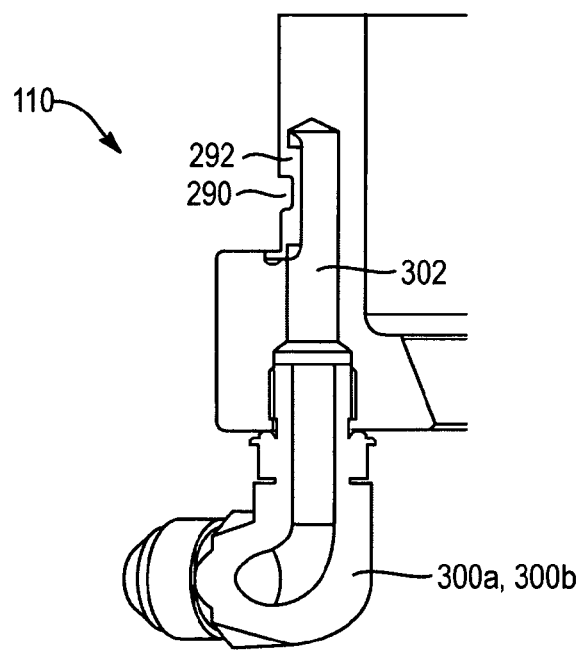
FIG. 13B is a side elevation cross-sectional view of an embodiment of an oil port of the non-rotating ring of a swashplate for use in a rotor in accordance with the present invention.

Referring to FIGS. 13A and 13B, the non-rotating ring 110 may include a feed port 300a and a return port 300b mounted thereto. Each of the feed port 300a and return port 300b is in fluid communication with a channel 302 in fluid communication with one or both of a vertical groove 292 and a circumferential groove 290. Oil for lubricating the bearings 238, 240 is pumped into the feed port 300a and is forced out of the return port 300b. In addition to lubrication, the oil may be used to cool or heat the bearings 238, 240 in order to maintain the bearings 238, 240 in a preloaded condition notwithstanding temperature variations of air flow over the swashplate 104 and heat buildup due to friction. In an alternative embodiment, one or both of the feed port 300a and the return port 300b are secured to the rotating plate 108. In such embodiments, the feed port 300a and/or return port 300b coupled to the rotating plate 108 may be connected to fluid lines 132 emanating from the hydraulic rotary union 138.

Figure 14A:
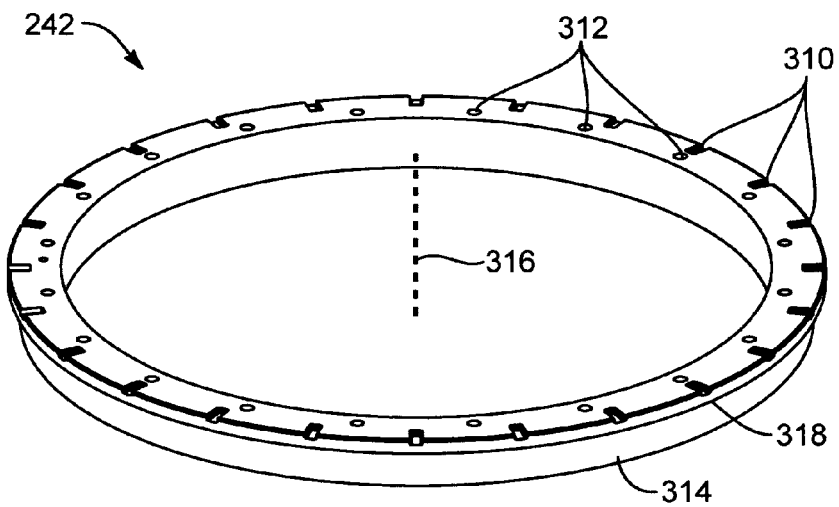
FIG. 14A is an isometric view of an upper seal seat of an embodiment of a swashplate for a rotor in accordance with the present invention.

Referring to FIG. 14A, the seal seat 242 may be embodied as a ring including radial grooves 310 formed on a lower surface thereof and extending partially radially inwardly from an outer circumference of the lower surface. The grooves 310 may be positioned such that the grooves 310 are aligned with the vertical grooves 292 of the non-rotating ring 110 when in place as shown in FIG. 10. The seal seat 242 may likewise include apertures 312 for receiving the fasteners 250.

The seal seat 242 may include an outwardly facing cylindrical wall 314 centered on the central axis 316 of the seal seat 242 and a radial wall 318 extending radially outward from the central axis 316 from an edge of the cylindrical wall 314. The seal 234 may abut the cylindrical wall 314 and the radial wall 318 in the assembled swashplate 104.

Figure 14B:
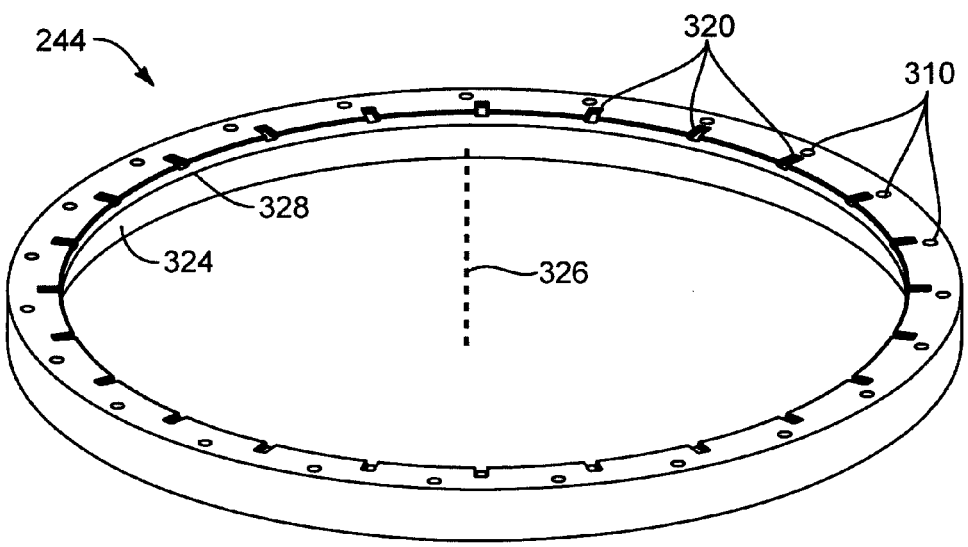
FIG. 14B is an isometric view of a lower seat of an embodiment of a swashplate for a rotor in accordance with the present invention.

Referring to FIG. 14B, in a like manner, the seal seat 244 may be embodied as a ring including radial grooves 320 formed on an upper surface thereof and extending partially radially outwardly from an inner circumference of the upper surface. The grooves 320 may be positioned such that the grooves 320 are aligned with the vertical grooves 272 of the rotating ring 108 when in place as shown in FIG. 10. The seal seat 244 may likewise include apertures 322 for receiving the fasteners 254.

The seal seat 244 may include an inwardly facing cylindrical wall 324 centered on the central axis 326 of the seal seat 244 and a radial wall 328 extending radially inward from the central axis 326 from an edge of the cylindrical wall 324. The seal 236 may abut the cylindrical wall 324 and the radial wall 328 in the assembled swashplate 104.

Figure 15:
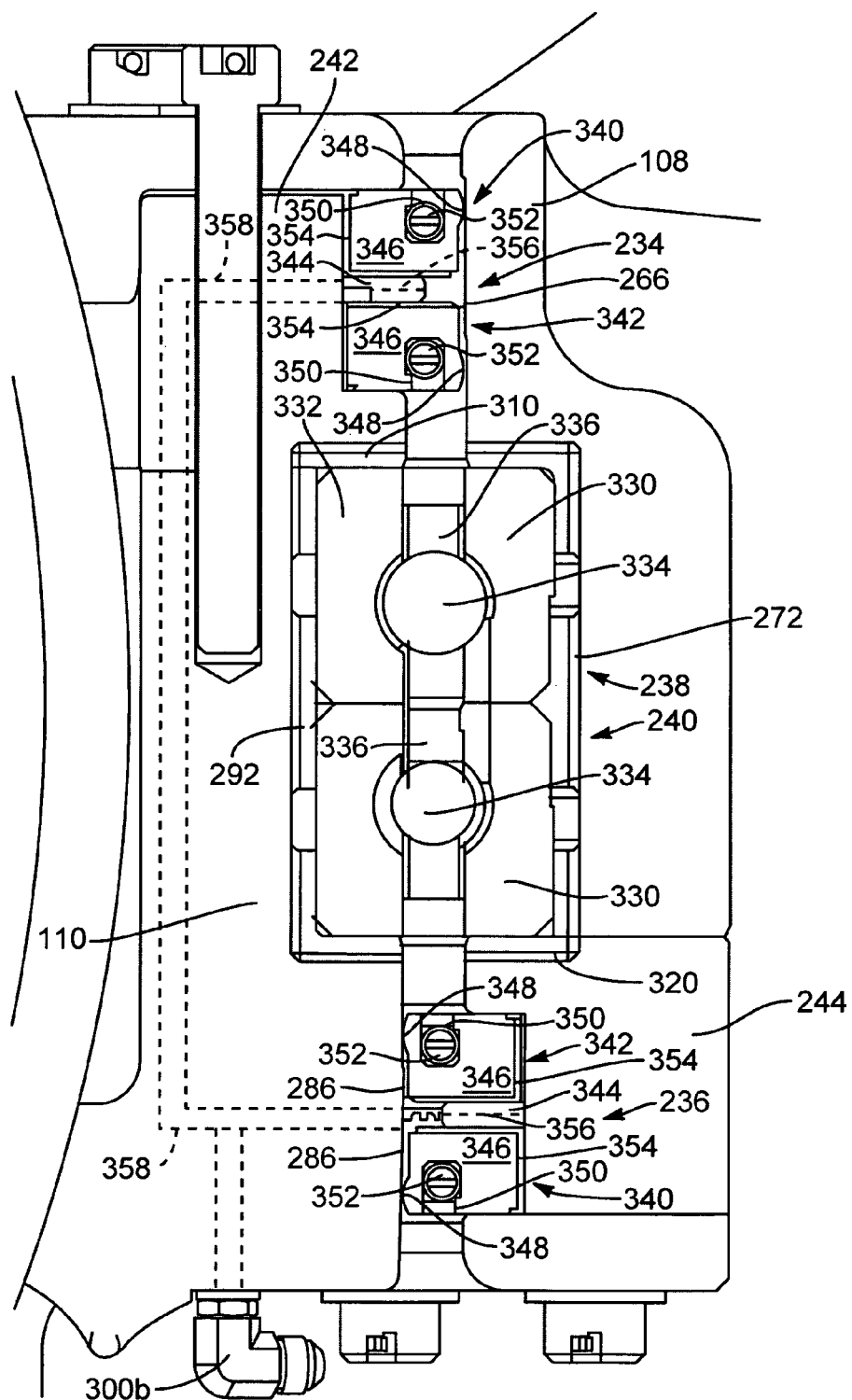
FIG. 15 is a partial side elevation cross-sectional view of an embodiment of a swashplate for a rotor in accordance with the present invention.

Referring to FIG. 15, the radial grooves 310 of the seal seat 242, the grooves 272 of the rotating plate 108, the grooves 292 of the non-rotating plate 110, and the radial grooves 320 of the seal seat 244 form a fluid path extending around the bearings 238, 240. The sealing surface 266 of the rotating ring 108 engages the seal 234 and the sealing surface 286 of the non-rotating ring 110 engages the seal 236. The seals 234, 236 hinder the entry of contaminants into the bearings 238, 240 and hinder the leakage of oil from between the rotating plate 108 and the non-rotating plate 110.

The bearings 238, 240 may each include an outer race 330 engaging the rotating ring 108 and moving synchronously therewith and an inner race 332 engaging the non-rotating ring 110 and being fixed relative to the non-rotating ring 110. A plurality of rolling elements 334, such as ball bearings, are captured between the outer race 330 and the inner race 332. A cage 336 may also be positioned between the inner and outer races 330, 332 to maintain the rolling elements separated from one another and evenly distributed around the races 330, 332.

The rolling elements 334 may be preloaded such that they are deformed from an undeformed shape even in the absence of any loads on the rotating ring 108 or non-rotating ring 110. Preloading the rolling elements 334 may eliminate slop or play between the rotating ring 108 and non-rotating ring 110 that would exist if gaps were present between the rolling elements 334 and the inner and outer races 330, 332. Due to thermal contraction of the rolling elements 332, 334, rotating ring 108, and non-rotating ring 110, the preloaded condition of the rolling elements 334 may be reduced or disappear.

In embodiments of the present invention, air directed through the air channel 92 to the tip jets 50 may be at an elevated temperature due to the input of energy during compression of the air. In some embodiments, the temperature of air forced through the air channel 92 may be above 300° F. when the tip jets 50 are ignited. As a result, during vertical takeoff and landing or during hover, the preload of the bearing elements 334 will be increased due to thermal expansion of the bearings elements 334, races 330, 332, rotating ring 108, and non-rotating ring 110. However, during sustained longitudinal flight at high speeds and altitudes, hot compressed is no longer needs to flow to the tip jets 50 and the ambient air temperature can be very low. For example, above an altitude of 8000 ft, the air temperature is typically at or below 32° F. Accordingly, the preload of the rolling elements 334 may decrease to zero and gaps may occur between the rolling elements 334 and the races 330, 332, resulting in increased slop or play between the rotating plate 108 and the non-rotating plate 110. Increases in slop or play between the rotating plate 108 and the non-rotating plate 110 may result in destructive harmonics at the frequency of cyclic loads on the blades 42 during high speed flight.

Accordingly, in some embodiments, oil flowing through the bearings 238, 240 may be selectively cooled to prevent over loading or heat related failure of the rolling elements 334 due to hot air flow and heat buildup due to friction. The oil flowing through the bearings 238, 240 may also be selectively heated to prevent cooling to the point that the rolling elements 334 are no longer preloaded or the preload of the rolling elements 334 is below a predetermined threshold.

Each of the seals 234, 236 may include an outer seal 340 and an inner seal 342. In the illustrated embodiment, the outer seal 340 and inner seal 342 are mirror images of one another. The outer seal 340 may be separated from the inner seal 342 by a spacer 344. The seals 340, 342 may include a sealing material 346 disposed in a ring and defining a sealing surface 348 for engaging corresponding sealing surfaces 266, 286 of the rotating ring 108 and non-rotating ring 110, respectively. The sealing material 346 may define a groove 350 having a circumferential spring 352 positioned therein and biased to urge the sealing surface 348 against the sealing surface 266 or sealing surface 286. The groove 350 of the upper seal 340 and the groove 350 of the inner seal 342 may face away from one another. The sealing material 346 may be mounted within a retainer 354 formed of a metal or other rigid material for maintaining the shape of the sealing material 346 during use and installation of the upper and lower seals 340, 342.

The spacer 344 may include one or more grooves 356 extending radially therethrough. The grooves 356 may permit the passage of any oil leaking between the outer and inner seals 340, 342 to flow into a fluid path 358 formed in the upper seal seat 242 non-rotating ring 110. The fluid path 358 may be in fluid communication with the return port 300b. The fluid path 358 preferably connects to the fluid path between the feed port 300a and the return port 300b at a point that is at a lower pressure than oil flowing adjacent the inner seal 342 such that oil tends to flow only outwardly from the space between the seals 340, 342 into the fluid path 358.

Figure 16:
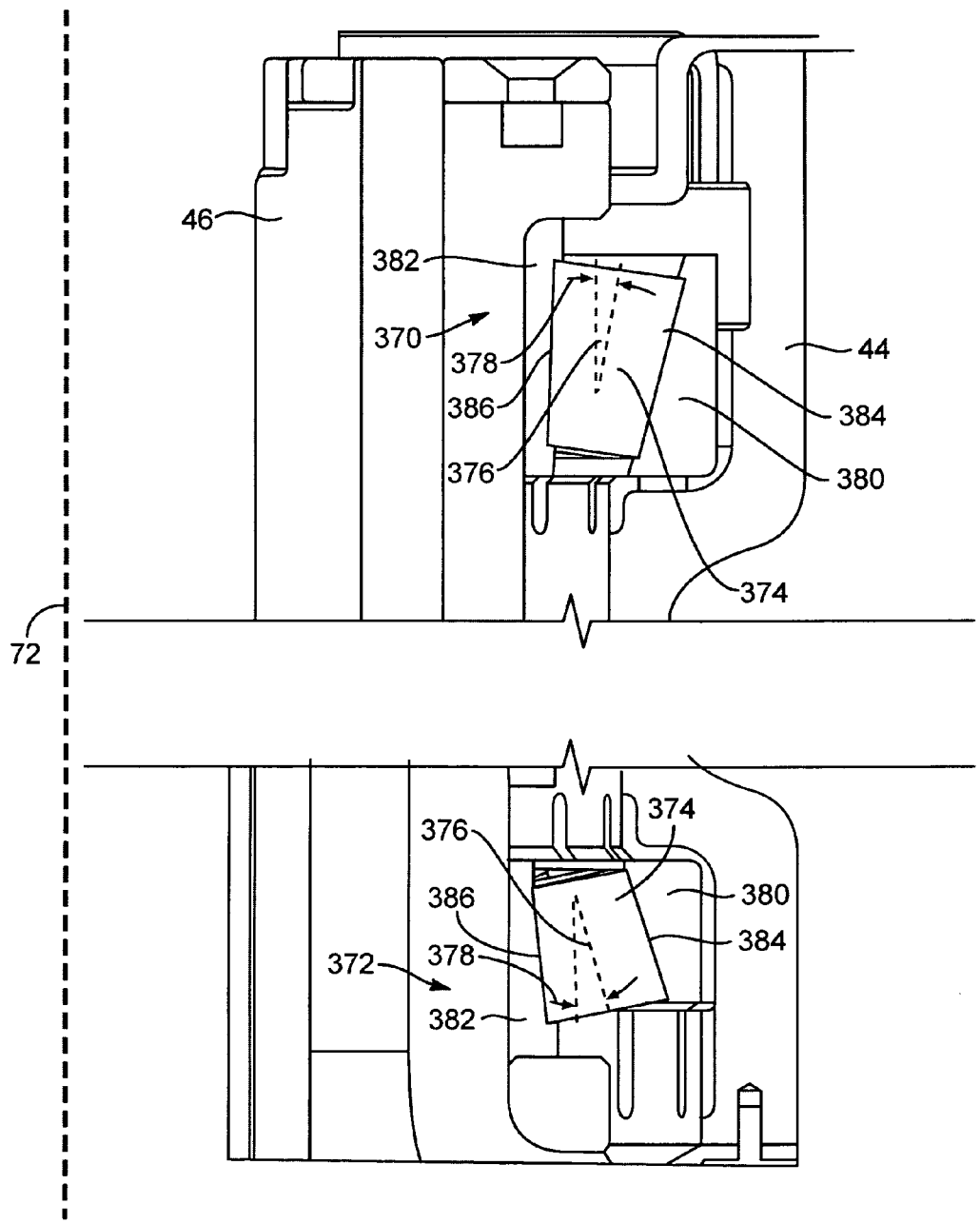
FIG. 16 is a side elevation cross-sectional view of an embodiment of a mast bearing for a rotor in accordance with the present invention.

Referring to FIG. 16, the hub 44 may mount to the mast 46 by means of an upper bearing 370 and a lower bearing 372 captured between the hub 44 and the mast 46. The bearings 370, 372 may be embodied as tapered roller bearings including tapered rolling elements 374. Tapered rolling elements 374 advantageously support loads perpendicular to the axis of rotation 72 of the hub 44 and support lift loads parallel to the axis of rotation 72. The axes 376 of the tapered rolling elements 376 form an angle 378 with the axis of rotation 72. The angle 378 is dictated by the magnitude of radial and longitudinal forces. For example, the angle 378 may be between 3 and 20 degrees. The angle 378 of the rolling elements 374 of the upper bearing 270 may be unequal that of the rolling elements 374 of the lower bearing 372. As is apparent from FIG. 16, the rolling elements 374 of the upper bearing 370 are angled away from the axis of rotation 72 with upward distance along the axis of rotation 72 whereas the rolling elements 374 of the lower bearing 372 are angled away from the axis of rotation 72 with downward distance along the axis of rotation 72, where the downward and upward directions are in the frame of reference of the page. The opposing orientation of the angles 378 enables support of loads in both directions parallel to the axis of rotation 72.

Each of the upper bearings 370, 372 includes a cup 380 and a cone 382 as known in the art of tapered rolling design. The cup 380 extends around the rolling elements 374 and includes a shallow channel 384, or depression 384, for retaining the rolling elements 374. The cup 380 of the upper bearing 370 faces opposite the cup 380 of the lower bearing 372. The cone 382 is located among the rolling elements 374 having the rolling elements 374 captured between the cone 382 and the cup 384. The cone 382 includes a channel 386, or depression 386, for retaining the rolling elements 374. For each of the upper bearings 370, 372, the rolling elements 374 are captured between the channel 384 of the cup 380 and the channel 386 of the cone 382.

Figure 17:
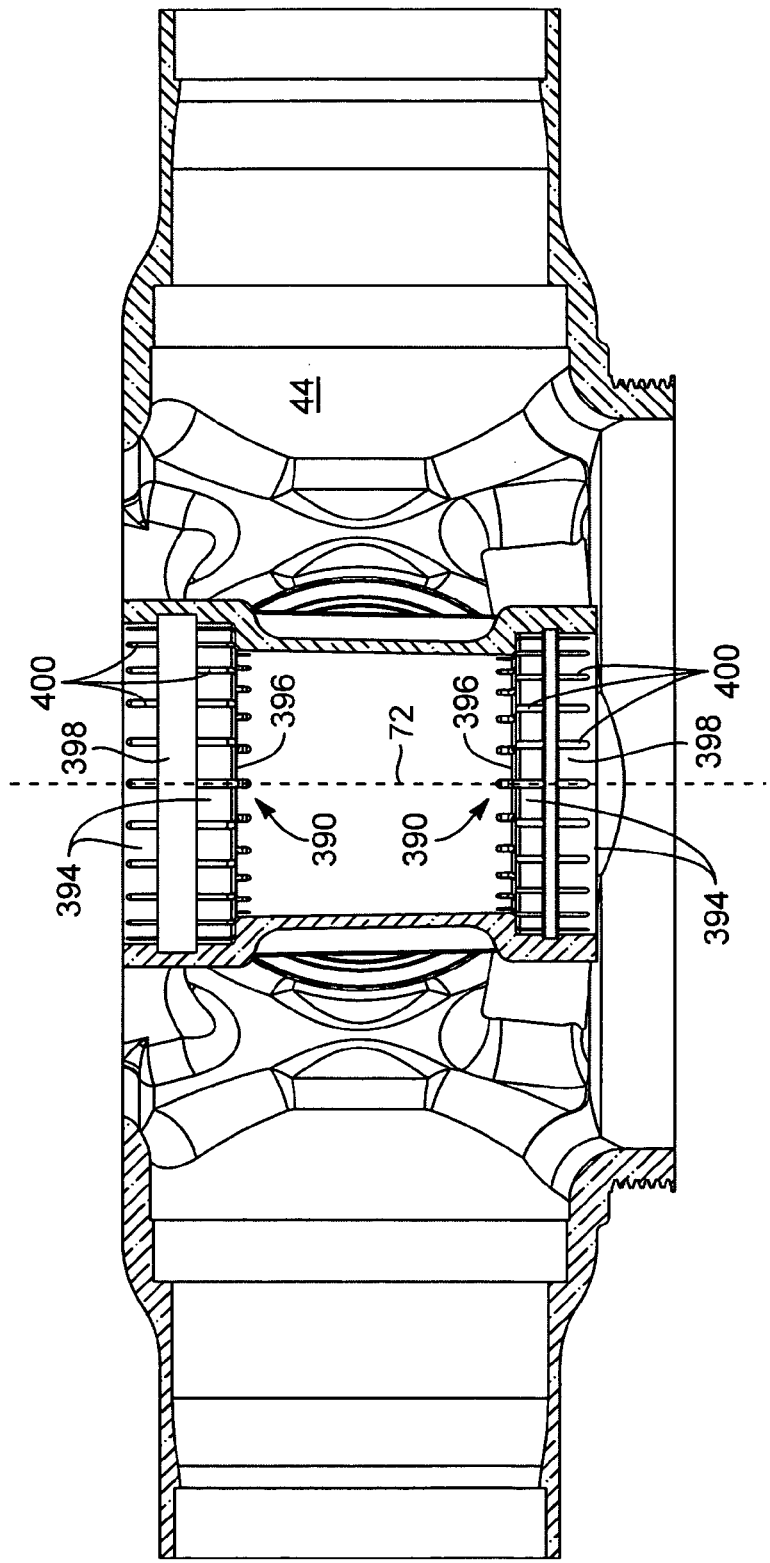
FIG. 17 is a side elevation cross-sectional view of an embodiment of a rotor hub for a rotor in accordance with the present invention.

Referring to FIG. 17, the hub 44 includes an upper bearing seat 390 and a lower bearing seat 392. The cups 380 of the upper and lower bearings 370, 372 are positioned within the bearings seats 390, 392, respectively. Each of the seats 390, 392 includes a vertical wall 394 having a cylindrical shape parallel to the axis of rotation 72 of the hub 44. The seats 390, 392 further include a radial wall 396 extending from an edge of the vertical wall 394 radially inward toward the axis of rotation 72. The radial walls 396 of the seats 390, 392 face outwardly in opposite directions from one another.

The vertical wall 394 of the seats 390, 392 may define one or more circumferential grooves 398. The Seats 390, 392 may likewise define grooves 400 extending continuously from vertically along the vertical wall 394 to radially along the radial wall 396. The grooves 398, 404 may facilitate the flow of oil around the bearings 370, 372.

Figure 18:
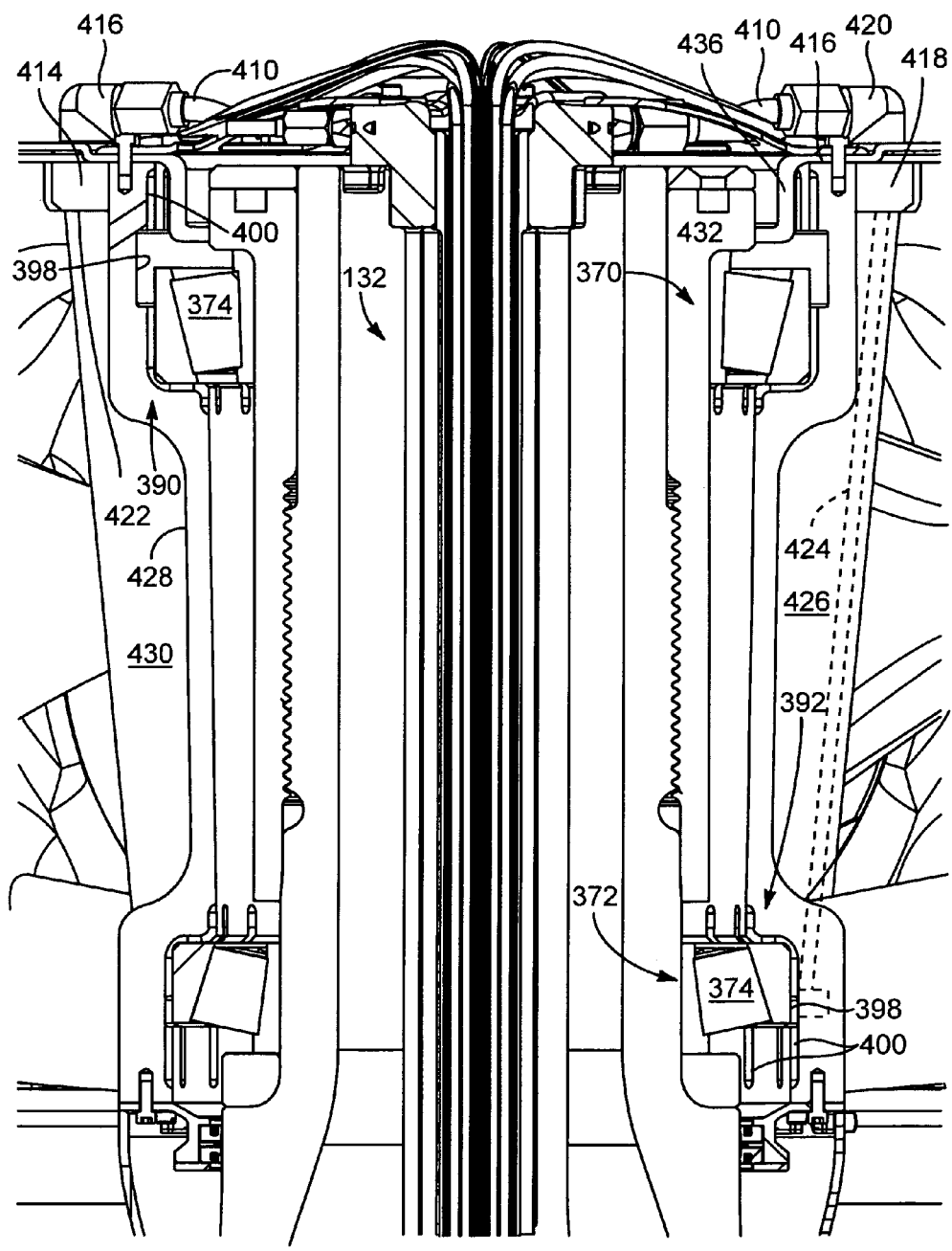
FIG. 18 is another side elevation cross-sectional view of an embodiment of a mast and hub assembly for a rotor in accordance with the present invention.

Referring to FIG. 18, the fluid lines 132 emanating from the hydraulic rotary union 138 may include feed oil line 410 and a return oil line 412. The hub 44 may define a feed port 414 receiving a fitting 416 coupling the feed oil line 410 to the feed port 414. Likewise, the hub 44 may define a return port 418 receiving a fitting 420 coupling the return oil line 412 to the return portion 418. A feed oil passage 422 may extend through the hub 44 from the feed port 414 to adjacent the upper bearing seat 390. In the illustrated embodiment, the feed oil passage 422 is in fluid communication with one or both of the circumferential groove 398 or the grooves 400 of the upper bearing seat 390. In a like manner, a return oil passage 424 extends through the hub 44 from the return port 418 to adjacent the lower bearing seat 392. In the illustrated embodiment, the return oil passage 424 is in fluid communication with one or both of the circumferential groove 398 or the grooves 400 of the lower bearing seat 392. In the illustrated embodiment, the return oil passage 424 is formed in a ridge 426 projecting outwardly from surfaces 428 of the hub 44 having a circular cross section. A corresponding ridge 430 providing a counter balance for the ridge 426 may be formed opposite the ridge 426 on the hub 44 and the feed passage 422 may extend through a portion of the ridge 430. Although individual components have been labeled as a "feed" and "return" type components, each of these labels could be reversed for oil flow in the opposite direction.

An upper seal 432 may be interposed between the hub 44 and mast 46 above the upper bearing 370 to hinder leakage of oil therefrom. In the illustrated embodiment, an upper cap 434 secures to the hub 44 in order to prevent air flow out of the cavity 94. In such embodiments, the upper seal 432 may engage a downwardly depending flange 436 secured to or formed monolithically with the cap 434. The seal 432 also engages the mast 46 to create a seal between itself and the flange 436. In some embodiments, the seal 432 may directly engage a corresponding sealing surface of the hub 44 or some other structure secured to the hub 44.

Figure 19:
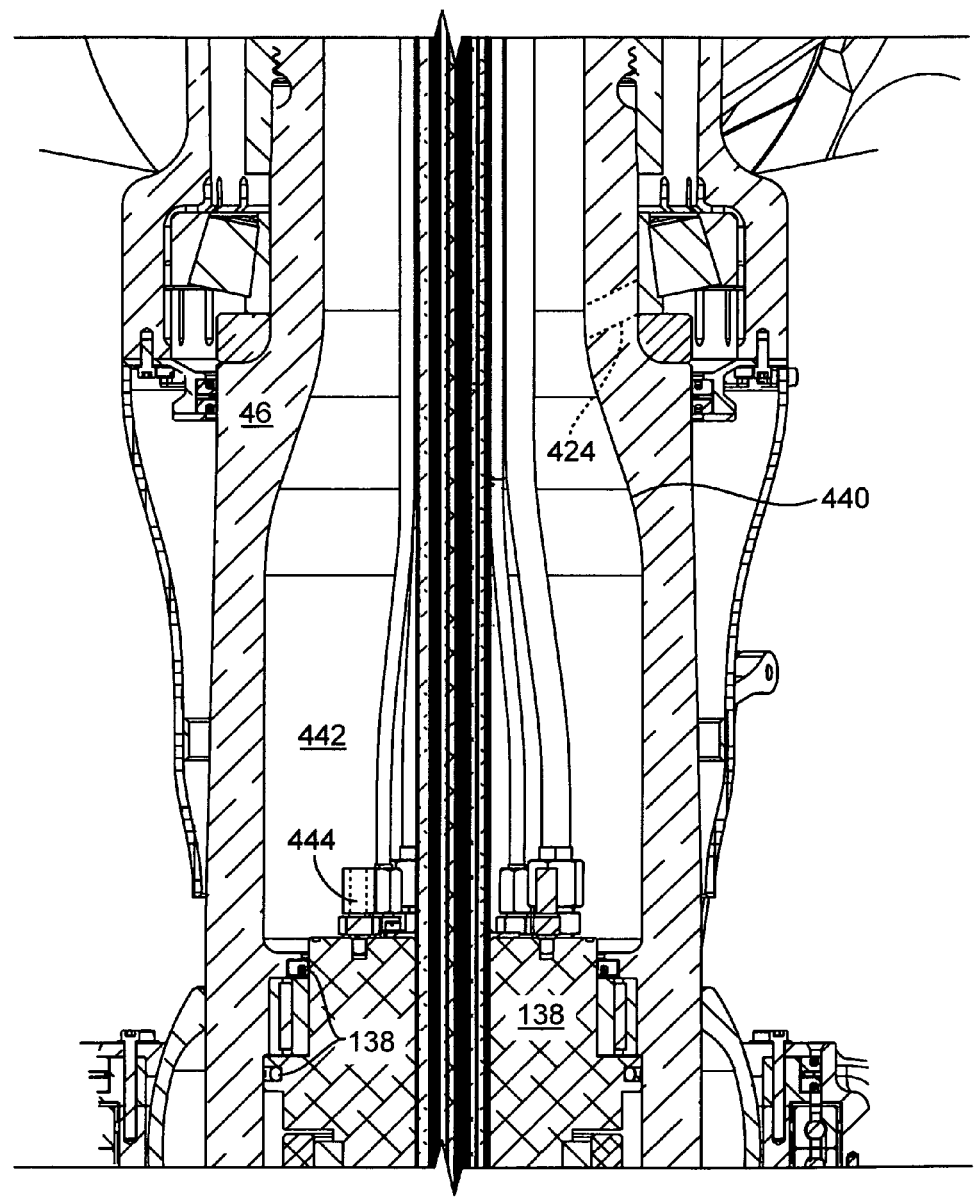
FIG. 19 is a side elevation cross-sectional view of an alternative embodiment of a mast and hub assembly for a rotor in accordance with an embodiment of the present invention.

Referring to FIG. 19, in some embodiments, the return passage 424 may be replaced with a passage 424 that extends from adjacent the lower bearing seat 292 to a passage 440 extending through the center of the mast 46. The electrical lines 130 and fluid lines 132 may also pass through the passage 440. Oil 442 passing through the return passage 424 collects within the passage 440. In such embodiments, a return oil port 444 coupled to the hydraulic rotary union 138 may conduct oil to the hydraulic rotary union 138, which will conduct the oil away from the passage 440. One or more seals 446 engaging the hydraulic rotary union 138 may prevent leakage of the oil past the hydraulic rotary union 138.

Figure 20:
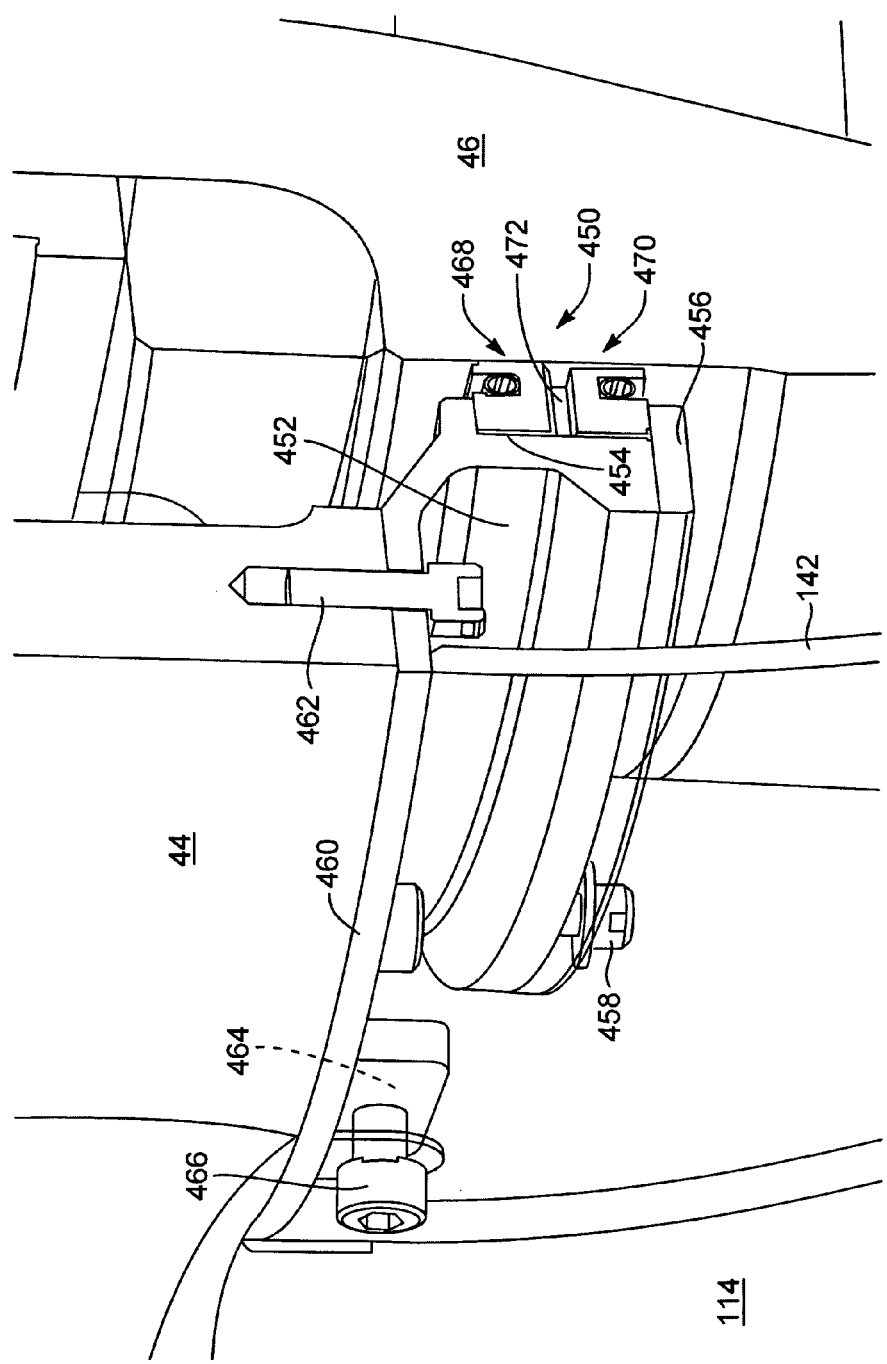
FIG. 20 is a partial isometric cross-sectional view of an embodiment of a seal mounting ring for a rotor in accordance with the present invention.

Referring to FIG. 20, in some embodiments a lower seal 450 hinders leakage of oil away from the lower bearing 372 between the hub 44 and the mast 46. In the illustrated embodiment, the upper and lower bearings 370, 372 are positioned between the upper seal 432 and the lower seal 450. In the illustrated embodiment, the seal 450 secures to a mounting ring 452 that is secured to the hub 44. The mounting ring 452 may define a seal seat 454 for receiving the seal 450 and a seal clamp 456 selectively secured to the mounting ring 452 by means of a fastener 458, such as a screw, such that the seal 450 is captured between the seal seat 454 and the seal clamp 456. The mounting ring 452 additionally include a circular flange 460 secured to the hub 44 such as by means of fasteners 462. The flange 460 may create a sealed interface between itself and the hub 44 to hinder oil leakage from between the flange 460 and the hub 44. The mounting ring 452 may additionally include one or more flanges 464. The flanges 464 may extend vertically downward from the flange 460. The mast fairing 142 may secure to the flanges 464 by means of fasteners 466, such as screws, bolts, rivets, or the like. In addition to reducing pressure losses in air flow over the transition from the mast 46 to the hub 44, the mast fairing 142 may additionally protect the seal 450 from heated air flow thereover which could degrade the seal 450 and blow past the seal 450 and strip oil from the bearings 370, 372.

The seal 450, may include an inner seal 468 and an outer seal 470 that have identical configurations but mirrored about a horizontal plane. The seals 468, 470 may have a spacer 472 positioned therebetween. The seals 468, 470 and spacer 472 may have the same configuration as the seals 340, 342 and spacer 344 of the swashplate 104 as discussed hereinabove.

Figure 21:
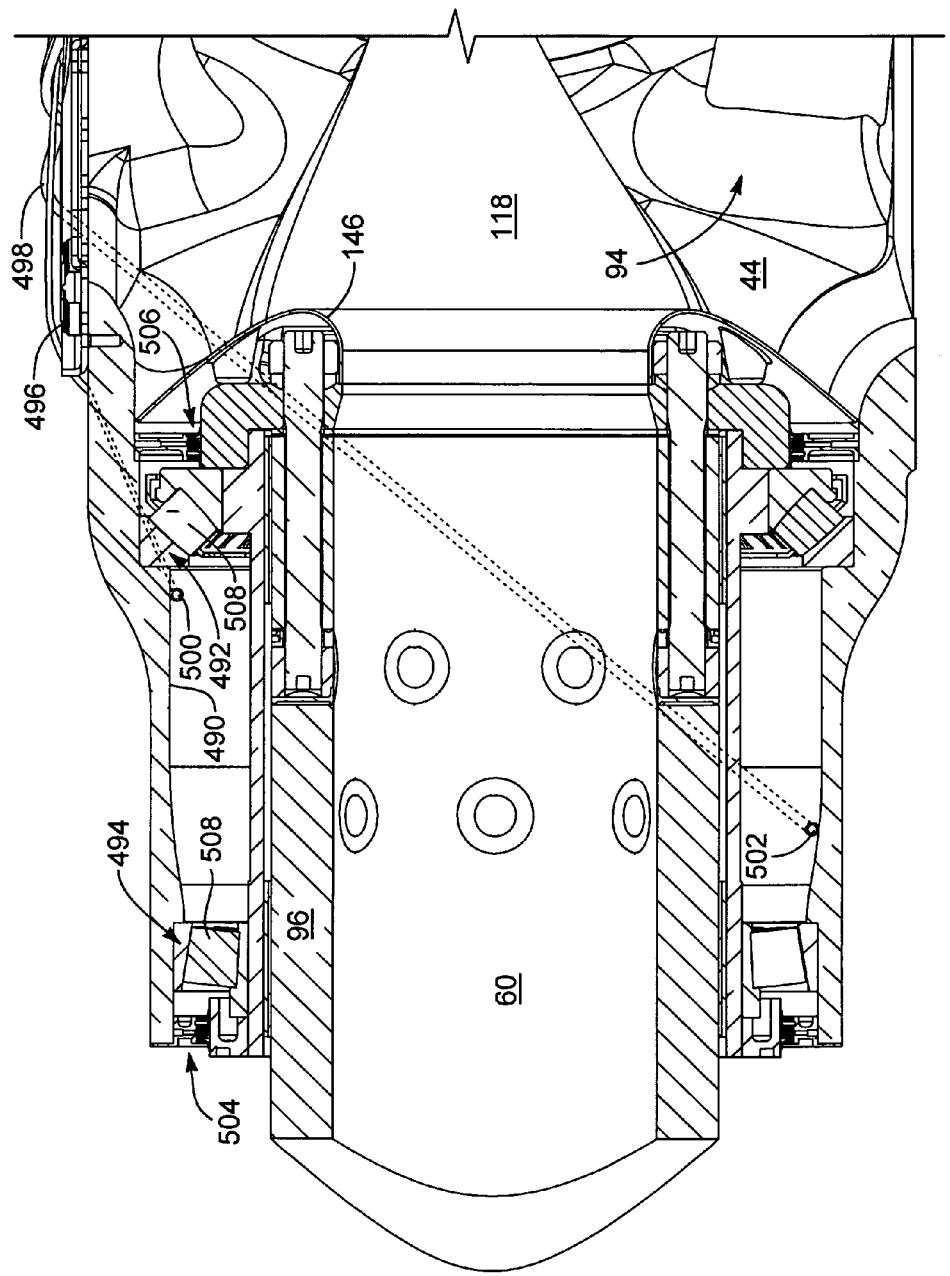
FIG. 21 is a side elevation cross-sectional view of an embodiment of a spindle bearing for a rotor in accordance with the present invention.

Referring to FIG. 21, the blade spars 96 may be supported within a spar bore 490 extending through the hub 44 to the cavity 94. An inboard bearing 492 and an outboard bearing 494 may support rotation of the blade spar 96 within the spar bore 490 in order to change the pitch angle 78 of the blade 42 including the blade spar 96. The bearings 492, 494 may be embodied as tapered roller bearings. The fluid lines 132 emanating from the hydraulic rotary union 138 may include a feed oil line 496 and a return oil line 498 coupled to a feed oil port 500 and a return oil port 502, respectively. The feed oil port 500 and return oil port 502 penetrate the hub 44 and are in fluid communication with the spar bore 490. An outboard seal 504 and an inboard seal 506 may be interposed between the blade spar 90 and the spar bore 490 having the inboard bearing 492 and the outboard bearing 494 positioned between the outboard seal 504 and the inboard seal 506 in order to prevent leakage of oil.

As with other bearings described herein, the bearings 492, 494 may include rolling elements 508 that are preloaded within a certain operating temperature range. Heating and cooling of the oil passing between the feed port 500 and the return port 502 may be used to prevent overheating of the rolling elements 508 due to heated air flow or heat buildup due to friction and to prevent over reduction or elimination of the preload due to thermal shrinkage of the bearings 492, 494, hub 44, or blade spar 96.

The bearings 492, 494 may be protected from heated air flow thereover by the blade duct fairing 146, which may extend from the blade duct 60 to engage the wall of the cavity 94 of the hub 44. The blade duct fairing may describe smooth contour from the blade duct 60 to the wall of the cavity 94 such that air flow from the cavity to the blade duct experiences a smaller pressure drop, such as between five and fifty percent, preferably between twenty percent and fifty percent, lower than the pressure drop that would result if the blade duct fairing 146 were removed.

A more complete description of the coupling between the blade spar 96 and the hub 44 may be found in U.S. Prov. Pat. App. Ser. No. 61/403,097, filed Sep. 9, 2010 and entitled "FEATHERING-SPINDLE-BEARING LUBRICATION AND TEMPERATURE CONTROL".

Figure 22:
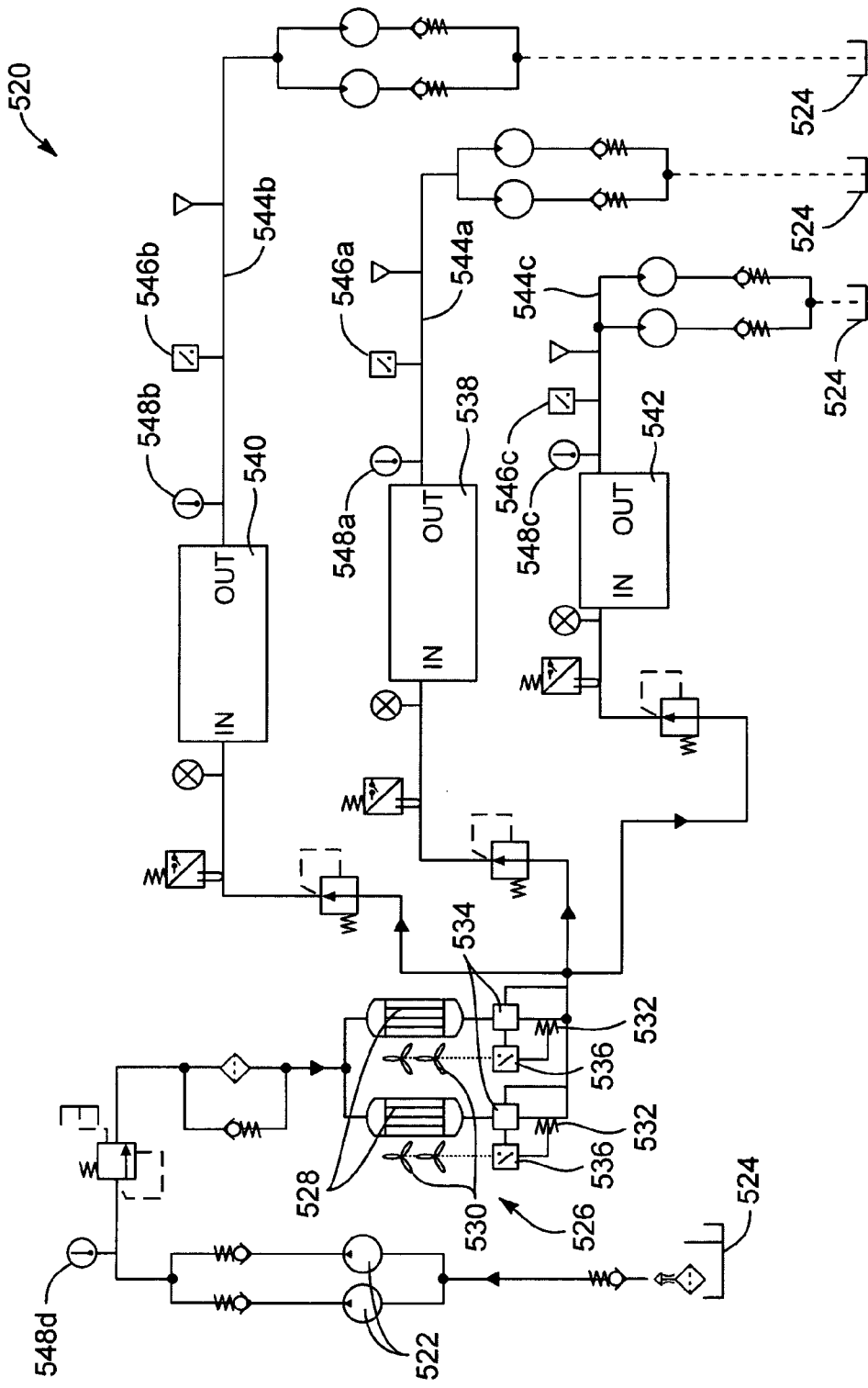
FIG. 22 is a schematic diagram of an embodiment of an oil distribution system for a rotor in accordance with the present invention.

Referring to FIG. 22, the flow of oil for the lubrication and cooling or heating of the bearings within the rotor 40 may be performed by an oil distribution system 20. The system 20 includes an oil pump 522 powered by one or both of the engines 48 or by electrical or hydraulic power generated by a generator or hydraulic pump powered by the engines 48. The pump 522 may be constantly on or may be turned on and off according to conditions of the rotor 40, such as the temperature of one or more bearings thereof. The low pressure port of the pump 522 draws oil from a reservoir 524.

The high pressure port of the pump 522 is coupled to a thermal modulation system 526. The thermal modulation system 526 senses and responds to the temperature within the rotor system 40. The thermal modulation system 526 may extract thermal energy from the oil within the oil distribution system 520 in order to lower the temperature of bearings within the rotor 40 in order to avoid bearing failure due to high heat. The thermal modulation system 526 may input thermal energy to the oil in order to raise the temperature of bearings within the rotor 40 in order to avoid thermal shrinkage that will reduce the preload of rolling elements within the bearings below acceptable levels or eliminate the preload of the rolling elements within the bearings entirely.

The thermal modulation system 526 may include one or more radiators 528 and one or more fans 530 directing air at the radiators 528 in order to extract thermal energy from oil within the oil distribution system. The radiators 528 are located within the fluid path between the high pressure port and low pressure port of the pump 522.

The thermal modulation system 526 may include one or more heating elements 532 in thermal contact with oil within the oil distribution system 520. The heating elements 532 may be selectively activated to input heat into oil within the oil distribution system 520. In some embodiments, a bypass valve 534 directs oil to either the radiators 528 or heating elements 532 according to the need for heat input to the oil or heat extraction from the oil.

A thermal valve 536 in thermal contact with oil within the oil distribution system 520 may control the fans 530, heating elements 532, and bypass valve 534 according to a temperature of oil within the oil distribution system 520. The thermal valve 536 may be a simple thermostatic switch or may be a digitally programmable sensor and actuator having the capacity to independently control each of the fans 530, heating elements 532, and bypass valve 534 in order to modulate the temperature of oil within the oil distribution system 520.

Oil within the oil distribution system 520 may flow over a swashplate bearing set 538, mast bearing set 540, and spindle bearing set 542. The swashplate bearing set 538 may include the swashplate bearings 338, 340. Oil flow through the swashplate bearing set 538 may pass through the feed port 300*a* and return port 300*b* as described hereinabove. The mast bearing set 540 may include the upper bearing 370 and lower bearing 372. Oil flow through the mast bearing set 540 may include oil flow through the feed port 414 and the return port 418. The spindle bearing set 542 may include the inboard bearing 492 and the outboard bearing 494. Oil flow through the spindle bearing set 542 may pass through the feed port 500 and return port 502 as described hereinabove.

In the illustrated oil distribution system 520, oil flows through the swashplate bearing set 538, mast bearing set 540, and spindle bearing set 542 in parallel through separate fluid paths 544*a*, 544*b*, 544*c*. Temperature controlled valves 546*a*, 546*b*, 546*c* may control oil flow through the paths 544*a*, 544*b*, 544*c*, respectively, according to the temperature of oil exiting the swashplate bearing set 538, mast bearing set 540, and spindle bearing set 542, respectively. Oil flow through the paths 544*a*, 544*b*, 544*c* may return to the reservoir 524 after exiting the swashplate bearing set 538, mast bearing set 540, and spindle bearing set 542.

Thermal sensors 548*a*, 548*b*, 548*c* may be in thermal contact with oil flowing through the paths 544*a*, 544*b*, 544*c* downstream from the bearing sets 538, 540, 542, respectively. In some embodiments, an additional temperature sensor 548*d* may sense the temperature of oil flowing from the pump upstream from the radiators 528 and heating elements 532.

The order of elements along the fluid path between the high pressure port and lower pressure port of the pump 522 may be different that that illustrated in FIG. 22. Oil distribution systems according to embodiments of the invention may also include only one of a radiator 528, or other cooling system, and a heating element 532. Likewise, more or fewer bearing sets than the swashplate bearing set 538, mast bearing set 540, and spindle bearing set 542 may be lubricated, heated, and/or cooled by oil flowing through the oil distribution system 520.

Figure 23A:
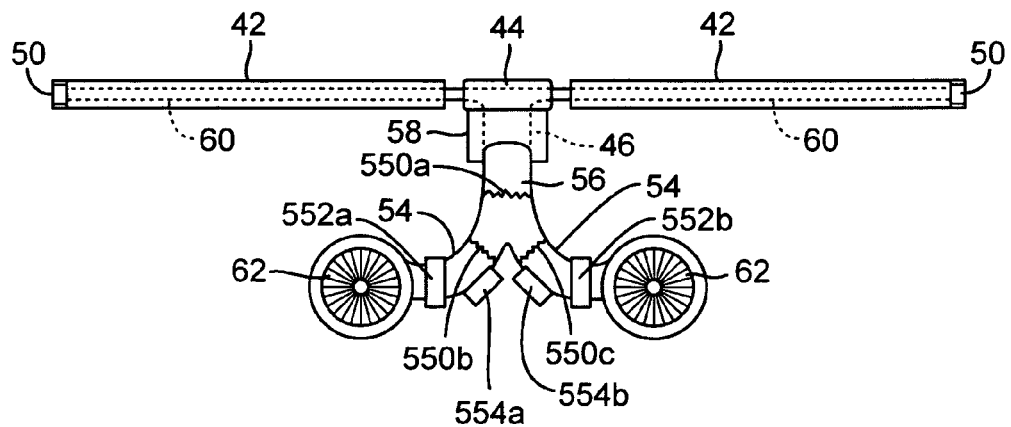
FIG. 23A is a schematic diagram of an embodiment of a passive air flow heating system for a rotor in accordance with the present invention.
Figure 23B:
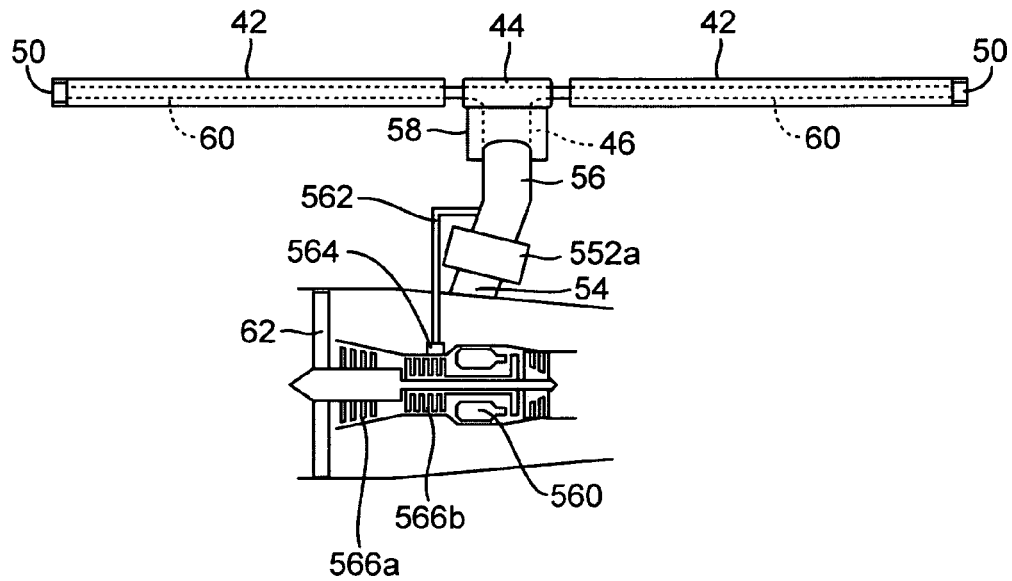
FIG. 23B is a schematic diagram of an embodiment of a bleed air heating system for a rotor in accordance with the present invention.

Referring to FIGS. 23A and 23B, preloading of the bearing sets swashplate bearing set 538, mast bearing set 540, and spindle bearing set 542, may additionally or alternatively be maintained despite low ambient air temperatures, such as during high altitude sustained longitudinal flight, by means of heated air forced or drawn through the air channel 92 and the cavity 94.

Referring specifically to FIG. 23A, during sustained longitudinal flight the rotor hub 44 and blades 42 continue to rotate though unpowered due to autorotation. The centrifugal force exerted on air within the blade ducts 60 may draw air through the air channel 92 formed by the mast shroud 58 and the mast 46 and into the cavity 94 formed in the hub 44.

In some embodiments, one or more heating elements 550*a*, 550*b*, 550*c* are positioned within one or more of the plenum 56 and ducts 54 and are selectively powered to heat air drawn into the mast shroud 58. As noted above, compressed air from the bypass turbines 62 may be urged through the ducts 54 during takeoff, landing, and hover. However, during sustained longitudinal flight, the engines 48 may operate more efficiently by directing all bypass air rearwardly from the engines 48 rather than through the ducts 54. Accordingly, one or more valves 552*a*, 552*b* may turn off air flow from the bypass turbine 62 to the ducts 54 during sustained longitudinal flight of the aircraft 10. However, to permit air flow over the heating elements 550*a*, 550*b*, 550*c* as needed to heat the rotor 40, the valves 550 may be partially opened during sustained longitudinal flight. In some embodiments, to avoid drawing power from the engines 48, one or more valves 554*a*, 554*b* may selectively permit air flow into the ducts 54 or directly into the plenum 56. The opening and closing of the one or more valves 554*a*, 554*b* may be controlled by temperature feedback from the rotor 40.

For example, a sensor monitoring the temperature of the oil within the oil distribution system 520 may indicate when the oil temperature drops below a certain threshold such that the heating elements 532 are no longer sufficient to maintain the bearings sets 538, 540, 542 within an operating temperature range at which the rolling elements thereof are preloaded, the one or more valves 554*a*, 554*b* may be partially or completely opened and the one or more heating elements 550*a*, 550*b*, 550*c* may be activated to warm the rotor 40 to the proper operating temperature range at which preloading of the rolling elements within the bearing sets 538, 540, 542 is above a predetermined threshold.

Referring to FIG. 23B, in some embodiments, in lieu of heating elements 550 bleed air from a stage of the engines 48 prior to the combustion stage 560 may be conducted by means of one or more channels 562 to one or both of the ducts 54 or the plenum 56. The channel 562 preferably bypasses any valve 552*a*, 552*b* controlling bypass air from the bypass turbine 62. Air flow through the channels 562 may be controlled by one or more valves 564 that may be controlled according to a temperature of one or more of the bearing sets 538, 540, 542 of the rotor 40. In the illustrated embodiment, the engine 48 includes two compression stages 566*a*, 566*b* and the channel 562 may be positioned to draw air from either of the compression stages 566a, 566b.

Referring to both FIGS. 23A and 23B, either system may be used to deice the blades 42 inasmuch as the heated air eventually flows through the blade ducts 60.

Figure 24:
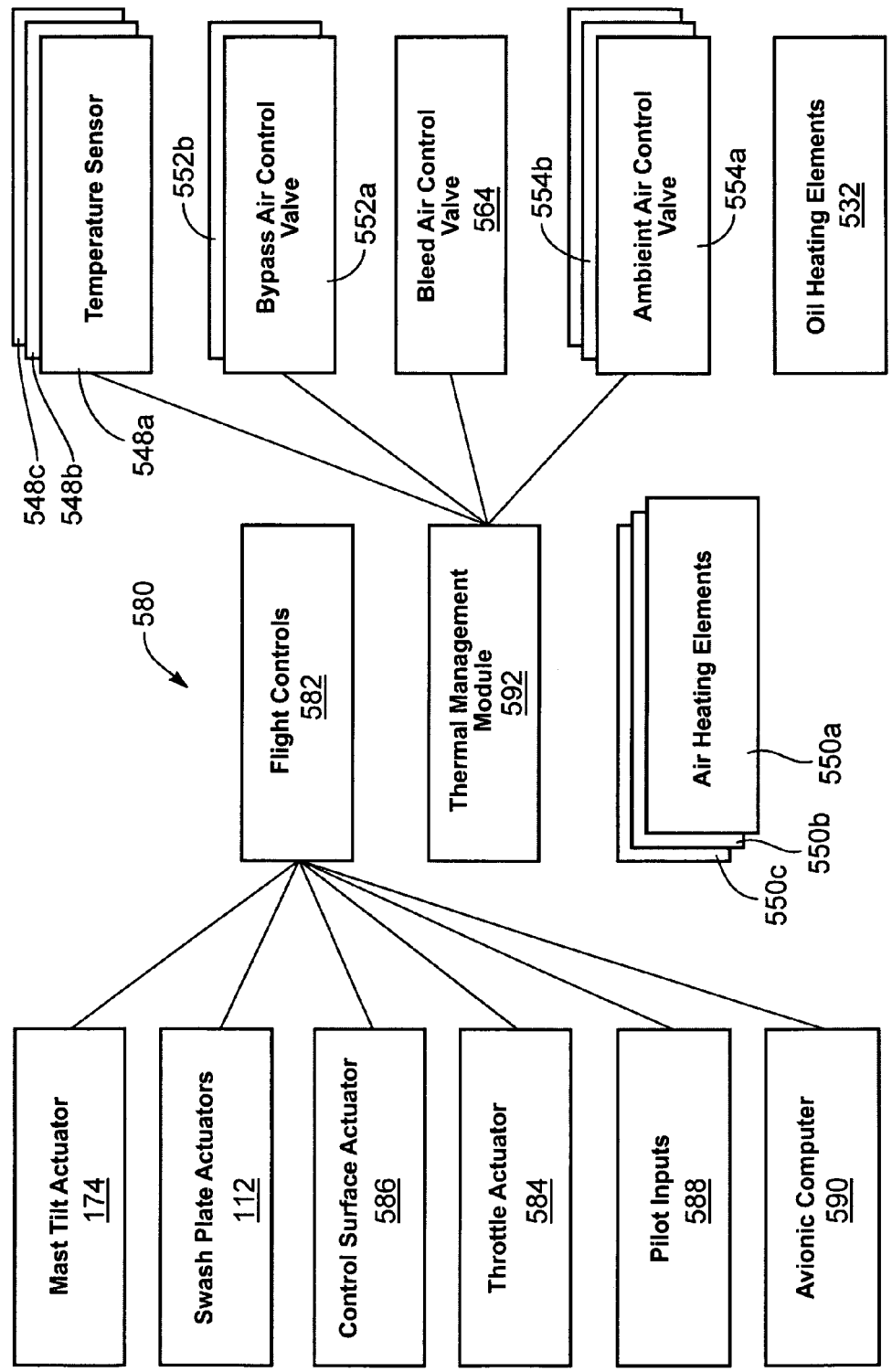
FIG. 24 is a block diagram of an embodiment of a flight control system for an aircraft incorporating a rotor in accordance with the present invention.

Referring to FIG. 24, a flight control system 580 may include flight controls 582 providing activating signals, such as electrical, hydraulic, or mechanical inputs, to the swashplate actuators 112, mast tilt actuator 174, one or more throttle actuators 584 for controlling the engines 48 and tip jets 50, and control surface actuators 586 for controlling the control surface such as the rudder 22, elevator 30, and ailerons 36. The flight controls 582 may receive pilot inputs 588 from pilot controls as known in the art of fixed and rotary aircraft design such as rudder control pedals, aileron and elevator control stick, cyclic pitch control stick, throttle control lever, and cyclic pitch control knob. The flight controls 582 may additionally receive inputs from an avionic computer 590 enabling autopiloted flying of the aircraft 10.

The flight control system 580 may additionally include a thermal management module 592 programmed to maintain the temperature of the rotor 40 effective to avoid bearing failure and to maintain bearings and structures in which they are mounted within an operating temperature range in which the bearings will be in a preloaded condition or a preloaded condition above a minimum preload. The thermal management module 592 may receive inputs from the temperature sensors 548a, 548b, 548c, 548d measuring the temperature of oil exiting the swashplate bearing set 538, mast bearing set 540, and spindle bearing set 542, respectively. The thermal management module 592 may be electrically, hydraulically, or mechanically coupled to the valves 552a, 552b controlling flow of bypass air from the engines 48, the valves 554a, 554b controlling the air passively drawn into the ducts 54 or plenum 56, the valves 564 controlling the flow of bleed air from the engines 48 into the ducts 54 or plenum 56, the temperature modulation system 526, including the fans 530 and the heating elements 532, and the thermal valves 536, 546a, 546b, 546c of the oil distribution system 520. In such embodiments, the thermal valves 536, 546a, 546b, 546c may be embodied as electrically, hydraulically, or mechanically actuated valves controlled by the thermal management module 592.

The thermal management module 592 may be embodied as a digital or analog computer programmed to respond to inputs from some or all of the sensors 548a, 548b, 548c, 548d by activating one or more of the devices electrically, hydraulically, or mechanically coupled thereto. Alternatively, the thermal management module may be distributed such that each device listed in the preceding paragraph is activated or deactivated according to a sensed temperature. In particular, the thermal valves 536, 546a, 546b, 546c may respond independently to the temperature of oil flowing therethrough and open and close according to whether the temperature is within a set operating temperature range, e.g., a temperature range between the temperature at which the rolling elements of the bearing sets 538, 540, 542 will fail and the temperature at which the preloading of the rolling elements is still present or is above a proscribed threshold providing the needed rigidity of the rotor 40 against destructive harmonics.

Figure 25:
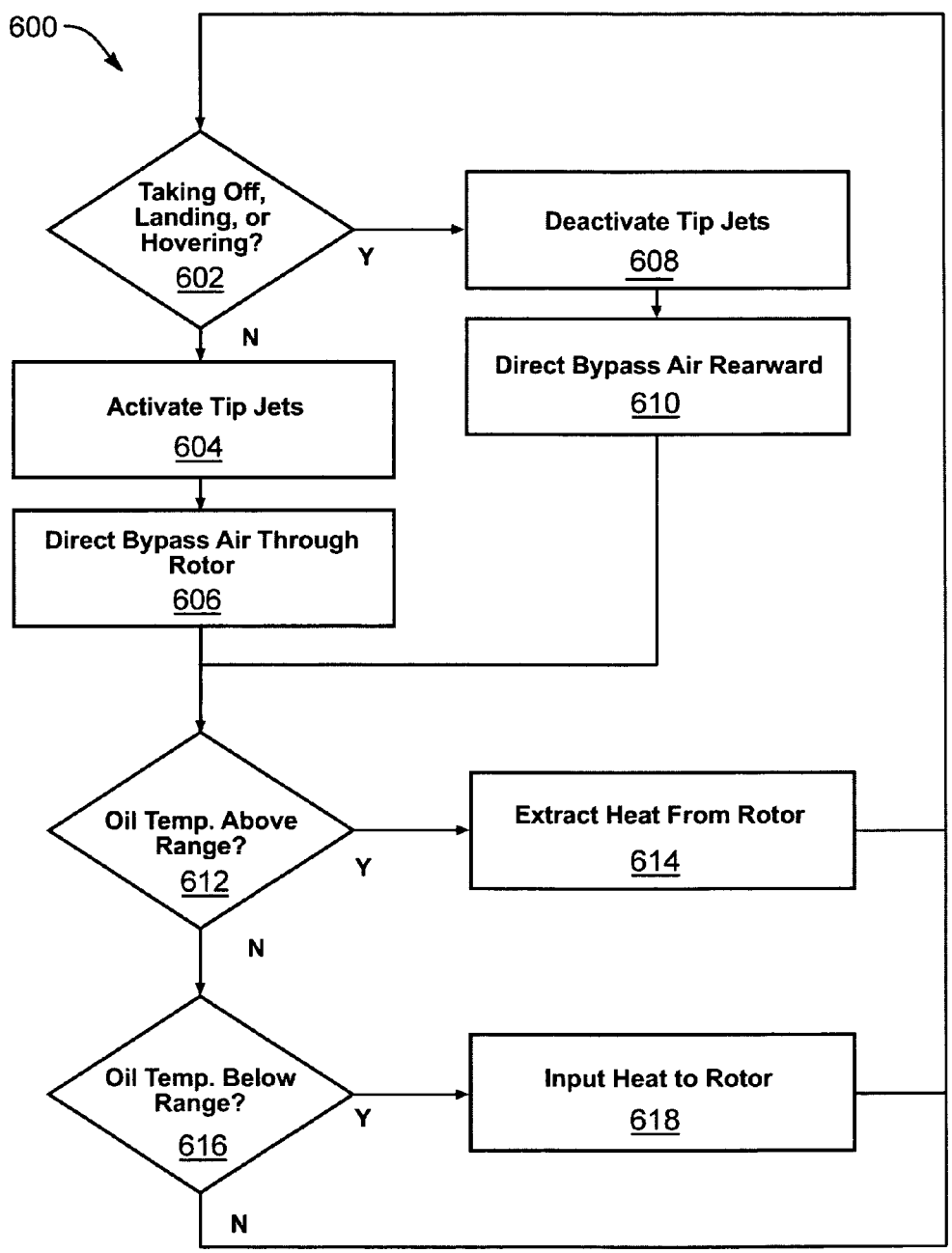
FIG. 25 is a process flow diagram of an embodiment of a method for thermal management of a rotor in accordance with the present invention.

FIG. 25 illustrates a method 600 for thermal management of a rotor 40, and, in particular, for reducing probability of bearing failure and decreasing the amount of slop or play within the swashplate bearing set 538, mast bearing set 540, and spindle bearing 542 by maintaining an adequate preload upon the rolling elements thereof. The method 600 may be performed by the thermal management module 592.

The method 600 may include evaluating at step 602, whether the aircraft 10 is taking off, landing, or hovering. The aircraft 10 may be capable of horizontal takeoff along a runway, in which case taking off and landing for purposes of step 602 may include evaluating whether a vertical or short landing or take off is being performed such that powered rotation of the rotor 40 by means of the tip jets 50 is needed to achieve the degree of verticality of the landing or take off. If hovering, taking off, or landing, is being performed, then at step 604 the tip jets are activated at step 604 and compressed air for driving the tip jet 50, such as compressed air from the engines 48, is forced through the rotor 40 to the tip jets 50 at step 606. Steps 604 and 606 may be performed simultaneously and either step 604 or step 606 may be begun first. If the aircraft 10 is no longer taking off, landing, or hovering, then the tip jets 50 are deactivated at step 608 and at step 610, the compressed air from the bypass turbine 62 is directed rearwardly, in embodiments having engines 48 embodied as jet engines.

Throughout operation of the aircraft, for both sustained longitudinal flight and vertical flight as in a vertical takeoff or landing or hovering, the method 600 may include executing some or all of steps 612 through steps 618.

At step 612 the method 600 includes evaluating whether the temperature of the rotor 40 is above an upper threshold, such as a temperature within some tolerance of the temperature above which the bearings of the swashplate bearing set 538, mast bearing set 540, and spindle bearing 542 will fail or have an unduly shortened useful life. If so, then at step 614, thermal energy is extracted from the rotor 40. Extracting energy from the rotor may include activating the fans 530 in order to increase the rate of heat transfer from the radiators 528.

At step 616, the temperature of the rotor 40 is evaluated with respect to a lower threshold equal to or some tolerance above the temperature at which the bearings of the swashplate bearing set 538, mast bearing set 540, and spindle bearing 542 are no longer preloaded or have a preload below a minimum preload magnitude. If so, then at step 618, thermal energy is added to the rotor 40 according to the functionality of the oil and air heating systems described hereinabove. Adding thermal energy to the rotor may include one or more of activating the heating elements 532, activating the heating elements 550a-550c and opening the valves 554a, 554b, and opening a valve 564 permitting flow of bleed air over the rotor 40. The possible methods of adding heat to the rotor 40 may be performed simultaneously or may be attempted in a specified order such that one method is attempted alone, then another method is attempted simultaneously if the temperature increase is insufficient, other methods may then be attempted simultaneously if the temperature increase is again insufficient.

Figure 26:
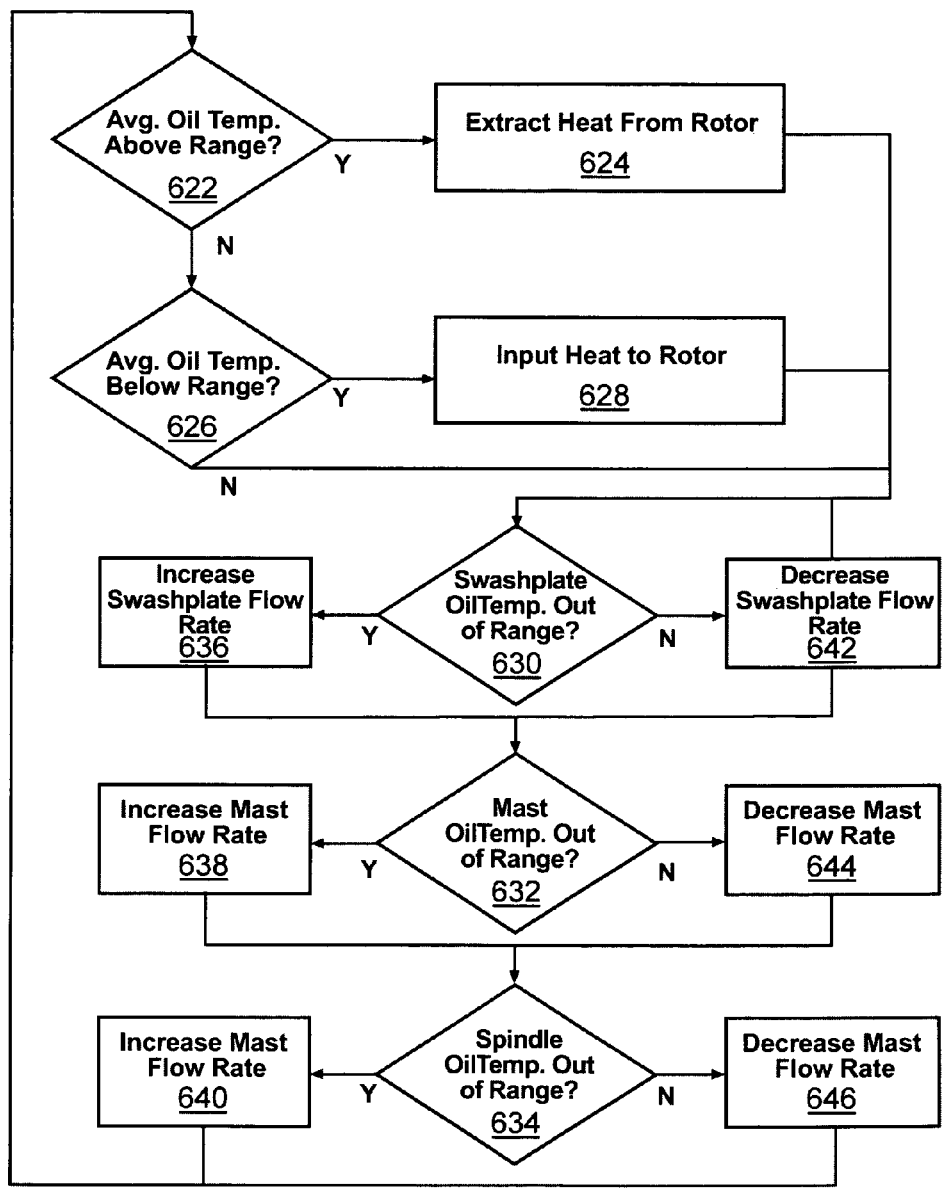
FIG. 26 is a process flow diagram of an embodiment of another method for extracting heat from a rotor in accordance with the present invention.

Referring to FIG. 26, in some embodiments, a method 620 may be used for thermal management of a rotor 40. The method 620 may include evaluating whether the average temperature of oil flowing through the rotor 40 has an average temperature above the operating temperature range at step 622. If so, at step 624, heat is extracted from the oil, such as by activating the fans 530 blowing the radiators 528.

At step 626, the method 620 includes evaluating whether the temperature of oil circulating through the rotor 40 has a temperature below the operating temperature range. If so then at step 628, heat is input to the radiator. Adding thermal energy to the rotor may include one or more of activating the heating elements 532, activating the heating elements 550a-550c and opening the valves 554a, 554b, and opening a valve 564 permitting flow of bleed air over the rotor 40. The possible methods of adding heat to the rotor 40 may be performed simultaneously or may be attempted in a specified order such that one method is attempted alone, then another method is attempted simultaneously if the temperature increase is insufficient, other methods may then be attempted simultaneously if the temperature increase is again insufficient.

Steps 622 and 626 may include measuring the temperature of oil entering or exiting the pump 522 upstream of the swashplate bearing set 538, mast bearing set 540, and spindle bearing set 542. Steps 622 and 626 may be performed by the thermal valve 536 and steps 624 may include activation of the fans 530 by the thermal valve 536. Opening and closing of one or more of the valves 554a, 554b, 564 and activating of the heating elements 532, 550a-550c may also be controlled according a temperature dependant signal from the thermal valve 536. Alternatively, or in addition, activation of the fans 530, opening and closing of the valves 554a, 554b, 564, and activation of the heating elements 532, 550a-550c may be controlled by a digital or analog computer, such as the thermal management module 592. In such embodiments, steps 622 and 626 may include evaluating the output of the thermal sensor 548d. The thermal sensor 548d preferably measures the temperature of the consolidated flow of oil from each of the paths 544a, 544b, 544c, such as at a point between the high pressure port of the pump 522 and the radiators 528 and the heating elements 532.

At steps 630, 632, and 634, the temperatures of oil flowing through the paths 544a, 544b, 544c, respectively, downstream from the swashplate bearing set 538, mast bearing set 540, and spindle bearing set 542 are evaluated to determine whether the temperatures lie within the operating temperature range. If the temperature of oil flowing through any of the paths 544a, 544b, 544c downstream from the swashplate bearing set 538, mast bearing set 540, and spindle bearing set 542 is determined to lie outside of the operating temperature range, then at steps 636, 638, and 640 oil flow through whichever of the paths 544a, 544b, 544c has a temperature outside of the operating temperature range is increased. If the temperature of oil flowing through any of the paths 544a, 544b, 544c downstream from the swashplate bearing set 538, mast bearing set 540, and spindle bearing set 542 is determined to lie within the predetermined range, then at steps 642, 644, and 646, oil flow through whichever of the paths 544a, 544b, 544c has a temperature outside of the operating temperature range is decreased.

Evaluating the temperature of oil flow through the paths 544a, 544b, 544c may be performed by the thermal valves 546a, 546b, 546c, respectively. Evaluating the temperature of oil flow through the paths 544a, 544b, 544c may additionally or alternatively be performed by the thermal sensors 548a, 548b, 548c, respectively and the thermal valves 554a, 554b, 554c may be replaced by valves opened and closed by the thermal management module 592 electrically, hydraulically coupled to the valves in order to increase or decrease the flow of oil through the paths 554a, 544b, 544c.

Figure 27:
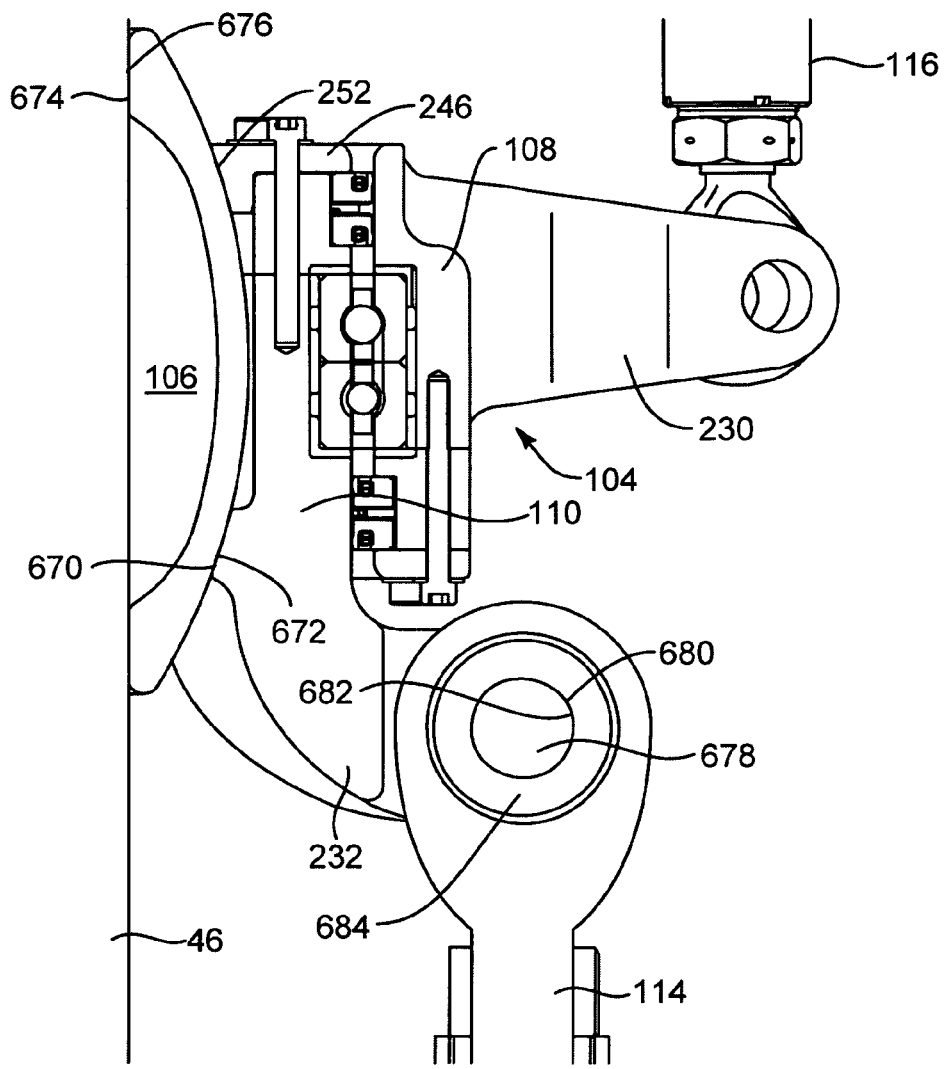
FIG. 27 is a side elevation cross-sectional view of a swashplate illustrating surfaces suitable for application of a solid lubricant in accordance with an embodiment of the present invention.

Referring to FIG. 27, as noted above, the swashplate 104 may be mounted to a spherical bearing 106 to enable the orientation of the swashplate 104 to be changed in response to actuation of the rods 114. The spherical bearing 106 may be slidably mounted to the mast 46 to enable adjustment of collective pitch by sliding the swashplate 104 relative to the mast 46.

As also noted above, the swashplate 104 is positioned within an air channel defined by the shroud 58 and the mast 46. When the tip jets 50 are in operation, compressed air from the one or more engines 48 is directed through this air channel. Compression of the air raises its temperature such that air flowing around the swashplate 104 may have a temperature of above 300° F. In contrast, during sustained translational flight at high altitudes, the tip jets 50 may be deactivated and the temperature of the swashplate 104 may drop below 32° F. Due to the high temperature of air flowing over the swashplate 104, conventional petroleum-based lubricants are ineffective because they may be ignited by the high temperatures or be stripped away from the swashplate 104 by the hot air flow.

In some embodiments, one or more bearing surfaces defining interfaces between the swashplate 104 and other structures engaging the swashplate 104 and transmitting blade pitch controls to the blades 42 may be coated with a solid lubricant. In some embodiments, both bearing surfaces at an interface between components may bear a solid lubricant in order to achieve a desired reduction in friction. The solid lubricant may include molybdenum disulphide ($MoS_2$), Boron Nitride (BN), or polytetrafluoroethylene (PTFE). In particular, $MoS_2$ and BN may be fused to surfaces to which they are applied, such as by means of baking at an elevated temperature. PTFE, which is a thermopolymer with a melting point of 621° F., may be fused to surfaces to which it is applied by applying it in a liquid state. Hereinbelow, a "low friction coating" may refer to any one of these three coatings, or to other solid, low-friction coatings that have an operating temperature within the range above about 300° F., preferably above about 350° F., and more preferably above about 400° F.

FIG. 27 illustrates an interface between the mast 46 and the swashplate 104 that may bear a low friction coating. The spherical bearing 106 includes a spherical bearing surface 670 that engages the swashplate 104. The surface 670 may bear a low friction coating. In a like manner, the spherical bearing seat 252 defined by the upper clamping ring 246 may also bear a low friction coating. A surface 672 of the non-rotating ring 110 engaging the surface 670 may also bear a low friction coating. The spherical bearing 106 may engage a surface 674 of the mast 46 by means of a surface 676. One or both of the surfaces 674, 676 may include a low friction coating.

Figure 28:
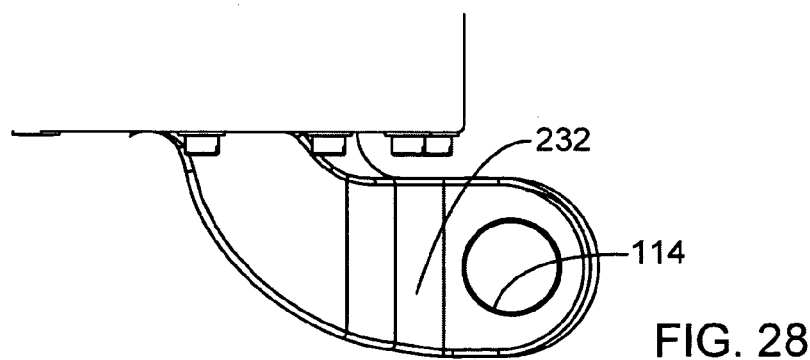
FIG. 28 is a side elevation cross-sectional view of an actuator rod mount suitable for application of a solid lubricant in accordance with an embodiment of the present invention.

Referring to FIG. 28, while still referring to FIG. 27, other interfaces may also bear low friction coatings, such as the interface between the swashplate 104 and the actuator rods 114. The actuator rods 114 may engage the swashplate 104 by means of actuator rod mounts 232. In some embodiments, the rods 114 are coupled to the mounts 232 by means of a pin 678. One or both of an aperture 680 defined by the actuator rod 114 and a surface 682 of the pin 678 engaging the aperture 680 may bear a low friction coating.

In some embodiments, the aperture 680 may be formed in a roller bearing 684 secured to the rod 114. In such embodiments, a low friction coating of the aperture 680 and pin surface 682 may be omitted. One or more components of the roller bearing 684, such as the inner and outer race, cage, and rolling elements, may also bear a low friction coating. The actuator rod mounts 232 may define one or more apertures 686 for receiving the pin 678. The apertures 686 may also bear a low friction coating or be defined by roller bearings having one or more components bearing low friction coatings.

Figure 29:
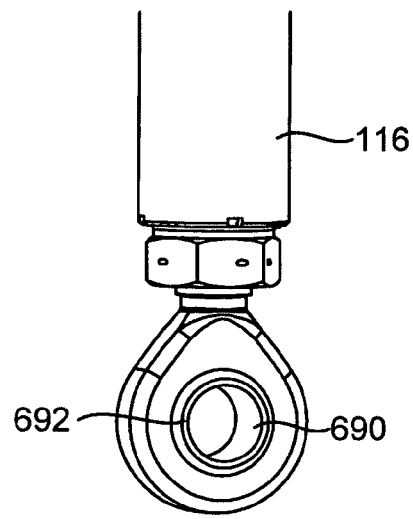
FIG. 29 is a partial isometric view of a pitch control rod suitable for application of a solid lubricant in accordance with an embodiment of the present invention.
Figure 30:
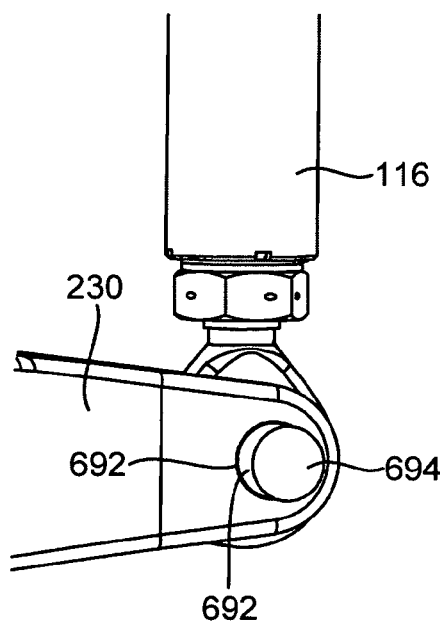
FIG. 30 is a partial isometric view of an interface between a pitch control rod and a pitch control rod mount suitable for application of a solid lubricant in accordance with an embodiment of the present invention.

FIGS. 29 and 30, in combination with FIG. 27, illustrate an interface between the pitch control rods 116 and the swashplate 104 bearing a low friction coating. The pitch control rods 116 may define an aperture 690, which may itself be defined by an inner race of a roller bearing 692. As for the roller bearing 684, one or more of the inner race, outer race, cage, and rolling elements may bear a low friction coating.

A pin 694 may insert within the aperture 690 and an aperture 696 formed in the pitch control rod mount 230. Where relative movement between the pin 694 and the aperture 690 is permitted, one or both of the aperture 690 and the surface 698 of the pin 694 may be bear a low friction coating at an interface therebetween. Where relative movement is permitted between the pin 694 and the aperture 696, one or both of the pin surface 698 and aperture 696 may bear a low friction coating. The apertures 690 and 696 may also be defined by roller bearings having one or more components bearing low friction coatings.

FIGS. 31 through 33 illustrate an interface between the rotating stabilizer linkage 150 and the mast fairing, and an interface between the rotating stabilizer linkage 150 and the swashplate 104, each of which may bear a low friction coating. As noted above, the rotating stabilizer linkage 150 includes a hinge 156 coupling legs 154a, 154b to one another.

A hinge 700 may likewise couple the leg 154b to the mast fairing 142. The hinge 700 may include a pin 702 including a pin bearing surface 704 engaging an aperture 706 extending through the leg 154b and a mounting structure 708 secured to the mast fairing 142.

One or more of the surface 704, portions of the aperture 706 extending through the leg 154b, and portions of the aperture 706 extending through the mounting structure 708 may bear a low friction coating. As with the actuator rods 114 and pitch control rods, the aperture 706 may be defined by one or more roller bearings secured to one or both of the leg 154b and the mounting structure 708 and having one or more components bearing low friction coatings.

The hinge 156 may also include a pin 710 positioned within an aperture 712 extending through the legs 154a, 154b. One or both of a bearing surface 714, portions of the aperture 712 passing through the leg 154a, and portions of the aperture 712 passing through the leg 154b may bear a low friction coating. The aperture 712 may be defined by one or more roller bearings secured to one or both of the leg 154a and the leg 154b and having one or more components bearing low friction coatings.

Referring to FIGS. 32 and 33, while still referring to FIG. 31, the leg 154b may couple to the rotating ring 108 by means of a spherical bearing 716. The spherical bearing 716 may engage a seat 718 formed in a linkage mount 160 and retained in place by a retaining ring 720. One or more of the spherical bearing 716, seat 718, and a lower surface 722 of the retaining ring 720 may bear a low friction coating.

Figure 34:
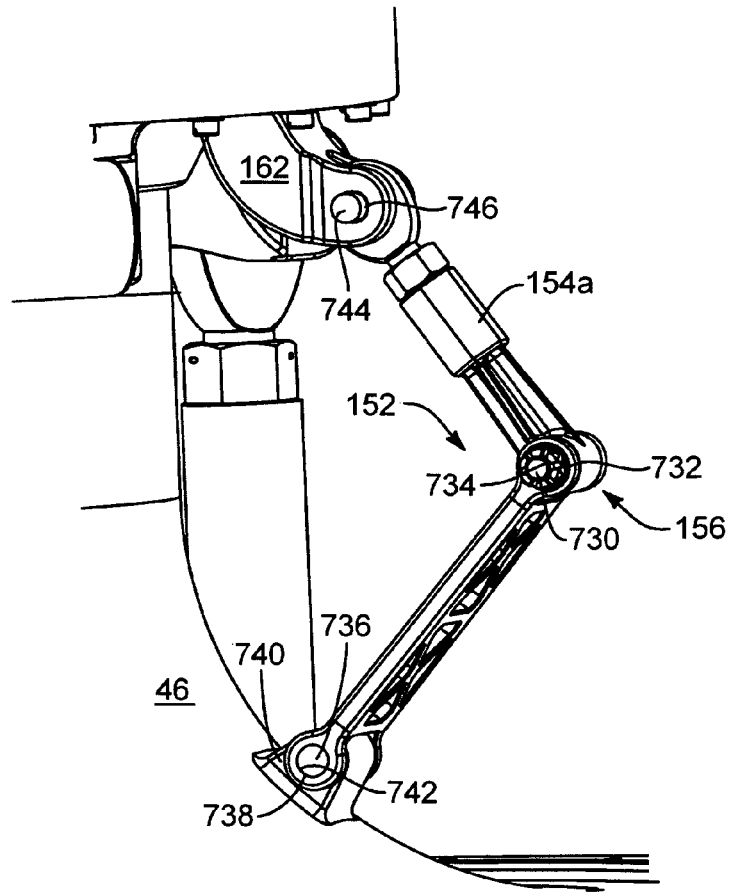
FIG. 34 is an isometric view of a non-rotating stabilizer linkage having interfaces suitable for application of a solid lubricant in accordance with an embodiment of the present invention.
Figure 35:
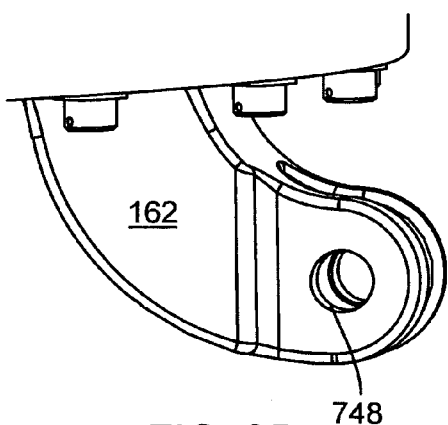
FIG. 35 is an isometric view of a linkage mount suitable for application of a solid lubricant in accordance with an embodiment of the present invention.
Figure 36:
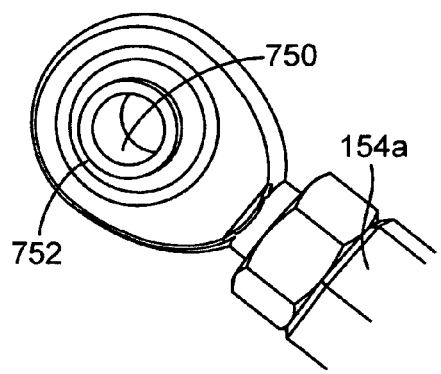
FIG. 36 is an isometric view of a leg of a stabilizer linkage suitable for application of a solid lubricant in accordance with an embodiment of the present invention.

FIGS. 34 through 36 illustrate an interface between a non-rotating stabilizer linkage 152 and the mast 46, and between the non-rotating stabilizer linkage 152 and the swashplate 104, each of which may bear a low friction coating. The hinge 156 of the non-rotating stabilizer linkage 152 may include a pin 730 engaging an aperture 732 passing through the legs 154a, 154b of the linkage 152. One or both of the bearing surface 734 of the pin 730, portions of the aperture 732 passing through the leg 154a, and portions of the aperture 732 passing through the leg 154b may bear a low friction coating. The aperture 732 may be defined by one or more roller bearings secured to one or both of the leg 154a or the leg 154b and having one or more components bearing low friction coatings.

The leg 154b may also couple to the mast 46 by means of a pin 736 passing through an aperture 738 extending through a mast mounting structure 740. One or both of a bearing surface 742 of the pin and the aperture 738 may bear a low friction coating. The aperture 738 may be defined by a roller bearing having one or more components bearing a low friction coating.

Referring to FIGS. 35 and 36, while still referring to FIG. 34, the leg 154a may secure to the non-rotating ring 110 by means of a pin 744 having a bearing surface 746 engaging an aperture 748 extending through a linkage mount 162 and an aperture 750 passing through the leg 154a. One or both of the apertures 748, 750 may be defined by a roller bearing 752 having one or more components bearing low friction coatings.

Figure 37:
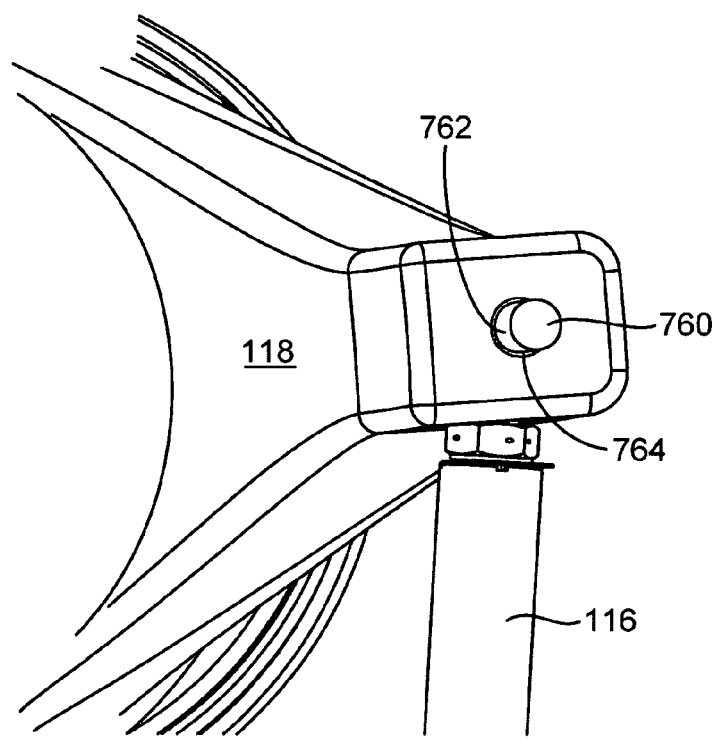
FIG. 37 is an isometric view of an interface between a pitch control rod and a pitch horn suitable for application of a solid lubricant in accordance with an embodiment of the present invention.

FIG. 37 illustrates an interface, between a pitch control rod 116 and the pitch horn 118, that may bear a low friction coating. A pitch control rod 116 may be mounted to the pitch horn 118 by means of a pin 760 having a bearing surface 762. The pin may insert through an aperture 764 defined by the pitch horn 118 and an aperture 690 defined by the pitch control rod 116 (See FIG. 29). One or more of the aperture 764, aperture 690, and bearing surface 762 may bear a low friction coating. One or both of the apertures 690, 764 may be defined by a roller bearing 768 having one or more components bearing a low friction coating.

Figure 38:
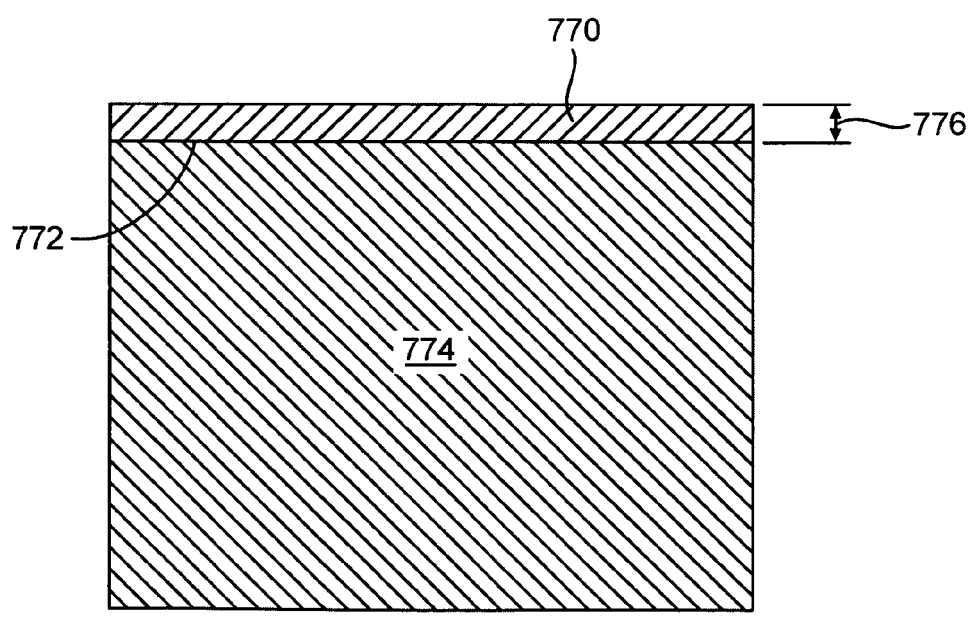
FIG. 38 is a side cross-sectional view of a portion of a component bearing a solid lubricant layer in accordance with an embodiment of the present invention.

Referring to FIG. 38, the low friction coating may include a layer 770 of solid lubricant fused to a surface 772 of a substrate 774 composing any of the parts described hereinabove as bearing a low friction coating. The thickness 776 of the layer 770 may be effective to provide a low friction interface for a predetermined number of operating hours. For example, in some embodiments, a layer 770 may have a thickness 776 of between about 0.001 and about 0.003 inches when formed of $MoS_2$ or PTFE. In some embodiments a layer 770 formed of BN may have a thickness between 0.1 µm and 2 mm. These thicknesses are exemplary only. However, maintaining fit tolerances is best achieved by controlling this thickness 776. The thickness 776 may have any value that is achievable for a given coating material and suitable for expected operating conditions.

Figure 39:
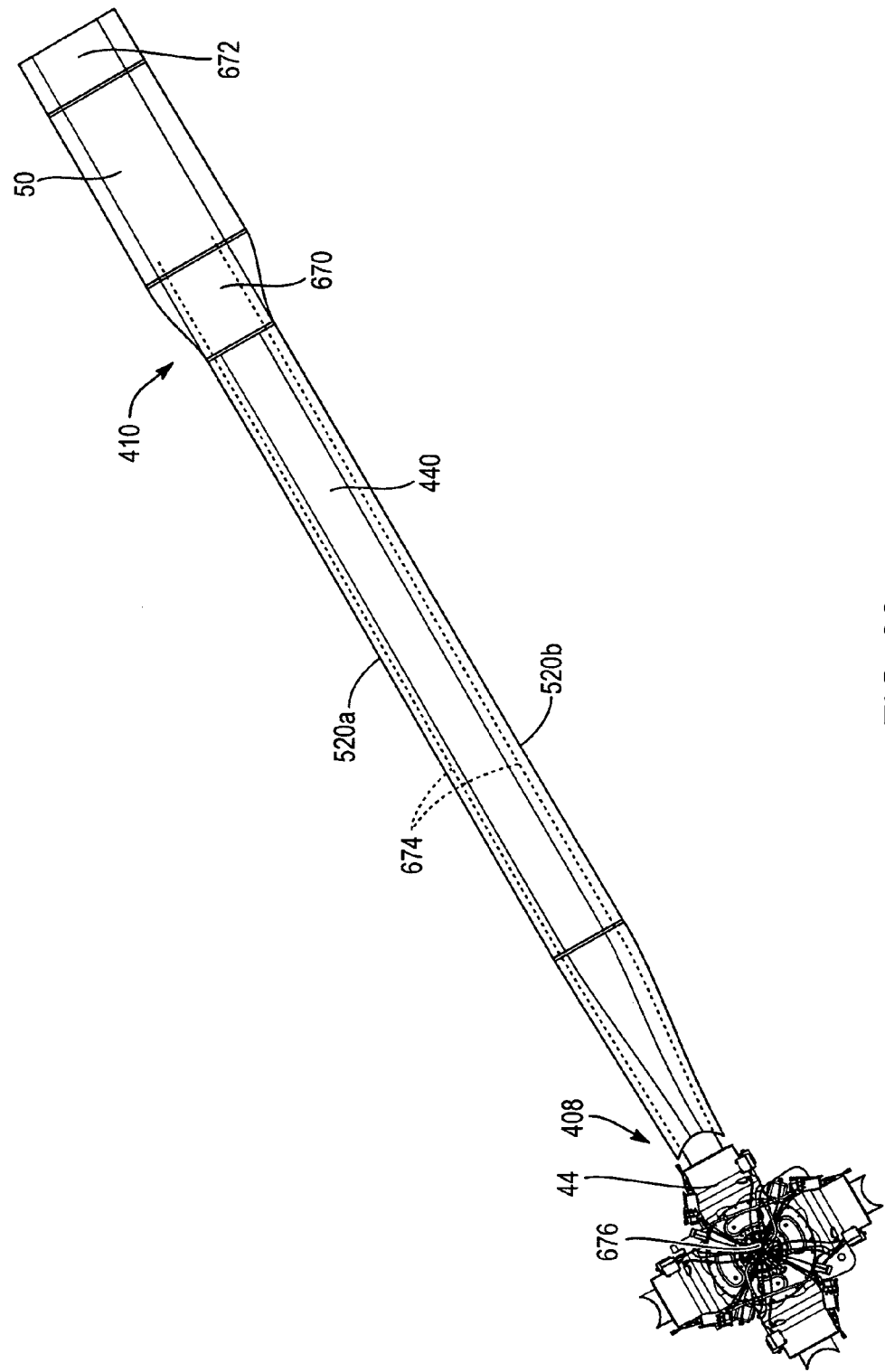
FIG. 39 is a top plan view of a hub and rotor blade for a reaction drive system in accordance with an embodiment of the present invention.

Referring to FIG. 39, as noted above, the blade 42 includes a blade spar 96. The blade spar 96 couples to the hub 44 proximate a proximal end 780 of the blade 42. The tipjet 50 secures to the blade spar 96 near the distal end 782 of the blade 42. For purposes of this disclosure "near" or "proximate" the proximal or distal ends 780, 782 means within about fifteen percent of the total length of the blade spar 96 from the extreme distal and proximal ends 780, 782 of the blade 42.

The tipjet 50 may secure to the blade spar 96 by means of a mounting structure 784, such as that described in U.S. Provisional Patent Application Ser. No. 61/403,134, entitled TIP JET ATTACHMENT APPARATUS AND METHOD and filed Sep. 9, 2010, which is hereby incorporated herein in its entirety. An extension 786 may secure to the tipjet 50 and extend distally therefrom in order to extend the aerodynamic length of the blade 42.

A plurality of lines 788 extend from near the proximal end 780 to near the distal end 782. The lines 788 may include cables, electrical lines, hydraulic lines, fiber optic lines, and the like. In some embodiments, the blade 42 includes leading and trailing edge fairings 790a, 790b mounted to the leading and trailing edges, respectively, of the blade spar 96. The fairings 790a, 790b may extend from near the proximal end 780 to near the distal end 782.

In such embodiments, the lines 788 may pass between the fairings 790a, 790b and the blade spar 96. Lines 792 emanating from the center of the hub 44 may couple to components that are in turn coupled to the lines 788. The lines 792 may be control lines for controlling and/or powering hub mounted components. The lines 792 may be hydraulic or electrical control lines coupled to the hydraulic rotary union 138 or slip ring assembly 134, respectively.

Figure 40:
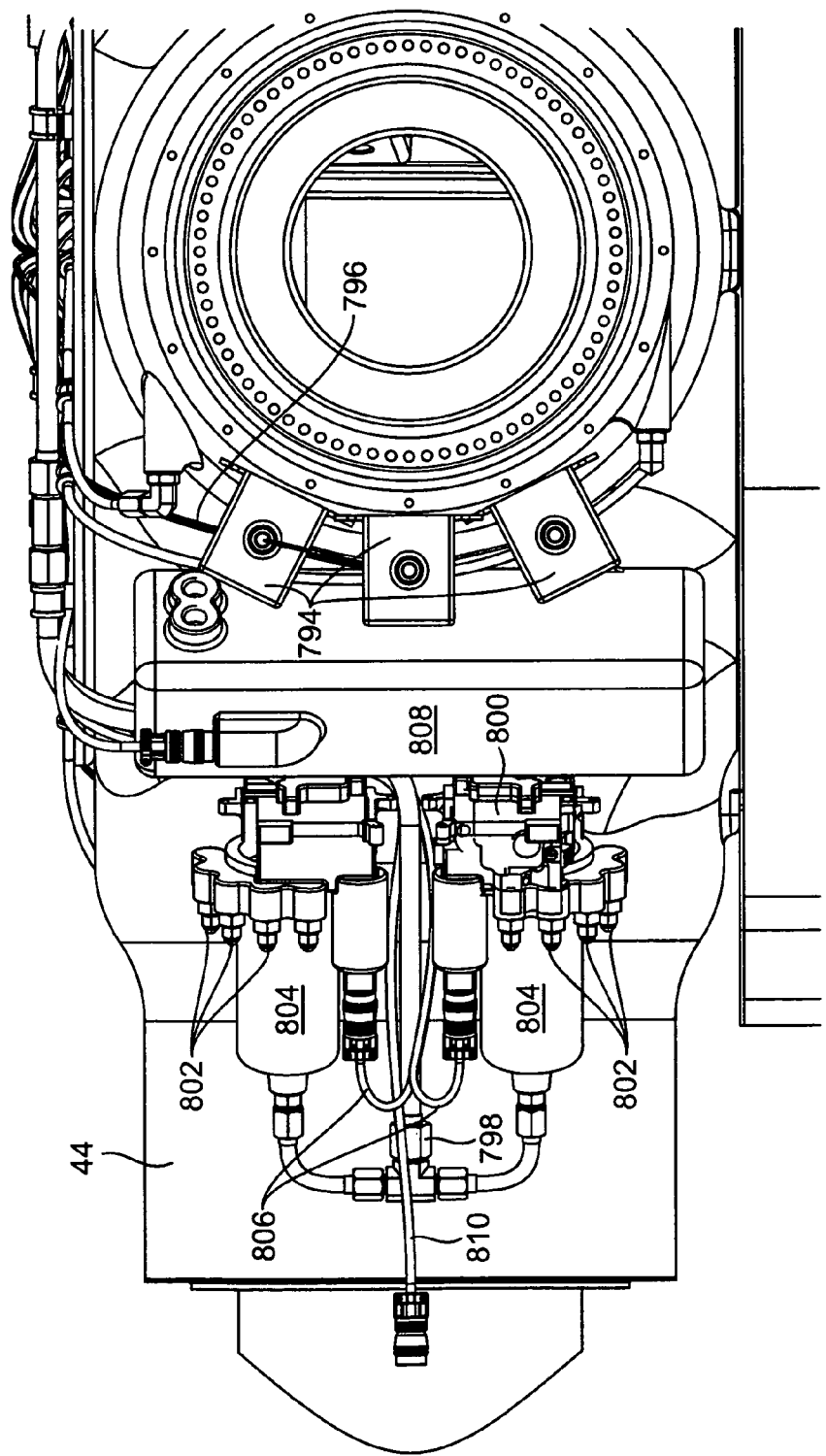
FIG. 40 is a side elevation view of a hub having tipjet control structures mounted thereto in accordance with an embodiment of the present invention.

Referring to FIG. 40, one or more exciters 794 may mount to the hub near the proximal end 780 of each blade spar 96. The exciters 794 generate the large voltage at the igniters of the tipjet 50 required to cause ignition. The lines 792 may include power lines 796 providing electrical power to the exciters 794. The exciters 794 may include any structure suitable for causing an arc at an igniter such as a generator, condenser, induction coil, or the like.

The lines 792 may include fuel lines 798 that receive fuel from the hydraulic rotary union 138 and conduct fuel to one or more fuel pumps 800 mounted to the hub near the proximal end 780 of each blade spar 96. The fuel lines 798 may include a braided metal outer cover. The fuel lines 798 may likewise be positioned within insulating conduits within the mast 46 to shield the lines 798 from electrical wires coupled to the slip ring assembly 134. In the illustrated embodiment, the fuel pumps 800 and exciters 794 corresponding to each blade spar 96 mount to the hub 44 opposite one another. However, alternative configurations are contemplated.

The pump may have a number of outputs 802 coupled to some of the lines 788 extending to the tip jet 50. A tipjet 50 may have a plurality of combustion chambers, a plurality of fuel injectors, or both. Accordingly, the fuel pumps 800 may have more than one output 802. In some embodiments, one or more fuel filters 804 mount to the hub 44 either upstream or downstream from the pump 800.

Power to the fuel pumps 800 may be supplied by power lines 804. The power lines 804 may couple directly to the slip ring assembly 134 or receive power by means of an electronic control unit 808 that may also mount to the hub 44. The electronic control unit 808 may receive signals from lines coupled to the slip ring assembly 134. The electronic control unit 808 may translate operator inputs into power supplied to one or both of exciters 794 and fuel pumps 800. For example, the power lines 804 and exciter power lines 796 may emanate from the electronic control unit 808.

Figure 41:
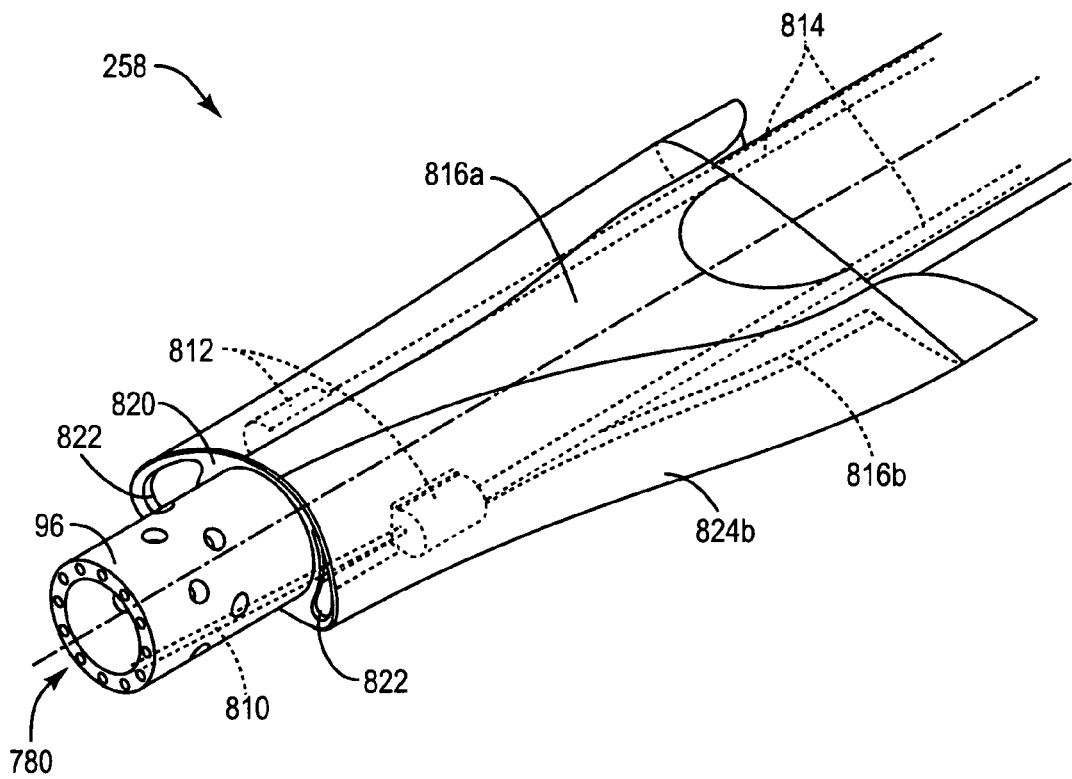
FIG. 41 is a partial isometric view of a blade root having exhaust flap actuators mounted thereto in accordance with an embodiment of the present invention.

Referring to FIG. 41 while still referring to FIG. 40, an actuator line 810 may couple electrical signals from the slip ring assembly to a cable actuator 812. The cable actuator 812 controls tension applied to cables 814 extending from the actuator 812 to the tipjet 50. In the illustrated embodiment, the cable actuators 812 may be mounted to the blade spar 96 proximate the proximal end 780. Mounting of the cable actuators 812 to the blade spar 96, rather than to the hub 44, may advantageously reduce tension applied to the cables 814 due to flapping and coning of the blade spar 96 inasmuch as the actuators 812 will be enabled to move with the blade spar 96. However, in some embodiments, the actuators 812 may be mounted to the hub 44.

In some embodiments, the cable actuators 812 secure to the blade spar 96 by means of upper and lower plates 816. In some embodiments, detachable fairings 818a, 818b may secure to the blade spar 96, such as by means of the upper and lower plates 816, to enable servicing and replacement of the cable actuators 812.

Figure 42:
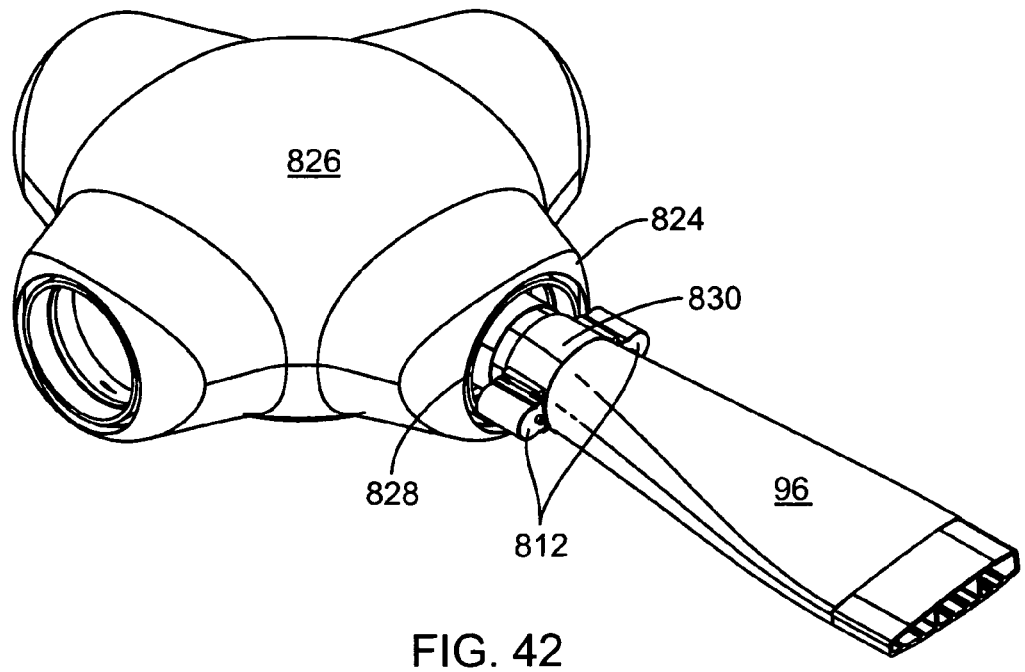
FIG. 42 is a partial isometric view of a hub shroud having blade spars bearing exhaust flap actuators extending therefrom in accordance with an embodiment of the present invention.

Referring to FIG. 42 while still referring to FIG. 41, a spherical seat 820 may secure to the upper and lower plates 816 located closer to the proximal end 780 than the cable actuators 812. The spherical seat 820 may define apertures 822 to enable the actuator line 810 and others of the lines 788 to pass therethrough. The spherical seat 820 may interface with a corresponding spherical surface 824 formed on a hub shroud 826. The hub shroud 826 may cover the hub 44, exciters 794, and pumps 800, as well as other structures illustrated in FIG. 40. The spherical surface 824 may define an aperture 828 to enable the actuator line 810 and other lines 788 to pass therethrough. The hub shroud 826 may serve to reduce the aerodynamic drag of the hub. The spherical surface 824 and spherical seat 820 enable flapping and coning of the blade spar 96 without damage to the hub shroud 826.

FIG. 42 additionally illustrates a mounting sleeve 830 to which the cable actuators 812 may mount. The mounting sleeve 830 may be used in addition to or instead of the upper and lower plates 816.

The upper and lower plates 816a, 816b, detachable fairings 818a, 818b, spherical seat 820, spherical surface 822, hub shroud 826 and associated features may be as described in U.S. Provisional Patent Application Ser. No. 61/409,487, filed Nov. 2, 2010 and entitled DETACHABLE ROTOR BLADE FAIRING APPARATUS AND METHOD and U.S. Provisional Patent Application Ser. No. 61/466,177, filed Mar. 22, 2011 and entitled ROTOR HUB AND BLADE ROOT FAIRING APPARATUS AND METHOD, both of which are incorporated herein by reference in their entirety.

Figure 43:
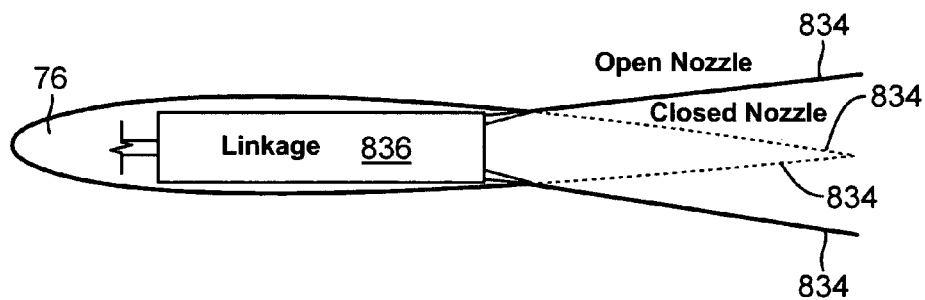
FIG. 43 is a schematic view of a tipjet having adjustable exhaust flaps in accordance with an embodiment of the present invention.

Referring to FIG. 43, the cable 814 may be coupled directly or by means of a linkage 832 to exhaust flaps 834 used to define the shape of an exhaust nozzle of the tipjet 50. The flaps 834 may have any of the structures and may be operated according to any of the methods disclosed in U.S. Provisional Patent Application Ser. No. 61/381,347, filed Sep. 9, 2010 and entitled ANEMOMETER DRIVE APPARATUS AND METHOD, which is hereby incorporated herein in its entirety.

Figure 44:
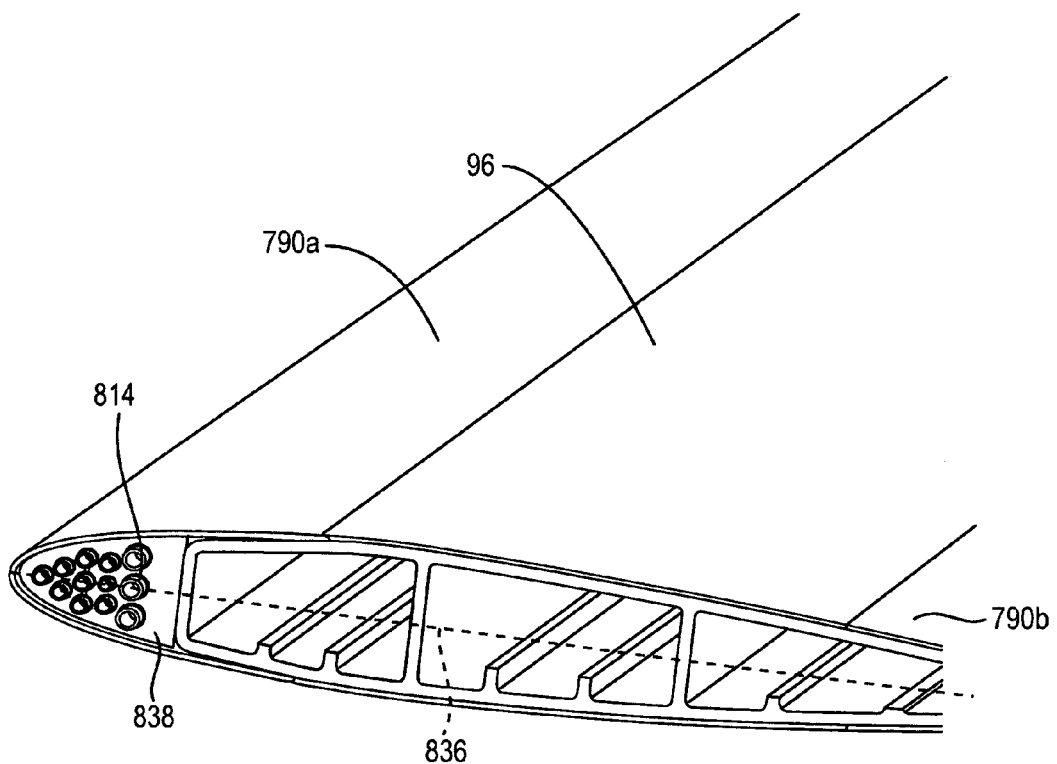
FIG. 44 is a cutaway isometric view of a blade having exhaust flap actuator lines extending along the neutral bending plane thereof in accordance with an embodiment of the present invention.

Referring to FIG. 44, the cable 814 may extend along the blade spar 96 such that the cable 814 is intersected by the neutral bending plane 836 (or axis 836) of the blade spar 96 with respect to coning and flapping loads. The neutral bending plane 836 is that plane which does not experience strain when the blade spar 96 is bent due to flapping and coning loads. In some embodiments, the cable 814 is intersected by the neutral bending plane 836 along its entire length. In other embodiments, 50%, preferably 60%, and more preferably 80% of the length of the cable 314 is intersected by the neutral bending plane 836.

The cable 314 may be maintained in position by means of bulkheads 838 positioned between the leading edge fairing 790a and the blade spar 96 or between the trailing edge fairing 790b and the blade spar 96. The bulkheads 838 may be located at intervals along the length of the blade spar 96. The positioning of the cable 814 and the position and configuration of the bulkheads 838 or other structures supporting the cable 814 may be as disclosed in U.S. Provisional Patent Application Ser. No. 61/461,223, filed Jan. 13, 2011 and entitled COMPOSITE ROTOR BLADE FOR REACTION DRIVE ROTORCRAFT, which is hereby incorporated herein by reference in its entirety. For example, the cable 814 may also be supported by conduits and conduit webs as disclosed therein.

Figure 45:
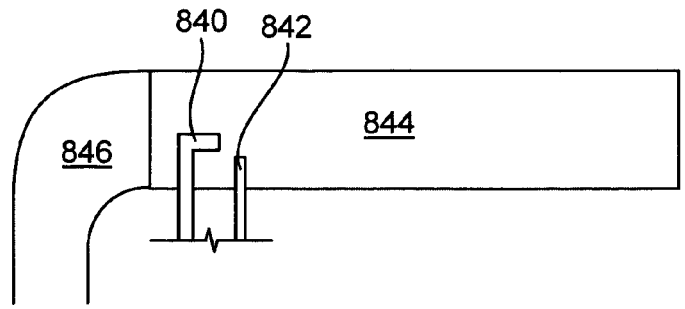
FIG. 45 is a schematic view of a tipjet combustion chamber in accordance with an embodiment of the present invention.

Referring to FIG. 45, each tipjet 50 may include one or more fuel injectors 840 in fluid communication with one of the fuel pumps 800 by means of one of the lines 788 embodied as a fuel line. The tipjets 50 may also include one or more igniters 842 coupled to one of the exciters 794 by means of one of the lines 788 embodied as an electrical line. The fuel injector 840 and igniter 842 may be located within or in fluid communication with a combustion chamber 844 of the tip jet 50. The combustion chamber may be in fluid communication with an inlet 846 that receives air from the duct 60 of the blade 42. Each tipjet 50 may include one or more combustion chambers 844.

Figure 46:
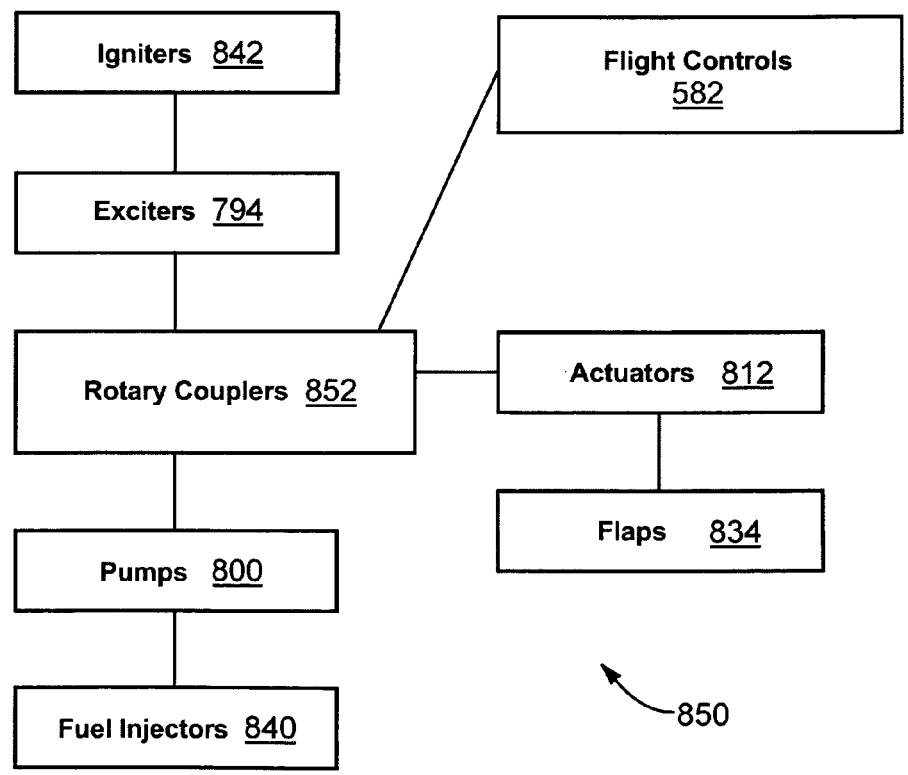
FIG. 46 is a schematic block diagram of a flight control system in accordance with an embodiment of the present invention.

Referring to FIG. 46, a flight control system 850 may include flight controls 582 as described hereinabove that receive operator inputs from an autopilot computer or pilot inputs. The flight controls 582 may transmit control signals through a rotary coupler including one or both of the hydraulic rotary union 138 and slip ring assembly 134. The signals are then transmitted to one or more of the exciters 794, fuel pumps 800, and actuators 812.

The exciters 794 are operable to translate a control signal into a current and/or voltage sufficient to cause an arc at the igniter. The fuel pumps 800 are operable to translate a control signal into a change in pressure within a fuel line coupling the fuel pumps 800 to the fuel injectors 840. The actuators 812 are operable to translate a control signal into the increase or decrease in tension in a cable 814 coupling the actuators 812 to the exhaust flaps 834.

Figure 47:
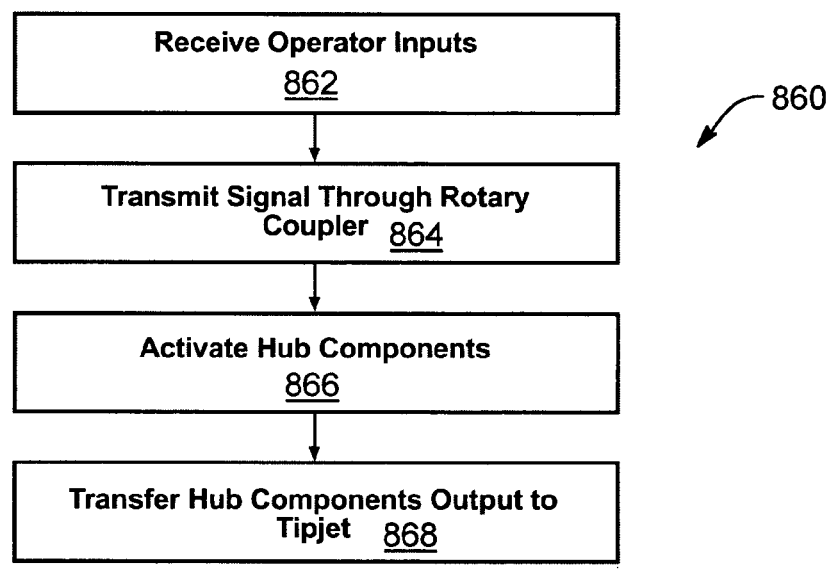
FIG. 47 is a process flow diagram of a method for operating a rotorcraft in accordance with an embodiment of the present invention.

Referring to FIG. 47, a method 860 for operating a rotorcraft may include receiving 862 operator inputs from a pilot or an autopilot computer. The inputs are then translated into signals and transmitted 864 through the rotary coupler 852 to the hub 44. At the hub 44, the signals activate 866 a hub component, such as a fuel pump 800, exciter 794, or actuator 812. The hub component translates the signal into an operational loading or force such as pressure within a fuel line, an electromotive force (EMF) sufficient to cause an arc at an igniter 842, or a tensile force within an actuator cable 814. The operational force generated by the hub component is then transferred 868 down the blade 42 to the tipjet 50, where the operational force alters the operation of the tipjet 50. This may include increasing or decreasing fuel flow through a fuel injector 840, causing or ceasing arcing at an igniter 842, opening or closing exhaust flaps 834, or changing any other aspect of operation of the tipjet 50.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
   an airframe;
   flight controls mounted within the airframe;
   a mast mounted to the airframe;
   a hub mounted to the mast and rotatable about a rotor axis;
   a plurality of assemblies coupled to the hub, each assembly comprising—
      a blade having a proximal end and a distal end, and mounted to the hub proximate the proximal end thereof;
      a rotating line extending from the hub to proximate the distal end of one of the blade;
      a tip jet mounted to the blade proximate the distal end thereof, the tipjet comprising an igniter and fuel injector;
      at least one of a fuel pump and an exciter mounted to the hub, and coupled to the tip jet by the rotating line;
      a non-rotating lines coupled to the flight controls; and
      a control lines coupled to the at least one the fuel pump and the exciter; and
   a rotary coupler coupling the plurality of control lines to the non-rotating lines of the plurality of assemblies.

2. The rotorcraft of claim 1, wherein:
   the at least one of the fuel pumps and exciters of each assembly includes the fuel pump; and
   each assembly further includes a fuel filter mounted to the hub in fluid communication with the fuel pump of the each assembly.

3. The rotorcraft of claim 1, wherein:
   the at least one of the fuel pump and the exciter of each assembly comprises the fuel pump; and
   the rotary coupler includes a hydraulic rotary union and a slip ring coupler.

4. The rotorcraft of claim 1, wherein:
   the at least one of the fuel pump and the exciter of each assembly includes both of the fuel pump and the excite; and
   each assembly further comprises an actuator mounted to the hub and actuator lines extending from the actuator to proximate the distal end of the blade of the each assembly, the actuator line being intersected by a neutral bending plane of the blade of the each assembly.

5. The rotorcraft of claim 1, wherein:
   the tipjet of each assembly further includes exhaust flaps positioned adjacent an exhaust port thereof; and
   each assembly further comprises an actuator mounted to the blade of the each assembly proximate the proximal end thereof and operably coupled to the exhaust flaps, the actuator being selectively activated to actuate the exhaust flaps.

\* \* \* \* \*